United States Patent
Halker et al.

(10) Patent No.: US 9,626,258 B2
(45) Date of Patent: Apr. 18, 2017

(54) SYSTEMS, METHODS, AND APPARATUS RELATED TO WIRELESS CHARGING MANAGEMENT

(71) Applicant: QUALCOMM Incorporated, San Diego, CA (US)

(72) Inventors: Ravi Halker, San Diego, CA (US); Donald Joseph Gosnell, Escondido, CA (US); Héctor Rafael Rodríguez-Figueroa, San Diego, CA (US); Christian Yair Reyes, San Diego, CA (US); Jayal Madhukumar Mehta, Redmond, WA (US); Nicholas Athol Keeling, Auckland (NZ); Michael Le Gallais Kissin, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 14/667,547

(22) Filed: Mar. 24, 2015

(65) Prior Publication Data
US 2015/0278038 A1    Oct. 1, 2015

Related U.S. Application Data

(60) Provisional application No. 61/970,800, filed on Mar. 26, 2014, provisional application No. 61/970,816, (Continued)

(51) Int. Cl.
*G06F 11/00* (2006.01)
*G06F 11/20* (2006.01)
(Continued)

(52) U.S. Cl.
CPC ............ *G06F 11/20* (2013.01); *B60L 3/0023* (2013.01); *B60L 11/182* (2013.01); (Continued)

(58) Field of Classification Search
CPC .. G06F 11/07; G06F 11/0703; G06F 11/0706; G06F 11/0739; G06F 11/0793; G06F 11/3013; B60L 3/0023
See application file for complete search history.

(56) References Cited

U.S. PATENT DOCUMENTS

| | | | |
|---|---|---|---|
| 9,315,109 B2 * | 4/2016 | Marathe | ............ B60L 11/1816 |
| 2006/0005081 A1 * | 1/2006 | Seth | .......................... A61B 6/00 714/39 |

(Continued)

FOREIGN PATENT DOCUMENTS

| | | |
|---|---|---|
| CN | 102859827 A | 1/2013 |
| EP | 2831975 A1 | 2/2015 |

(Continued)

OTHER PUBLICATIONS

ATV—GM: "Electric Vehicle Charger WM7280 Inductive Charger Owner's Manual", May 2, 2012 (May 2, 2012), pp. 1-18, XP055199900.

(Continued)

*Primary Examiner* — Joshua P Lottich
(74) *Attorney, Agent, or Firm* — Knobbe Martens Olson & Bear LLP

(57) ABSTRACT

Various systems, methods, and apparatuses for operating a wireless charging device in an electric vehicle are disclosed. One method includes detecting a system fault indicative of one or more faults in the wireless charging device in the electric vehicle or in the transmitter. The method further includes determining a fault severity level from a plurality of fault severity levels based on a type of the system fault detected. A total number of types of system faults can be greater than a total number of the plurality of fault severity levels. The method further includes performing one or more system fault response operation based on the determined (Continued)

fault severity level. Each of the plurality of fault severity levels can be associated with a different set of system fault response operations.

28 Claims, 54 Drawing Sheets

Related U.S. Application Data filed on Mar. 26, 2014, provisional application No. 61/970,826, filed on Mar. 26, 2014.

(51) Int. Cl.
| | | |
|---|---|---|
| *H04B 5/00* | (2006.01) | |
| *B60L 3/00* | (2006.01) | |
| *B60L 11/18* | (2006.01) | |
| *H02J 5/00* | (2016.01) | |
| *H02J 7/02* | (2016.01) | |

(52) U.S. Cl.
CPC ....... *B60L 11/1824* (2013.01); *B60L 11/1825* (2013.01); *B60L 11/1827* (2013.01); *B60L 11/1829* (2013.01); *B60L 11/1838* (2013.01); *H02J 5/005* (2013.01); *H02J 7/025* (2013.01); *H04B 5/0037* (2013.01); *B60L 2230/16* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 2011/0074346 A1 | 3/2011 | Hall et al. | |
| 2011/0279226 A1* | 11/2011 | Chen ..................... | B60L 11/182 340/5.8 |
| 2012/0217928 A1* | 8/2012 | Kulidjian .............. | B60L 3/0069 320/109 |
| 2013/0257168 A1 | 10/2013 | Singh | |
| 2013/0271076 A1* | 10/2013 | Gregg ................. | B60L 11/1838 320/109 |
| 2013/0313895 A1 | 11/2013 | Asselin et al. | |
| 2014/0002015 A1* | 1/2014 | Tripathi ................ | B60L 11/182 320/108 |
| 2014/0021912 A1 | 1/2014 | Martin et al. | |
| 2014/0111153 A1 | 4/2014 | Kwon et al. | |
| 2014/0139038 A1* | 5/2014 | Konno .................. | B60L 3/0069 307/104 |
| 2014/0184150 A1 | 7/2014 | Walley | |
| 2015/0091521 A1* | 4/2015 | Blum .................. | B60L 11/1812 320/108 |
| 2015/0123619 A1* | 5/2015 | Marathe ............. | B60L 11/1816 320/137 |
| 2016/0181875 A1* | 6/2016 | Long ...................... | H02J 17/00 320/108 |

FOREIGN PATENT DOCUMENTS

| | | |
|---|---|---|
| JP | 5544022 B2 | 7/2014 |
| WO | WO-2014014615 A1 | 1/2014 |

OTHER PUBLICATIONS

International Search Report and Written Opinion—PCT/US2015/022506—ISA/EPO—Jul. 16, 2015.
Schneider Electric: "EVlink—QC@BULLET@BULLET@BULLET Electric Vehicle Quick Charging Station Installation Manual", Sep. 30, 2011 (Sep. 30, 2011), pp. 1-31, XP055200125.

* cited by examiner

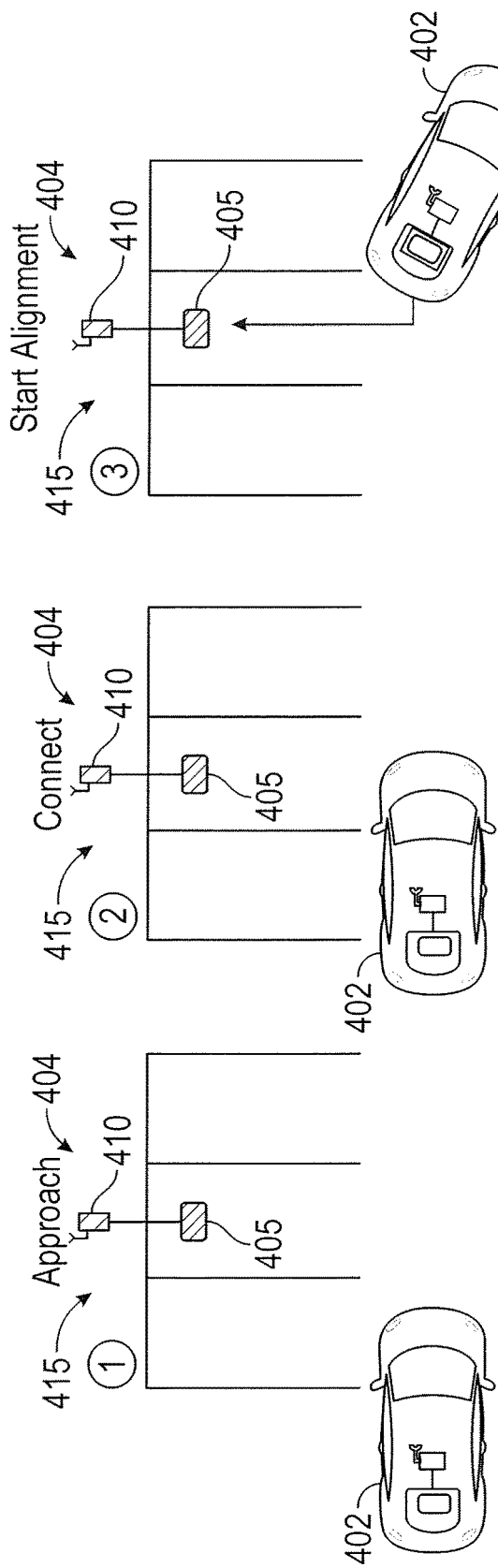
FIG. 4C
FIG. 4B
FIG. 4A
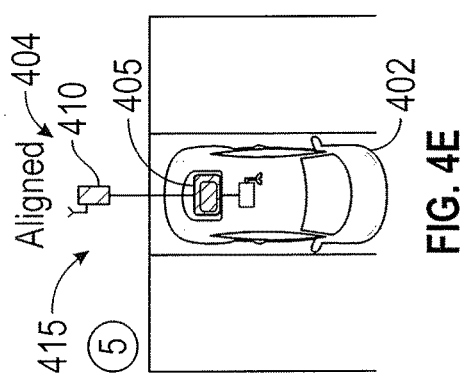
FIG. 4E
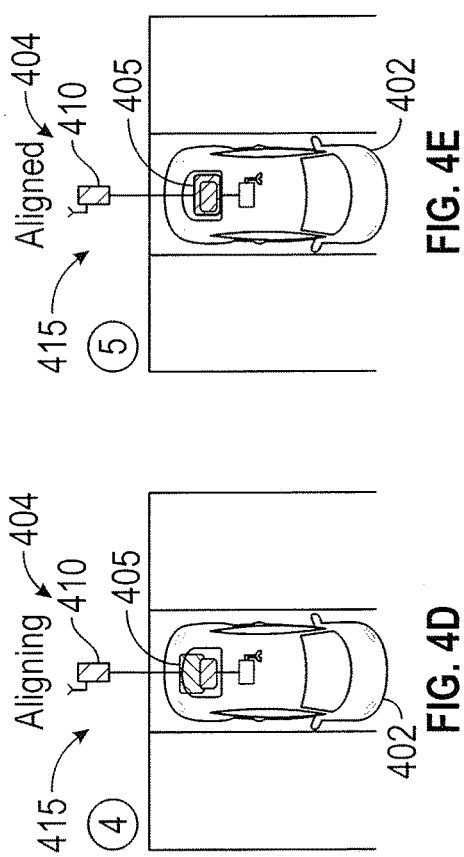
FIG. 4D

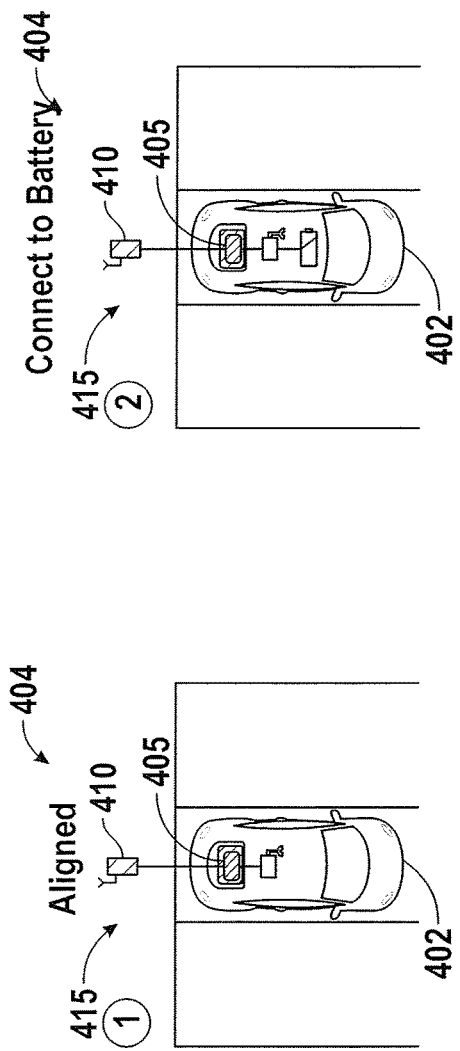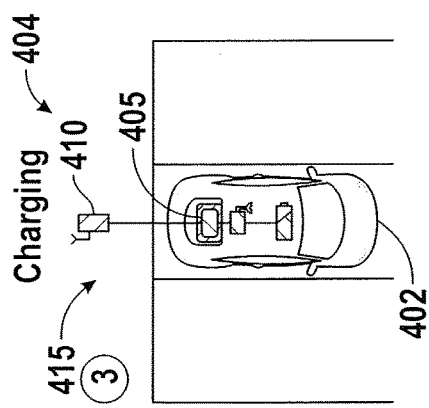
FIG. 5A
FIG. 5B
FIG. 5C

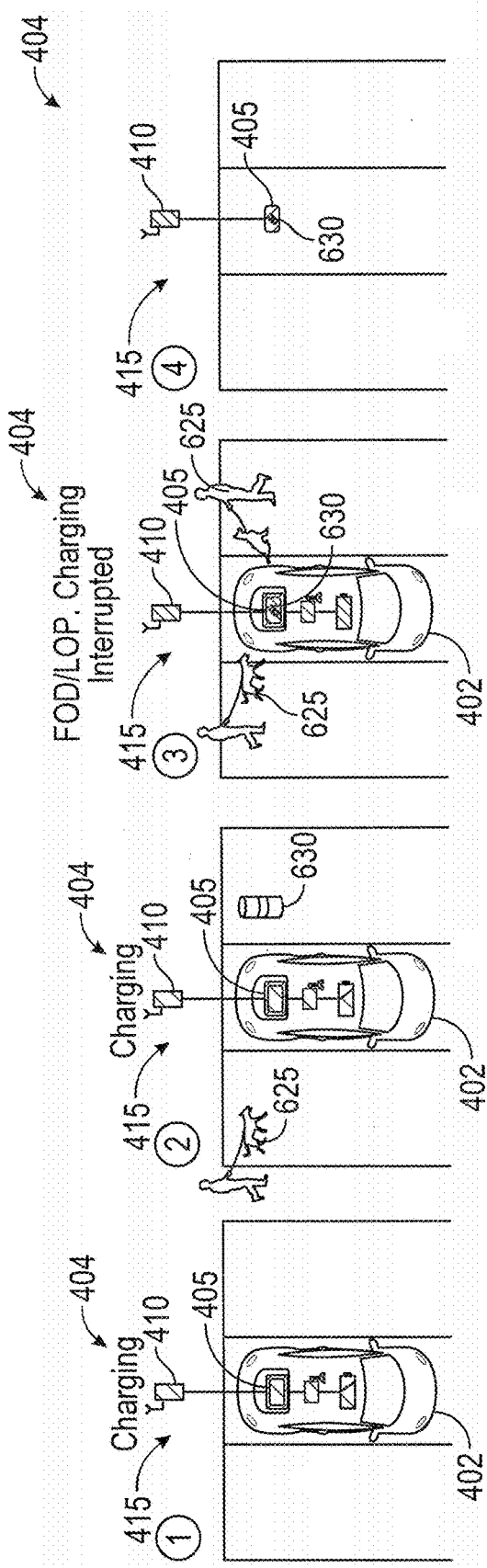

3500

3502
Measure a speed of an electric vehicle for a period of time

3504
Selectively power the wireless charger based at least in part on the measured speed over the period

3602
Means for measuring a speed of an electric vehicle for a period of time

3604
Means for selectively powering the wireless charger based at least in part on the measured speed over the period

3702
Measure a degree of magnetic coupling between the wireless charger and the electric vehicle 3704
Display a graphical representation of the measured degree of magnetic coupling

FIG. 37

SYSTEMS, METHODS, AND APPARATUS RELATED TO WIRELESS CHARGING MANAGEMENT

CROSS-REFERENCE TO RELATED APPLICATIONS

This application claims priority to: 1) Provisional Application No. 61/970,826 entitled "SYSTEMS AND METHODS FOR CONTROLLING WIRELESS POWER TRANSFER IN WIRELESS ELECTRIC VEHICLE CHARGER SYSTEM BASED ON INPUT FROM EXISTING VEHICLE CONTROLS" filed Mar. 26, 2014, 2) Provisional Application No. 61/970,816 entitled "SYSTEM, METHODS, AND APPARATUS RELATED TO WIRELESS CHARGING MANAGEMENT" filed Mar. 26, 2014, and 3) Provisional Application No. 61/970,800 entitled "SYSTEMS, METHODS, AND APPARATUS RELATED TO WIRELESS CHARGING MANAGEMENT" filed Mar. 26, 2014. The disclosure of each is hereby expressly incorporated in its entirety by reference herein.

FIELD

The present disclosure relates generally to wireless power transfer, and more specifically to devices, systems, and methods related to wireless power transfer to remote systems such as vehicles including batteries and communications therebetween.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors can sometimes be inconvenient or cumbersome and have other drawbacks. Wireless charging systems that are capable of transferring power in free space (e.g., via a wireless field) to be used to charge electric vehicles can overcome some of the deficiencies of wired charging solutions.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides a method of operating a wireless charging device in an electric vehicle. The wireless charging device is configured to wirelessly receive power via a wireless field generated by a transmitter. The method includes detecting a system fault indicative of one or more faults in the wireless charging device in the electric vehicle or in the transmitter. The method further includes determining a fault severity level from a plurality of fault severity levels based on a type of the system fault detected. A total number of types of system faults can be greater than a total number of the plurality of fault severity levels. The method further includes performing one or more system fault response operations based on the determined fault severity level. Each of the plurality of fault severity levels can be associated with a different set of system fault response operations.

In various implementations, said performing one or more system fault response operations can include, when a first fault severity level can be determined, providing a notification via a user interface and clearing the fault severity level, when a second fault severity level can be determined, clearing the fault severity level without providing the notification, when a third fault severity level can be determined, providing the notification, receiving an input via the user interface, and clearing the fault severity level in response to the input, and when a fourth fault severity level can be determined, providing the notification and refraining from clearing the fault severity level.

In various implementations, at least one system fault response operations can include ignoring the system fault. In various implementations, the system can be interrupted for charging or alignment in response to a first set of severity levels. The system can continue charging in response to a second set of severity levels, different than the first severity levels. In various implementations, the system fault can include at least one of: a living object detection, a foreign object detection, and a hardware fault.

In various implementations, the method can further include instructing the wireless power controller to stop the charging mode in response to the system fault. The method can further include ignoring one or more subsequent system faults for at least a first hold time. In various implementations, the method can further include instructing the wireless power controller to restart the charging mode when no system fault can be detected for a first scan time after termination of the first hold time.

Another aspect provides a wireless power charging device in an electric vehicle. The device includes a receiver configured to wirelessly receive power via a wireless field generated by a transmitter. The device further includes a processor configured to detect a system fault indicative of one or more faults in the wireless charging device in the electric vehicle or in the transmitter. The processor is further configured to determine a fault severity level from a plurality of fault severity levels based on a type of the system fault detected. A total number of types of system faults can be greater than a total number of the plurality of fault severity levels. The processor is further configured to perform one or more system fault response operations based on the determined fault severity level. Each of the plurality of fault severity levels can be associated with a different set of system fault response operations.

In various implementations, the device can further include a user interface configured to selectively provide a notification. The processor can be configured to perform the one or more system fault response operations by, when a first fault severity level can be determined, providing a notification via a user interface and clearing the fault severity level, when a second fault severity level can be determined, clearing the fault severity level without providing the notification, when a third fault severity level can be determined, providing the notification, receiving an input via the user interface, and clearing the fault severity level in response to the input, and when a fourth fault severity level can be determined, providing the notification and refraining from clearing the fault severity level.

In various implementations, at least one system fault response operations can include ignoring the system fault. In various implementations, the system can be interrupted for charging or alignment in response to a first set of severity levels. The system can continue charging in response to a second set of severity levels, different than the first severity levels. In various implementations, the system fault can include at least one of: a living object detection, a foreign object detection, and a hardware fault.

In various implementations, the device can further include a processor configured to instruct the wireless power controller to stop the charging mode in response to the system fault. The processor can be further configured to ignore one or more subsequent system faults for at least a first hold time. In various implementations, the processor can be further configured to instruct the wireless power controller to restart the charging mode when no system fault can be detected for a first scan time after termination of the first hold time.

Another aspect provides an apparatus for operating a wireless charging device in an electric vehicle. The apparatus includes means for wirelessly receiving power via a wireless field generated by a transmitter. The apparatus further includes means for detecting a system fault indicative of one or more faults in the wireless charging device in the electric vehicle or in the transmitter. The apparatus further includes means for determining a fault severity level from a plurality of fault severity levels based on a type of the system fault detected. A total number of types of system faults can be greater than a total number of the plurality of fault severity levels. The apparatus further includes means for performing one or more system fault response operations based on the determined fault severity level. Each of the plurality of fault severity levels can be associated with a different set of system fault response operations.

In various implementations, said means for performing one or more system fault response operations can include, means for providing a notification via a user interface and clearing the fault severity level when a first fault severity level can be determined, means for clearing the fault severity level without providing the notification when a second fault severity level can be determined, means for providing the notification, receiving an input via the user interface, and clearing the fault severity level in response to the input when a third fault severity level can be determined, and means for providing the notification and refraining from clearing the fault severity level when a fourth fault severity level can be determined.

In various implementations, at least one system fault response operations can include ignoring the system fault. In various implementations, the system can be interrupted for charging or alignment in response to a first set of severity levels. The system can continue charging in response to a second set of severity levels, different than the first severity levels. In various implementations, the system fault can include at least one of: a living object detection, a foreign object detection, and a hardware fault.

In various implementations, the apparatus can further include means for instructing the wireless power controller to stop the charging mode in response to the system fault. The apparatus can further include means for ignoring one or more subsequent system faults for at least a first hold time. In various implementations, the apparatus can further include means for instructing the wireless power controller to restart the charging mode when no system fault can be detected for a first scan time after termination of the first hold time.

Another aspect provides a non-transitory computer-readable medium. The medium includes code that, when executed, causes an apparatus to wirelessly receive power in an electric vehicle via a wireless field generated by a transmitter. The medium further includes code that, when executed, causes the apparatus to detect a system fault indicative of one or more faults in the wireless charging device in the electric vehicle or in the transmitter. The medium further includes code that, when executed, causes the apparatus to determine a fault severity level from a plurality of fault severity levels based on a type of the system fault detected. A total number of types of system faults can be greater than a total number of the plurality of fault severity levels. The medium further includes code that, when executed, causes the apparatus to perform one or more system fault response operations based on the determined fault severity level. Each of the plurality of fault severity levels can be associated with a different set of system fault response operations.

In various implementations, the medium can further include code that, when executed, causes the apparatus to perform the one or more system fault response operations by, when a first fault severity level can be determined, providing a notification via a user interface and clearing the fault severity level, when a second fault severity level can be determined, clearing the fault severity level without providing the notification, when a third fault severity level can be determined, providing the notification, receiving an input via the user interface, and clearing the fault severity level in response to the input, and when a fourth fault severity level can be determined, providing the notification and refraining from clearing the fault severity level.

In various implementations, at least one system fault response operations can include ignoring the system fault. In various implementations, the system can be interrupted for charging or alignment in response to a first set of severity levels. The system can continue charging in response to a second set of severity levels, different than the first severity levels. In various implementations, the system fault can include at least one of: a living object detection, a foreign object detection, and a hardware fault.

In various implementations, the medium can further include code that, when executed, causes the apparatus to instruct the wireless power controller to stop the charging mode in response to the system fault. The medium can further include code that, when executed, causes the apparatus to ignore one or more subsequent system faults for at least a first hold time. In various implementations, the medium can further include code that, when executed, causes the apparatus to instruct the wireless power controller to restart the charging mode when no system fault can be detected for a first scan time after termination of the first hold time.

Another aspect of the present disclosure provides another method of operating a wireless charging device in an electric vehicle. The method includes receiving, at an antenna, wireless charging power. The method further includes transmitting, to a wireless power controller, a plurality of commands to change a state of the wireless power controller, the commands including: instructing the wireless power controller to begin alignment with the electric vehicle, instructing the wireless power controller to stop alignment with the electric vehicle, instructing the wireless power controller to restart alignment with the electric vehicle, instructing the wireless power controller to enter a charging mode in which the controller provides wireless charging power via the antenna, instructing the wireless power controller to stop the charging mode, and instructing the wireless power controller to restart the charging mode.

In various implementations, the method can further include receiving a delayed charging configuration indicating charging start criteria and/or charging end criteria. The method can further include instructing the wireless power controller to start the charging mode when the charging start criteria are met. The method can further include instructing the wireless power controller to stop the charging mode when the charging end criteria are met.

In various implementations, the charging start criteria can include one of an immediate charging start, an amount of time to wait before charging start, and a specific time for charging start. The charging end criteria can include one of a target fraction of full charge, an amount of charging time until charging end, and a specific time for charging end.

In various implementations, the method can further include validating at least one of a vehicle state, alignment state, or safety system state at the time of the delayed charging before initiating power transfer.

Another aspect provides a wireless power charging device. The device includes an antenna configured to receive wireless power. The device further includes a transmitter configured to transmit a plurality of commands to change a state of the wireless power controller, the commands including: instructing the wireless power controller to begin alignment with the electric vehicle, instructing the wireless power controller to stop alignment with the electric vehicle, instructing the wireless power controller to enter a sleep mode, instructing the wireless power controller to enter a wake mode, instructing the wireless power controller to enter a charging mode in which the controller provides wireless power via the antenna, and instruct the wireless power controller to stop the charging mode.

In various implementations, the device can further include a processor configured to receive a delayed charging configuration indicating charging start criteria and/or charging end criteria. The processor can be further configured to instruct the wireless power controller to start the charging mode when the charging start criteria are met. The processor can be further configured to instruct the wireless power controller to stop the charging mode when the charging end criteria are met.

In various implementations, the charging start criteria can include one of an immediate charging start, an amount of time to wait before charging start, and a specific time for charging start. The charging end criteria can include one of a target fraction of full charge, an amount of charging time until charging end, and a specific time for charging end.

In various implementations, the processor can be further configured to validate at least one of a vehicle state, alignment state, or safety system state at the time of the delayed charging before initiating power transfer.

Another aspect provides an apparatus for operating a wireless charging device in an electric vehicle. The apparatus includes an antenna configured to receive wireless charging power. The apparatus further includes means for transmitting, to a wireless power controller, a plurality of commands to change a state of the wireless power controller, the commands including: instructing the wireless power controller to begin alignment with the electric vehicle, instructing the wireless power controller to stop alignment with the electric vehicle, instructing the wireless power controller to restart alignment with the electric vehicle, instructing the wireless power controller to enter a charging mode in which the controller provides wireless charging power via the antenna, instructing the wireless power controller to stop the charging mode, and instructing the wireless power controller to restart the charging mode.

In various implementations, the apparatus can further include means for receiving a delayed charging configuration indicating charging start criteria and/or charging end criteria. The apparatus can further include means for instructing the wireless power controller to start the charging mode when the charging start criteria are met. The apparatus can further include means for instructing the wireless power controller to stop the charging mode when the charging end criteria are met.

In various implementations, the charging start criteria can include one of an immediate charging start, an amount of time to wait before charging start, and a specific time for charging start. The charging end criteria can include one of a target fraction of full charge, an amount of charging time until charging end, and a specific time for charging end.

In various implementations, the apparatus can further include means for validating at least one of a vehicle state, alignment state, or safety system state at the time of the delayed charging before initiating power transfer.

Another aspect provides a non-transitory computer-readable medium. The medium includes code that, when executed, causes an apparatus to receive, at an antenna, wireless charging power. The medium further includes code that, when executed, causes the apparatus to transmit, to a wireless power controller, a plurality of commands to change a state of the wireless power controller, the commands including: instructing the wireless power controller to begin alignment with the electric vehicle, instructing the wireless power controller to stop alignment with the electric vehicle, instructing the wireless power controller to restart alignment with the electric vehicle, instructing the wireless power controller to enter a charging mode in which the controller provides wireless charging power via the antenna, instructing the wireless power controller to stop the charging mode, and instructing the wireless power controller to restart the charging mode.

In various implementations, the medium can further include code that, when executed, causes the apparatus to receive a delayed charging configuration indicating charging start criteria and/or charging end criteria. The medium can further include code that, when executed, causes the apparatus to instruct the wireless power controller to start the charging mode when the charging start criteria are met. The medium can further include code that, when executed, causes the apparatus to instruct the wireless power controller to stop the charging mode when the charging end criteria are met.

In various implementations, the charging start criteria can include one of an immediate charging start, an amount of time to wait before charging start, and a specific time for charging start. The charging end criteria can include one of a target fraction of full charge, an amount of charging time until charging end, and a specific time for charging end.

In various implementations, the medium can further include code that, when executed, causes the apparatus to validate at least one of a vehicle state, alignment state, or safety system state at the time of the delayed charging before initiating power transfer.

Another aspect provides another method of operating a wireless charging device in an electric vehicle. The method includes detecting a system fault. The method further includes activating one of a plurality of fault severity levels based on the system fault. The method further includes, when in a first fault severity level, providing a notification via a user interface and deactivating the fault severity level. The method further includes, when in a second fault severity level, deactivating the fault severity level without providing the notification. The method further includes, when in a third fault severity level, providing the notification, receiving an input via the user interface, and deactivating the fault severity level in response to the input. The method further includes, when in a fourth fault severity level, providing the notification and remaining in the fault severity level.

In various implementations, the system fault can include at least one of: a living object detection, a foreign object detection, and a hardware fault. In various implementations, the method can further include instructing the wireless power controller to stop the charging mode in response to the system fault. The method can further include ignoring one or more subsequent system faults for at least a first hold time.

In various implementations, the method can further include instructing the wireless power controller to restart the charging mode when no system fault is detected for a first scan time after termination of the first hold time. In various implementations, the system can be interrupted for charging or alignment in response to a first set of severity levels, and the system can continue charging in response to a second set of severity levels, different than the first severity levels.

Another aspect provides another wireless power charging device. The device includes a user interface configured to selectively provide a notification. The device further includes a processor configured to detect a system fault. The processor is further configured to activate one of a plurality of fault severity levels based on the system fault. The processor is further configured to, when in a first fault severity level, provide the notification via the user interface and deactivate the fault severity level. The processor is further configured to, when in a second fault severity level, deactivate the fault severity level without providing the notification. The processor is further configured to, when in a third fault severity level, provide the notification, receiving an input via the user interface, and deactivate the fault severity level in response to the input. The processor is further configured to, when in a fourth fault severity level, provide the notification and remain in the fault severity level.

In various implementations, the system fault can include at least one of: a living object detection, a foreign object detection, and a hardware fault. In various implementations, the device can further include a processor configured to instruct the wireless power controller to stop the charging mode in response to the system fault. The processor can be further configured to ignore one or more subsequent system faults for at least a first hold time.

In various implementations, the processor is further configured to instruct the wireless power controller to restart the charging mode when no system fault is detected for a first scan time after termination of the first hold time. In various implementations, the system can be interrupted for charging or alignment in response to a first set of severity levels, and the system can continue charging in response to a second set of severity levels, different than the first severity levels.

Another aspect provides another apparatus for operating a wireless charging device in an electric vehicle. The apparatus includes means for detecting a system fault. The apparatus further includes means for activating one of a plurality of fault severity levels based on the system fault. The apparatus further includes means for, when in a first fault severity level, providing a notification via a user interface and deactivating the fault severity level. The apparatus further includes means for, when in a second fault severity level, deactivating the fault severity level without providing the notification. The apparatus further includes means for, when in a third fault severity level, providing the notification, receiving an input via the user interface, and deactivating the fault severity level in response to the input. The apparatus further includes means for, when in a fourth fault severity level, providing the notification and remaining in the fault severity level.

In various implementations, the system fault can include at least one of: a living object detection, a foreign object detection, and a hardware fault. In various implementations, the apparatus can further include means for instructing the wireless power controller to stop the charging mode in response to the system fault. The apparatus can further include means for ignoring one or more subsequent system faults for at least a first hold time.

In various implementations, the apparatus can further include means for instructing the wireless power controller to restart the charging mode when no system fault is detected for a first scan time after termination of the first hold time. In various implementations, the system can be interrupted for charging or alignment in response to a first set of severity levels, and the system can continue charging in response to a second set of severity levels, different than the first severity levels.

Another aspect provides another non-transitory computer-readable medium. The medium includes code that, when executed, causes an apparatus to detect a system fault. The medium further includes code that, when executed, causes the apparatus to activate one of a plurality of fault severity levels based on the system fault. The medium further includes code that, when executed, causes the apparatus to, when in a first fault severity level, provide a notification via a user interface and deactivate the fault severity level. The medium further includes code that, when executed, causes the apparatus to, when in a second fault severity level, deactivate the fault severity level without providing the notification. The medium further includes code that, when executed, causes the apparatus to, when in a third fault severity level, provide the notification, receiving an input via the user interface, and deactivate the fault severity level in response to the input. The medium further includes code that, when executed, causes the apparatus to, when in a fourth fault severity level, provide the notification and remain in the fault severity level.

In various implementations, the system fault can include at least one of: a living object detection, a foreign object detection, and a hardware fault. In various implementations, the medium can further include code that, when executed, causes the apparatus to instruct the wireless power controller to stop the charging mode in response to the system fault. The medium can further include code that, when executed, causes the apparatus to ignore one or more subsequent system faults for at least a first hold time.

In various implementations, the medium can further include code that, when executed, causes the apparatus to instruct the wireless power controller to restart the charging mode when no system fault is detected for a first scan time after termination of the first hold time. In various implementations, the system can be interrupted for charging or alignment in response to a first set of severity levels, and the system can continue charging in response to a second set of severity levels, different than the first severity levels.

Another aspect provides another method of operating a wireless charging device in an electric vehicle. The method includes receiving an indication to initiate wireless power transfer for charging an electric vehicle. The method further includes delaying initiating the wireless power transfer for a first period of time during which detection of a living or foreign object is ignored. The method further includes delaying initiating the wireless power transfer for a second period of time after the first period. The method further includes initiating wireless power transfer after the second period of time in response to detecting no living or foreign object during the second period of time.

In various implementations, receiving the indication to initiate wireless power transfer is in response to an indication to re-start power transfer after a foreign or living object was cleared by a user. In various implementations, system operation can be interrupted in response to detecting a foreign or living object during the second period of time.

Another aspect provides another wireless power charging device. The device includes a receiver configured to receive an indication to initiate wireless power transfer for charging an electric vehicle. The device further includes a processor configured to delay initiating the wireless power transfer for a first period of time during which detection of a living or foreign object is ignored. The processor is further configured to delay initiating the wireless power transfer for a second period of time after the first period. The processor is further configured to initiate wireless power transfer after the second period of time in response to detecting no living or foreign object during the second period of time.

In various implementations, receiving the indication to initiate wireless power transfer is in response to an indication to re-start power transfer after a foreign or living object was cleared by a user. In various implementations, system operation can be interrupted in response to detecting a foreign or living object during the second period of time.

Another aspect provides another apparatus for operating a wireless charging device in an electric vehicle. The apparatus includes means for receiving an indication to initiate wireless power transfer for charging an electric vehicle. The apparatus includes means for delaying initiating the wireless power transfer for a first period of time during which detection of a living or foreign object is ignored. The apparatus includes means for delaying initiating the wireless power transfer for a second period of time after the first period. The apparatus includes means for initiating wireless power transfer after the second period of time in response to detecting no living or foreign object during the second period of time.

In various implementations, receiving the indication to initiate wireless power transfer is in response to an indication to re-start power transfer after a foreign or living object was cleared by a user. In various implementations, system operation can be interrupted in response to detecting a foreign or living object during the second period of time.

Another aspect provides another non-transitory computer-readable medium. The medium includes code that, when executed, causes an apparatus to receive an indication to initiate wireless power transfer for charging an electric vehicle. The medium further includes code that, when executed, causes the apparatus to delay initiating the wireless power transfer for a first period of time during which detection of a living or foreign object is ignored. The medium further includes code that, when executed, causes the apparatus to delay initiating the wireless power transfer for a second period of time after the first period. The medium further includes code that, when executed, causes the apparatus to initiate wireless power transfer after the second period of time in response to detecting no living or foreign object during the second period of time.

In various implementations, receiving the indication to initiate wireless power transfer is in response to an indication to re-start power transfer after a foreign or living object was cleared by a user. In various implementations, system operation can be interrupted in response to detecting a foreign or living object during the second period of time.

Another aspect of the disclosure provides a method for wirelessly charging a vehicle utilizing a wireless charger. The method comprises receiving an indication comprising at least one of an ignition key position and a transmission gear position associated with the vehicle. The method further comprises selectively enabling or disabling a function of the wireless charger based at least in part on the indication.

Another aspect of the disclosure provides an apparatus for wirelessly charging a vehicle. The apparatus comprises a processor configured to receive an indication comprising at least one of an ignition key position and a transmission gear position associated with the vehicle. The processor is further configured to selectively enable or disable a wireless charging function based at least in part on the indication.

Another aspect of the disclosure provides a non-transitory computer-readable medium comprising code. The code, when executed, causes a processor to receive an indication comprising at least one of an ignition key position and a transmission gear position associated with a vehicle. The code, when executed, further causes the processor to selectively enable or disable a wireless charging function based at least in part on the indication.

Another aspect of the disclosure provides an apparatus for wirelessly charging a vehicle. The apparatus comprises means for receiving an indication comprising at least one of an ignition key position and a transmission gear position associated with the vehicle. The apparatus further comprises means for selectively enabling or disabling a wireless charging function based at least in part on the indication.

Another aspect of the disclosure provides a method for wirelessly charging a vehicle utilizing a wireless charger. The method includes measuring a speed of the electric vehicle for a period of time. The method further includes selectively powering the wireless charger based at least in part on the measured speed over the period.

Another aspect of the disclosure provides an apparatus for wirelessly charging a vehicle. The apparatus includes a processor configured to measure a speed of the electric vehicle for a period of time. The processor is further configured to selectively power the wireless charger based at least in part on the measured speed over the period.

Another aspect of the disclosure provides a non-transitory computer-readable medium comprising code. The code, when executed, causes a processor to measure a speed of the electric vehicle for a period of time. The code, when executed, further causes the processor to selectively power the wireless charger based at least in part on the measured speed over the period.

Another aspect of the disclosure provides an apparatus for wirelessly charging a vehicle. The apparatus includes means for measuring a speed of the electric vehicle for a period of time. The apparatus further includes means for selectively powering the wireless charger based at least in part on the measured speed over the period.

Another aspect of the disclosure provides a method for wirelessly charging a vehicle utilizing a wireless charger. The method includes determining whether the electric vehicle is aligned with the wireless charger. The method further includes selectively maintaining a power level of the electric vehicle for a period of time, or until an instruction is received regarding powering the electric vehicle, based at least in part on the determined alignment.

Another aspect of the disclosure provides a method for wirelessly charging a vehicle utilizing a wireless charger. The method includes communicating with an electric vehicle. The method further includes receiving a plurality of discrete commands via the communication interface to change a state of the wireless power controller, the commands including: instructing the wireless power controller to begin alignment with the electric vehicle, instructing the wireless power controller to stop alignment with the electric vehicle, instructing the wireless power controller to enter a sleep mode, instructing the wireless power controller to enter a wake mode, instructing the wireless power controller to enter a charging mode in which the controller provides wireless power via the antenna, and instruct the wireless power controller to stop the charging mode.

Another aspect of the disclosure provides a method for wirelessly charging a vehicle utilizing a wireless charger. The method includes communicating with an electric vehicle. The method further includes receiving a plurality of discrete commands via the communication interface to change a state of the vehicle controller, the commands including: instructing the vehicle controller to begin alignment with a wireless power charger, instructing the vehicle controller to stop alignment with the wireless power charger, instructing the vehicle controller to enter a sleep mode, instructing the vehicle controller to enter a wake mode, instructing the vehicle controller to enter a charging mode in which the vehicle controller receives wireless power via an antenna, and instruct the vehicle controller to stop the charging mode.

Another aspect of the disclosure provides a method for wirelessly charging a vehicle utilizing a wireless charger. The method includes receiving a command from a vehicle controller at a controller configured to control one or more functions related to wirelessly receiving power via a magnetic field generated by the transmitter, the command indicating a request for power. The method further includes determining, in response to receiving the command indicating a request for power, by the controller, independent of any command received from the vehicle, to initiate one of an alignment function or a function that provides charging power to the electric vehicle based on determining a state of alignment of the vehicle with respect to the transmitter.

Another aspect of the disclosure provides a method for wirelessly charging a vehicle utilizing a wireless charger. The method includes automatically entering a sleep mode based on a state of the wireless power controller and a state of an electric vehicle or a received command.

BRIEF DESCRIPTION OF THE DRAWINGS

FIGS. 4A-4E illustrate an exemplary scenario for wireless electric vehicle parking.

FIGS. 5A-5C illustrate an exemplary scenario for wireless electric vehicle charging.

FIGS. 6A-6D illustrate an exemplary scenario for wireless electric vehicle object detection.

FIGS. 8A1-8A5 and 8B1-8B4 are state diagrams showing state transitions in an exemplary wireless power transfer system, in accordance with another exemplary implementation.

FIG. 35 is a flowchart of a method for wirelessly charging a vehicle, in accordance with some exemplary implementations.

FIG. 36 is a functional block diagram of an apparatus for wirelessly charging a vehicle, in accordance with some exemplary implementations.

FIG. 37 is a flowchart of a method for wirelessly charging a vehicle, in accordance with some exemplary implementations.

Figure 1:
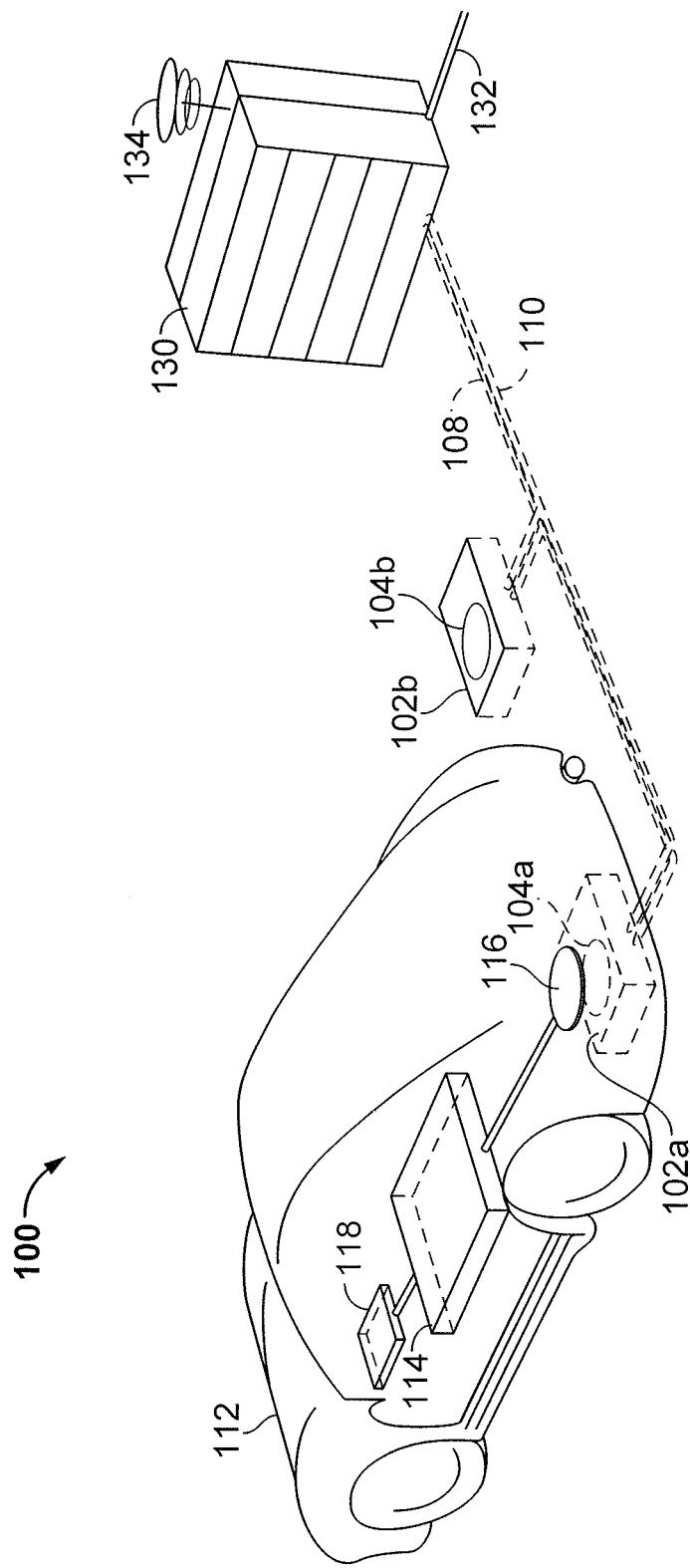
FIG. 1 illustrates a diagram of an exemplary wireless power transfer system for charging an electric vehicle, in accordance with some exemplary implementations.

The various features illustrated in the drawings may not be drawn to scale. Accordingly, the dimensions of the various features can be arbitrarily expanded or reduced for clarity. In addition, some of the drawings may not depict all of the components of a given system, method or device. Finally, like reference numerals can be used to denote like features throughout the specification and figures.

DETAILED DESCRIPTION

The detailed description set forth below in connection with the appended drawings is intended as a description of exemplary implementations and is not intended to represent the only implementations. The term "exemplary" used throughout this description means "serving as an example, instance, or illustration," and should not necessarily be construed as preferred or advantageous over other exemplary implementations. The terms "first" and "second" are used herein to distinguish among various elements (e.g., "first frequency" and "second frequency") and are not intended to denote any particular order to these elements. The detailed description includes specific details for the purpose of providing a thorough understanding of the exemplary implementations. In some instances, some devices are shown in block diagram form.

Wirelessly transferring power can refer to transferring any form of energy associated with electric fields, magnetic fields, electromagnetic fields, or otherwise from a transmitter to a receiver without the use of physical electrical conductors (e.g., power can be transferred through free space). The power output into a wireless field (e.g., a magnetic field) can be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles can be hybrid electric vehicles that include besides electric motors, a traditional combustion engine for direct locomotion or to charge the vehicle's battery. Other electric vehicles can draw all locomotion ability from electrical power. An electric vehicle is not limited to an automobile and can include motorcycles, carts, scooters, and the like. By way of example and not limitation, a remote system is described herein in the form of an electric vehicle (EV). Furthermore, other remote systems that can be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with some exemplary implementations. The wireless power transfer system 100 enables charging of an electric vehicle 112 while the electric vehicle 112 is parked near a base wireless charging system 102A. Spaces for two electric vehicles are illustrated in a parking area to be parked over corresponding base wireless charging system 102A and 102B. In some implementations, a local distribution center 130 can be connected to a power backbone 132 and configured to provide an alternating current (AC) or a direct current (DC) supply through a power link 110 to the base wireless charging system 102A. The base wireless charging system 102A also includes a base system induction coil 104A for wirelessly transferring or receiving power or for providing signals via a magnetic field and an antenna 136. An electric vehicle 112 can include a battery unit 118, an electric vehicle induction coil 116, an electric vehicle wireless charging system 114, and an antenna 140. The electric vehicle induction coil 116 can interact with the base system induction coil 104A for example, via a region of the electromagnetic field generated by the base system induction coil 104A.

In some exemplary implementations, the electric vehicle induction coil 116 can receive power when the electric vehicle induction coil 116 is located in an energy field produced by the base system induction coil 104A. The field corresponds to a region where energy output by the base system induction coil 104A can be captured by an electric vehicle induction coil 116. For example, the energy output by the base system induction coil 104A can be at a level sufficient to charge or power the electric vehicle 112 (e.g., to charge the battery unit 118). In some cases, the field can correspond to the "near field" of the base system induction coil 104A. The near-field can correspond to a region in which there are strong reactive fields resulting from the currents and charges in the base system induction coil 104A that do not radiate power away from the base system induction coil 104A. In some cases the near-field can correspond to a region that is within about $\frac{1}{2}\pi$ of wavelength of the base system induction coil 104A (and vice versa for the electric vehicle induction coil 116) as will be further described below.

In some exemplary implementations, the base wireless charging system 102A can be configured to communicate with the electric vehicle 112 via a magnetic field. For example the base wireless charging system 102A can communicate with the electric vehicle 112 by providing an information signal via a magnetic field, the signal provided at intensity level lower that the level for wireless power transmission and having one or more characteristics to uniquely identify the base wireless charging system 102A from a plurality of base wireless charging systems. In some implementations, the information signal can be configured at a frequency other than the frequency used for wireless power transfer (WPT), the signal can further be configured as a modulation of the magnetic field. The electric vehicle 112 can sense the information signal (e.g., low level magnetic beacons) in the presence of strong emissions emanating from active base wireless charging systems 102 located in the immediate vicinity. Since it can be undesirable to have power transfer interrupted when an electric vehicle 112 is sensing magnetic beacon signals, the beacons can be emitted in a separate frequency band that is sufficiently offset from the WPT operating frequency to avoid interference (e.g. 10-20 kHz). Since the base wireless charging system 102A emits the magnetic beacon signals at low levels, the signals can be generated by WPT hardware without need for returning resonant circuits (e.g., charging inductions coils can be driven off resonance), provided that pulse-width modulation (PWM) waveform can be synthesized in fine enough frequency steps.

To separate different beacon signal emissions and to avoid mutual interference, the base wireless charging system 102A can modulate the magnetic field. The modulation can be any type of modulation or combination of modulation, such as, for example, a single pulse, digital sequence, frequency division, time division, code division, etc. For example, for a frequency division scheme, the signal frequencies can be assigned fixed or dynamically on a temporary basis in a separate frequency that is offset from the wireless power transmission operating frequency by at least 10 kHz to avoid interference between the signal and the wireless power transfer and interference between multiple signals. The electric vehicle 112 can receive the signal via one or more sensors (not shown) configured to detect and receive a signal via a magnetic field. The electric vehicle 112 can also use the signal to determine the distance and/or direction of the base wireless charging system 102A.

In some implementations, an electric vehicle 112 can utilize the magnetic signal for pairing purposes, i.e. to pair with a corresponding base wireless charging system 102. In some implementations, such pairing can be accomplished by detecting and identifying the magnetic field of the base wireless charging system 102 the electric vehicle 112 is going to be supplied from and by correlating signals transmitted out-of-band (i.e. UHF) with signals transmitted on the LF magnetic field. This procedure, however, can require the magnetic field being modulated in one form or another as describe above (e.g., single pulse, digital sequence, frequency division, etc.)

In some exemplary implementations, the magnetic field signal transmit and receive capabilities can be configured to be reciprocal such that the electric vehicle 112 provides a signal via a magnetic field to the base wireless charging system 102A and the base wireless charging system 102A receives the signal to uniquely identify the electric vehicle 112 from a plurality of electric vehicles.

In accordance, certain aspects of implementations described herein allow for establishing, in a scenario where multiple base charging systems 102A are positioned in close proximity to each other, a communication link between an electric vehicle wireless charging system 114 and a selected base wireless charging system 102A before the electric vehicle 112 is positioned over the inductions coil 104A of the base wireless charging system 102A. As a result of pairing with the correct base wireless charging system 102A before alignment or guidance, the communication link can be used to communicate guidance and alignment information to allow an operator of the electric vehicle 112 to move into the correct position for charging.

Local distribution center 130 can be configured to communicate with external sources (e.g., a power grid) via a communication backhaul 134, and with the base wireless charging system 102A via a communication link 108.

With reference to FIG. 1, base wireless charging systems 102A and 102B can be configured to communicate with the electric vehicle wireless charging system 114 via antennas 136 and 138 or via electric vehicle induction coils 104A and 104B. For example, the wireless charging system 102A can communicate with the electric vehicle wireless charging system 114 using a communication channel between antennas 138 and 140. The communication channels can be any type of communication channels such as, for example, Bluetooth, zigbee, cellular, wireless local area network (WLAN), etc.

In some implementations the electric vehicle induction coil 116 can be aligned with the base system induction coil 104A and, therefore, disposed within a near-field region simply by the driver positioning the electric vehicle 112 correctly relative to the base system induction coil 104A. In other implementations, the driver can be given visual feedback, auditory feedback, or combinations thereof to determine when the electric vehicle 112 is properly placed for wireless power transfer. In yet other implementations, the electric vehicle 112 can be positioned by an autopilot system, which can move the electric vehicle 112 back and forth (e.g., in zig-zag movements) until an alignment error has reached a tolerable value. This can be performed automatically and autonomously by the electric vehicle 112 without or with only minimal driver intervention provided that the electric vehicle 112 is equipped with a servo steering wheel, ultrasonic sensors, and intelligence to adjust the vehicle. In still other implementations, the electric vehicle induction coil 116, the base system induction coil 104A, or a combination thereof can have functionality for displacing and moving the induction coils 116 and 104A relative to each other to more accurately orient them and develop more efficient coupling therebetween.

The base wireless charging system 102A can be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly can provide numerous benefits. For example, charging can be performed automatically, virtually without driver intervention and manipulations thereby improving convenience to a user. There can also be no exposed electrical contacts and no mechanical wear out, thereby improving reliability of the wireless power transfer system 100. Manipulations with cables and connectors may not be needed, and there can be no cables, plugs, or sockets that can be exposed to moisture and water in an outdoor environment, thereby improving safety. There can also be no sockets, cables, and plugs visible or accessible, thereby reducing potential vandalism of power charging devices. Further, since an electric vehicle 112 can be used as distributed storage devices to stabilize a power grid, a docking-to-grid solution can be used to increase availability of vehicles for Vehicle-to-Grid (V2G) operation.

A wireless power transfer system 100 as described with reference to FIG. 1 can also provide aesthetical and non-impedimental advantages. For example, there can be no charge columns and cables that can be impedimental for vehicles and/or pedestrians.

As a further explanation of the vehicle-to-grid capability, the wireless power transmit and receive capabilities can be configured to be reciprocal such that the base wireless charging system 102A transfers power to the electric vehicle 112 and the electric vehicle 112 transfers power to the base wireless charging system 102A e.g., in times of energy shortfall. This capability can be useful to stabilize the power distribution grid by allowing electric vehicles to contribute power to the overall distribution system in times of energy shortfall caused by over demand or shortfall in renewable energy production (e.g., wind or solar).

Figure 2:
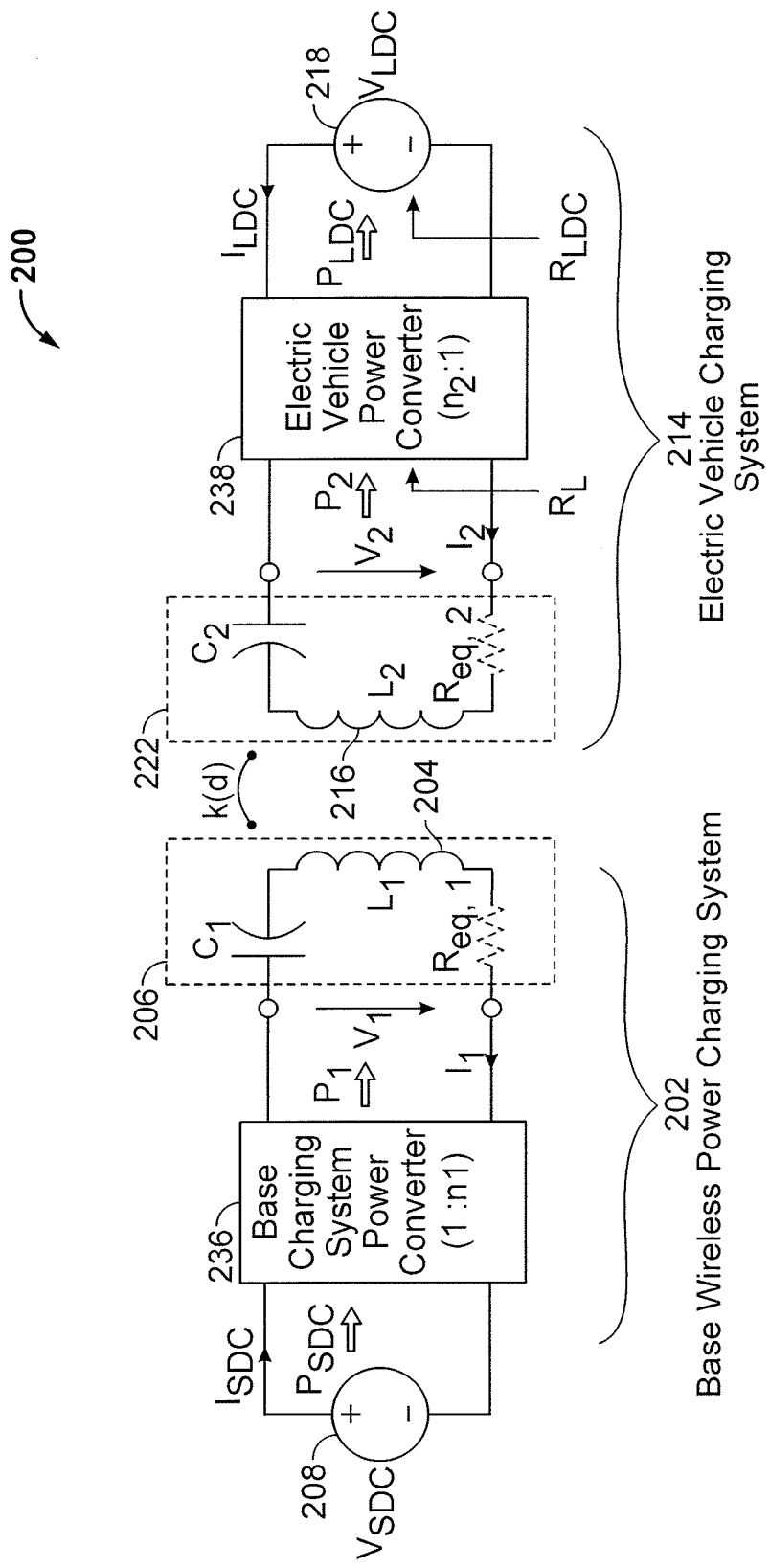
FIG. 2 illustrates a schematic diagram of exemplary core components of the wireless power transfer system of FIG. 1.

FIG. 2 is a schematic diagram of exemplary components of the wireless power transfer system 100 of FIG. 1. As shown in FIG. 2, the wireless power transfer system 200 can include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Implementations described herein can use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils can be used for the electric vehicle induction coil 216 and the base system induction coil 204. Using resonant structures for coupling energy can be referred to "magnetic coupled resonance," "electromagnetic coupled resonance," and/or "resonant induction." The operation of the wireless power transfer system 200 will be described based on power transfer from a base wireless charging system 202 to an electric vehicle 112, but is not limited thereto. For example, as discussed above, the electric vehicle 112 can transfer power to the base wireless charging system 102A.

With reference to FIG. 2, a power supply 208 (e.g., AC or DC) supplies power $P_{SDC}$ to the base wireless charging system 202 to transfer energy to an electric vehicle 112. The base wireless charging system 202 includes a base charging system power converter 236. The base charging system power converter 236 can include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ can be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 can be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 can be tuned to substantially the same frequencies and can be positioned within the near-field of an electromagnetic field transmitted by one of the base system induction coil 204 and the electric vehicle induction coil 116. In this case, the base system induction coil 204 and electric vehicle induction coil 116 can become coupled to one another such that power can be transferred to the electric vehicle receive circuit 222 including capacitor $C_2$ and electric vehicle induction coil 116. The capacitor $C_2$ can be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that can be inherent to the induction coils 204 and 216 and the anti-reactance capacitors $C_1$ and $C_2$. The electric vehicle receive circuit 222 including the electric vehicle induction coil 216 and capacitor $C_2$ receives power $P_2$ and provides the power $P_2$ to an electric vehicle power converter 238 of an electric vehicle charging system 214.

The electric vehicle power converter 238 can include, among other things, a LF/DC converter configured to convert power at an operating frequency back to DC power at a voltage level matched to the voltage level of an electric vehicle battery unit 218. The electric vehicle power converter 238 can provide the converted power $P_{LDC}$ to charge the electric vehicle battery unit 218. The power supply 208, base charging system power converter 236, and base system induction coil 204 can be stationary and located at a variety of locations as discussed above. The battery unit 218, electric vehicle power converter 238, and electric vehicle induction coil 216 can be included in an electric vehicle charging system 214 that is part of electric vehicle 112 or part of the battery pack (not shown). The electric vehicle charging system 214 can also be configured to provide power wirelessly through the electric vehicle induction coil 216 to the base wireless charging system 202 to feed power back to the grid. Each of the electric vehicle induction coil 216 and the base system induction coil 204 can act as transmit or receive induction coils based on the mode of operation.

While not shown, the wireless power transfer system 200 can include a load disconnect unit (LDU) to safely disconnect the electric vehicle battery unit 218 or the power supply 208 from the wireless power transfer system 200. For example, in case of an emergency or system failure, the LDU can be triggered to disconnect the load from the wireless power transfer system 200. The LDU can be provided in addition to a battery management system for managing charging to a battery, or it can be part of the battery management system.

Further, the electric vehicle charging system 214 can include switching circuitry (not shown) for selectively connecting and disconnecting the electric vehicle induction coil 216 to the electric vehicle power converter 238. Disconnecting the electric vehicle induction coil 216 can suspend charging and also can adjust the "load" as "seen" by the base wireless charging system 102A (acting as a transmitter), which can be used to "cloak" the electric vehicle charging system 114 (acting as the receiver) from the base wireless charging system 102A. The load changes can be detected if the transmitter includes the load sensing circuit. Accordingly, the transmitter, such as a base wireless charging system 202, can have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some implementations, the base system induction coil 204 and electric vehicle induction coil 116 are configured according to a mutual resonant relationship such that the resonant frequency of the electric vehicle induction coil 116 and the resonant frequency of the base system induction coil 204 are very close or substantially the same. Transmission losses between the base wireless charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode can be established between the transmit induction coil and the receive induction coil. The area around the induction coils where this near field coupling can occur is referred to herein as a near field coupling mode region.

While not shown, the base charging system power converter 236 and the electric vehicle power converter 238 can both include an oscillator, a driver circuit such as a power amplifier, a filter, and a matching circuit for efficient coupling with the wireless power induction coil. The oscillator can be configured to generate a desired frequency, which can be adjusted in response to an adjustment signal. The oscillator signal can be amplified by a power amplifier with an amplification amount responsive to control signals. The filter and matching circuit can be included to filter out harmonics or other unwanted frequencies and match the impedance of the power conversion module to the wireless power induction coil. The power converters 236 and 238 can also include a rectifier and switching circuitry to generate a suitable power output to charge the battery.

The electric vehicle induction coil 216 and base system induction coil 204 as described throughout the disclosed implementations can be referred to or configured as "loop" antennas, and more specifically, multi-turn loop antennas. The induction coils 204 and 216 can also be referred to herein or be configured as "magnetic" antennas. The term "coils" is intended to refer to a component that can wirelessly output or receive energy four coupling to another "coil." The coil can also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. As discussed above, coils 204 and 216 can be further configured to provide magnetic field signals at a different frequency and lower intensity level than for wireless power transmission to communicate with the electric vehicle 112 or base system 102A, respectively. Loop (e.g., multi-turn loop) antennas can be configured to include an air core or a physical core such as a ferrite core. An air core loop antenna can allow the placement of other components within the core area. Physical core antennas including ferromagnetic or ferromagnetic materials can allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy can be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency can be based on the inductance and capacitance of a transmit circuit including an induction coil (e.g., the base system induction coil 204) as described above. As shown in FIG. 2, inductance can generally be the inductance of the induction coil, whereas, capacitance can be added to the induction coil to create a resonant structure at a desired resonant frequency. As a non-limiting example, as shown in FIG. 2, a capacitor can be added in series with the induction coil to create a resonant circuit (e.g., the base system transmit circuit 206) that generates an electromagnetic field. Accordingly, for larger diameter induction coils, the value of capacitance needed to induce resonance can decrease as the diameter or inductance of the coil increases. Inductance can also depend on a number of turns of an induction coil. Furthermore, as the diameter of the induction coil increases, the efficient energy transfer area of the near field can increase. Other resonant circuits are possible. As another non limiting example, a capacitor can be placed in parallel between the two terminals of the induction coil (e.g., a parallel resonant circuit). Furthermore an induction coil can be designed to have a high quality (Q) factor to improve the resonance of the induction coil. For example, the Q factor can be 300 or greater.

As described above, according to some implementations, coupling power between two induction coils that are in the near field of one another is disclosed. As described above, the near field can correspond to a region around the induction coil in which electromagnetic fields exist but may not propagate or radiate away from the induction coil. Near-field coupling-mode regions can correspond to a volume that is near the physical volume of the induction coil, typically within a small fraction of the wavelength. According to some implementations, electromagnetic induction coils, such as single and multi-turn loop antennas, are used for both transmitting and receiving since magnetic near field amplitudes in practical implementations tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas can be used.

Figure 3A:
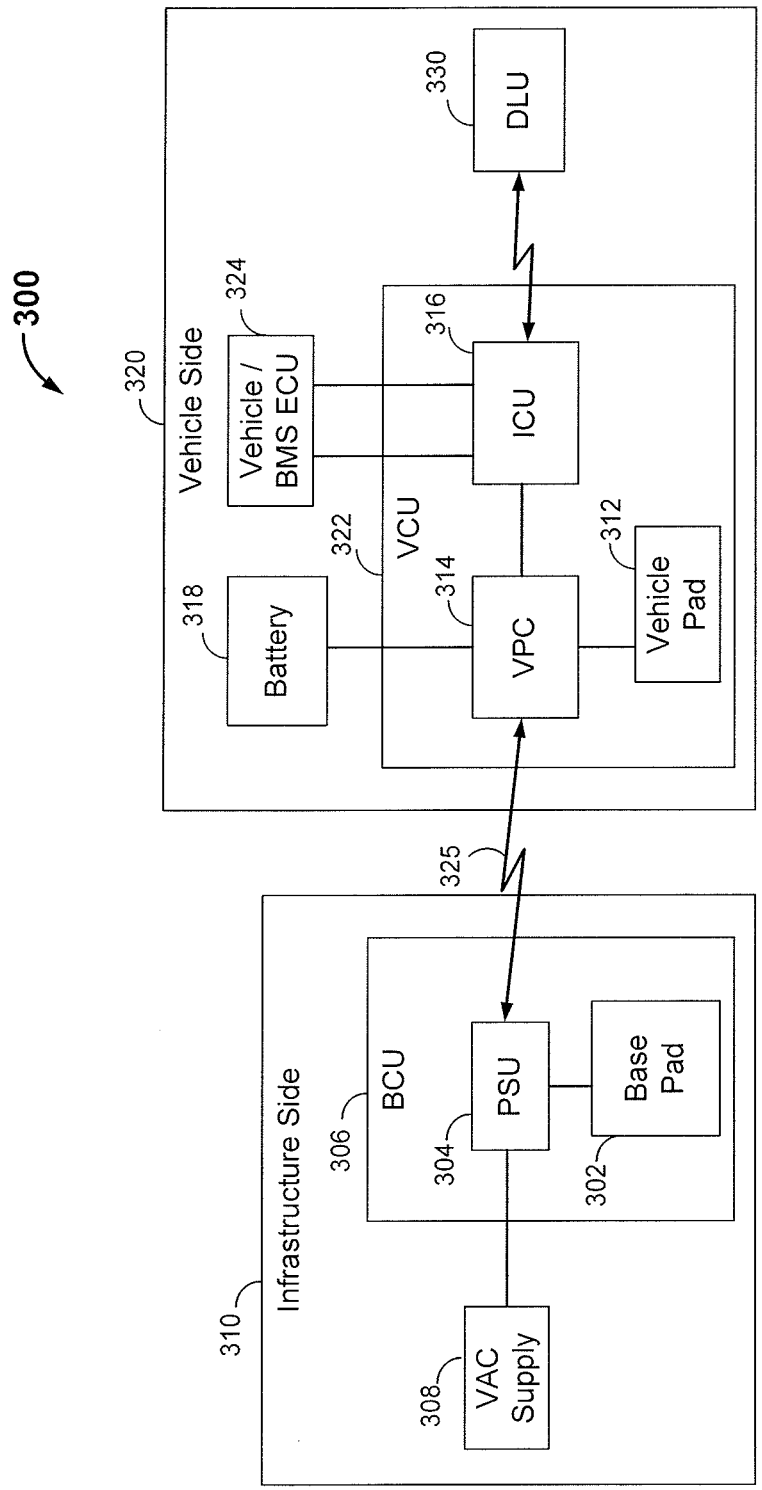
FIG. 3A is a functional block diagram that illustrates various components that can be utilized in the wireless power transfer system for charging an electric vehicle as shown in FIG. 1.

FIG. 3A is a functional block diagram that illustrates various components that can be utilized in the wireless power transfer system 300 for charging an electric vehicle as shown in FIG. 1. In some cases, the wireless power transfer system 300 may be referred to as a wireless electric vehicle charging (WEVC) system. The wireless power transfer system 300 can include a charging station segment 310 and a vehicle segment 320. The charging station segment 310 can include a power supply 308, and a base charging unit (BCU) 306. The power supply 308 can be an alternating current (AC) power supply, for example, and can provide any appropriate voltage (e.g., 220 VAC) to the BCU 306. The BCU 306 can include a power supply unit (PSU) 304 and a base pad 302. The PSU 304 can be connected to the power supply 308 and can provide power to the base pad 302. The base pad 302 can include the base magnetics structure configured to generate an electromagnetic field for wirelessly transferring power to the vehicle and any mechanical enclosure for protecting the base pad 302. The base pad 302 can include similar components to those describe above with respect to the base wireless charging system 102 and base system transmit circuit 206 of FIGS. 1 and 2.

The vehicle segment 320 can include a vehicle charging unit (VCU) 322, a vehicle battery 318, a vehicle or battery management system (BMS) engine control unit (ECU) 324 and a display and logging unit (DLU) 330. In various implementations, the vehicle can include one or more additional processors or controllers configured to interface with an interface control unit 316. In various implementations, units, controllers, and/or blocks described herein can be integrated into a single component, or can be separated into one or more separate components. The VCU 322 can further include a vehicle power controller (VPC) 314, an interface control unit (ICU) 316 and a vehicle pad 312. The VPC 314 can be communicatively coupled to the battery 318, the vehicle pad 312 and the ICU 316. The VPC 314 can integrate with the battery 318 and/or the BMS in order to charge the battery 318. The VPC 314 can control and regulate power flow between the charging station segment 310 and the battery 318. In addition, the VPC 314 can communicate with the BCU 306 utilizing a wireless connection 325, for example, a Bluetooth, zigbee, cellular, or other communication link. In various implementations, subsystems such as the VPC 314 and BCU 306 may not have a direct link to wireless radio. In various implementations, such subsystems can be configured to relay communications (for example, over a bus) to a communication module or radio interface. The vehicle pad 312 can be configured to receive wireless power via a magnetic field generated by the base pad 302. The vehicle pad 312 can include similar components to those describe above with respect to the electric vehicle induction coil 116 and the electric vehicle receive circuit 222 of FIGS. 1 and 2.

The ICU 316 can be communicatively coupled to the vehicle or BMS ECU 324 (e.g., via a controller area network (CAN) bus interface, a K-Line interface (ISO 9141), etc.) and the VPC 314. The ICU 316 can also be connected to a vehicle power supply (e.g., 12V battery). The ICU 316 can make decisions about the overall charging cycle (start charge/restart/stop charge) and fault handling. The ICU 316 can also communicate with a Living Object Protection (LOP) system (not shown) configured to detect moving/living objects, a Foreign Object Detection (FOD) system (not shown) configured to detect objects that can interfere with wireless charging, and/or any other system for detecting non-charging objects. The ICU 316 can also be connected to the DLU 330 for user interaction with the wireless power transfer system 300. In some implementations the ICU 316 and VPC 314 may be combined and/or implemented as a single controller. In some other implementations, the ICU 316 and the VPC 314 may be implemented as separate controllers.

The DLU 330 can be used as a user interaction interface that can be part of the vehicle head-end display, also called a human machine interface (HMI), and as a logging unit. The DLU 330 can include an in-dash vehicle display or a separate unit implemented in a device such as a smartphone. In aspects where the display unit is part of the vehicle in-dash display, the interaction between the VCU 322 (ICU 316) and the DLU 330 can take place over a CAN bus integration with the vehicle, or other communication link such as Bluetooth.

Figure 3B:
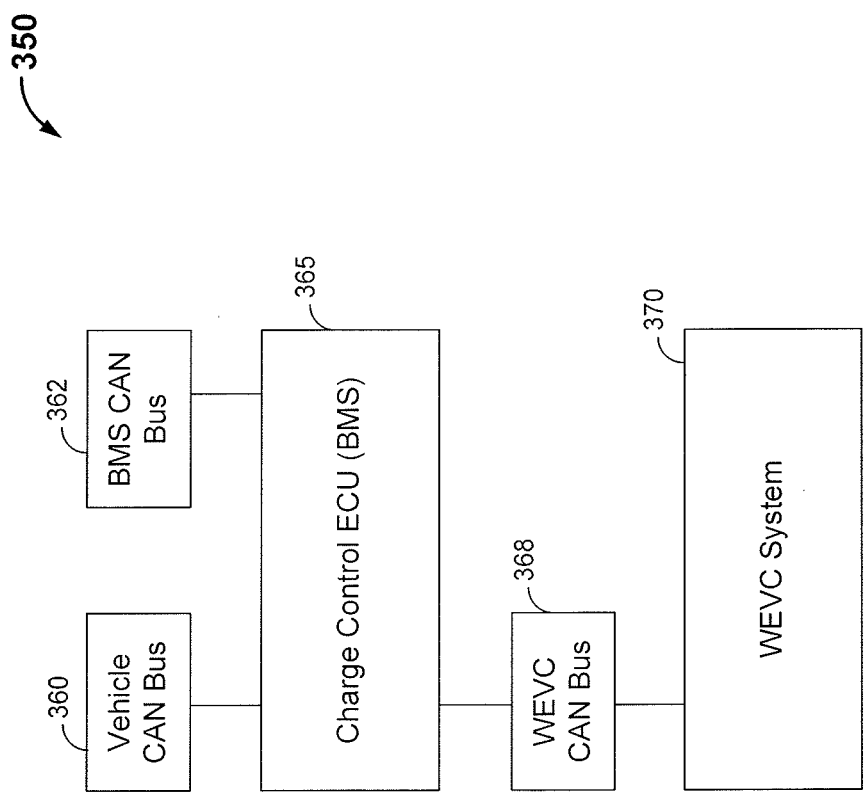
FIG. 3B is a functional block diagram that illustrates various components that can be used in a vehicle communication network.

FIG. 3B is a functional block diagram that illustrates various components that can be used in a vehicle communication network 350. In some aspects, the vehicle communication network 350 can be incorporated into the vehicle segment 320 of FIG. 3A. The vehicle communication network 350 can include a vehicle CAN bus 360 and a BMS CAN bus 362 each communicatively coupled to a charge control ECU (BMS) 365. The vehicle CAN bus 362 can provide the charge control ECU (BMS) 365 with vehicle information such as key entry, gear, parking brake status, speed, etc. The BMS CAN bus 362 can provide the charge control ECU (BMS) 365 with battery information such as battery status, charging status, etc. The charge control ECU (BMS) 365 receives the vehicle and battery information from the vehicle CAN bus 360 and the BMS CAN bus 362 and uses that information to control conductive (e.g., wired) or inductive (e.g., wireless) charging from the vehicle perspective. In some aspects, the charge control ECU (BMS) 365 can include the vehicle BMS ECU 324 of FIG. 3A. The charge control ECU 365 may communicate with the WEVC system 370 via a WEVC CAN bus 368. In some aspects, the WEVC System 370 may be a part of or correspond to portions of the VCU 322 described with reference to FIG. 3A.

In contrast to conductive (e.g., wired) charging systems, wireless charging systems can employ additional steps and/or processes for efficacy, safety, and convenience in vehicle charging. Wireless electric vehicle charging (WEVC) can employ magnetic coupling, increasing the desirability of proper alignment between the vehicle pad (e.g., vehicle pad 312) and the base pad (e.g., base pad 302) for the efficient power transfer. Accordingly, the vehicle communication network 350 can improve communication of vehicle charging information which can be passed to the charging station 310 or BCU 306.

Implementations described herein are directed at managing wireless charging functions in an electric vehicle. In particular, certain implementations are directed to providing a high-level interface (for example, to a human user or machine user agent) for managing various aspects of wireless electric vehicle charging. In some implementations, it can be beneficial for a user-interface to manage presentation of lower-level functions, errors, faults, etc.

FIGS. 4A-4E illustrate an exemplary scenario for wireless electric vehicle parking. FIG. 4A is a diagram of an electric vehicle 402 approaching a charging station 404 in a parking lot. In some implementations, the charging station can include a BCU 410 and a base pad 405. In FIG. 4A, the electric vehicle 402 approaches the charging station 404 but is not connected to the charging station 404.

FIG. 4B is a diagram of the electric vehicle 402 connecting to the charging station 404. In FIG. 4B, the electric vehicle 402 continues approaching the charging station 404 and connects to the charging station 404 or BCU 410 via a communication link 415. The communication link 415 can be any type of communication link (e.g., Bluetooth, zigbee, cellular, wireless local area network (WLAN), etc.). The electric vehicle 402 can connect to the charging station 404 via a controller, such as the VCU 322 of FIG. 3A.

FIG. 4C is a diagram of the electric vehicle 402 beginning an alignment phase with the charging station 404. In FIG. 4C, the electric vehicle 402 can begin parking and the VCU 322 can send a command to the BCU 410 to start/restart an alignment phase to align the electric vehicle 402 with the base pad 405. In some implementations, the start of the alignment phase can include the BCU 410 sending a command to the base pad 405 to generate a magnetic field for the vehicle 402 to sense and use for alignment.

FIG. 4D is a diagram of the electric vehicle 402 continuing parking and alignment with the charging station 404. In FIG. 4D, the electric vehicle 402 positions itself over the base pad 405 to align a vehicle pad of the electric vehicle 402 (e.g., vehicle pad 312) with the base pad 405. During the process, a driver of the electric vehicle 402 can view the alignment process on a display unit or human machine interface, for example, the DLU 330 of FIG. 3A. The DLU 330 can allow the driver to make steering or location adjustments to better align with the charging station 404.

FIG. 4E is a diagram of the electric vehicle 402 in a final parked position with the charging station 404. In FIG. 4E, the DLU 330 can indicate to the driver that the electric vehicle 402 is properly aligned with the base pad 405 and is ready to receive a charge from the base pad 405. In some aspects, the DLU 330 can indicate that the electric vehicle 402 is not aligned with the base pad 405 and the driver can need to re-position the electric vehicle 402.

Figure 5:
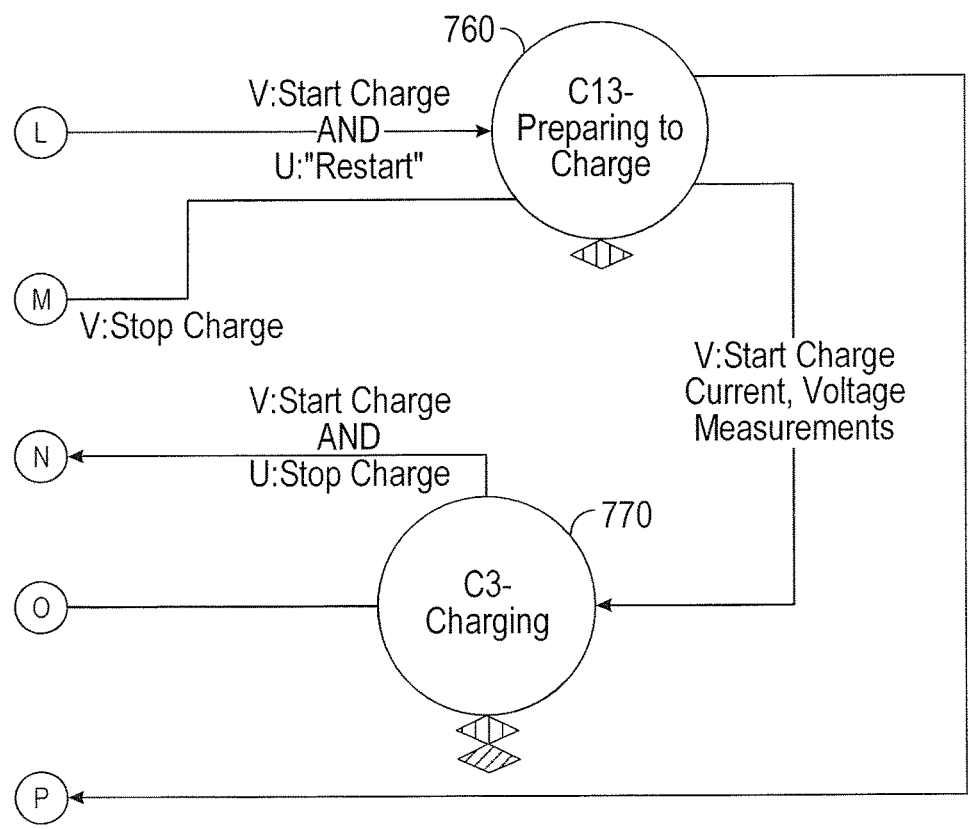
Figures 1, 8B:
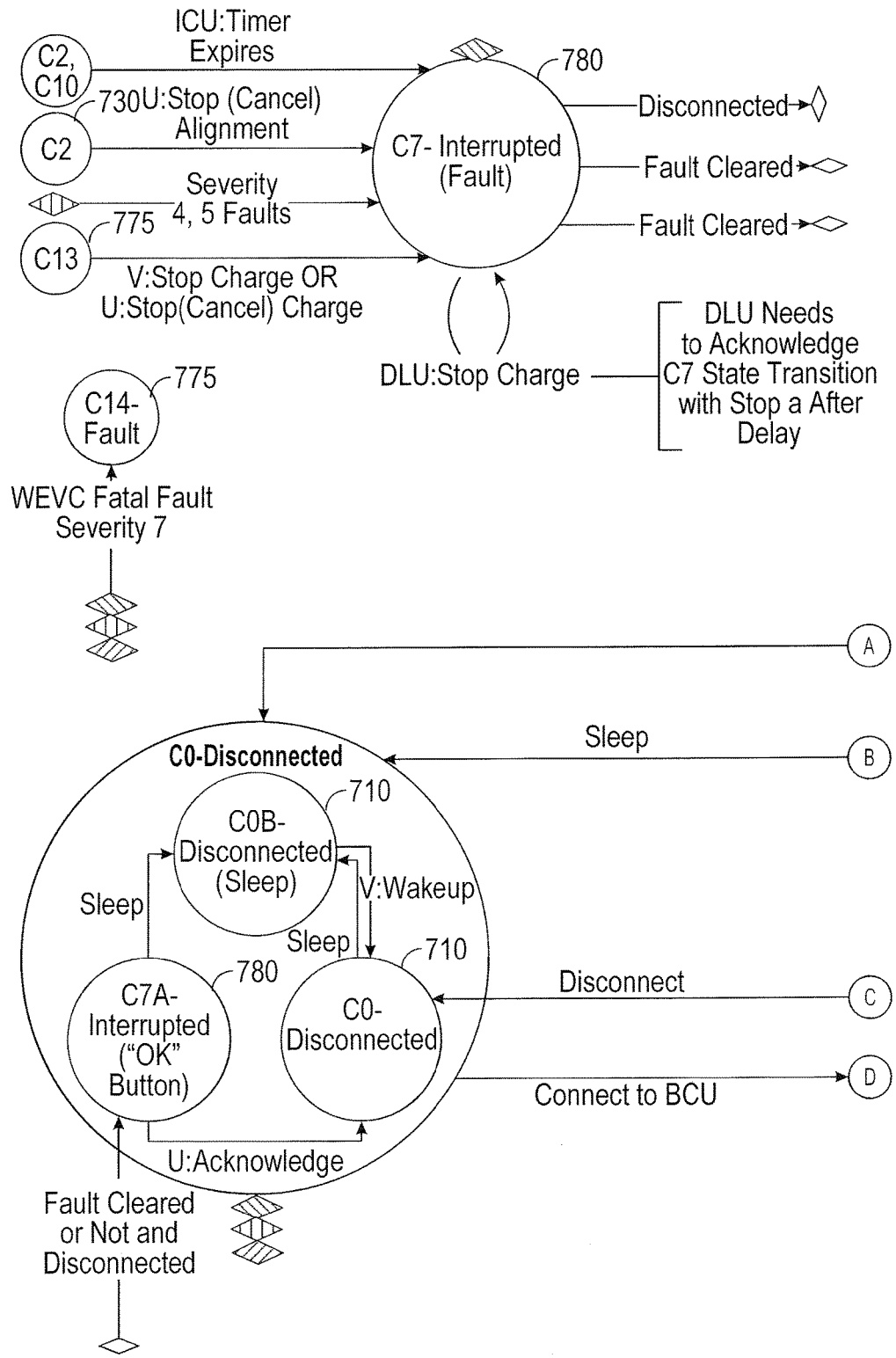
Figures 2, 8B:
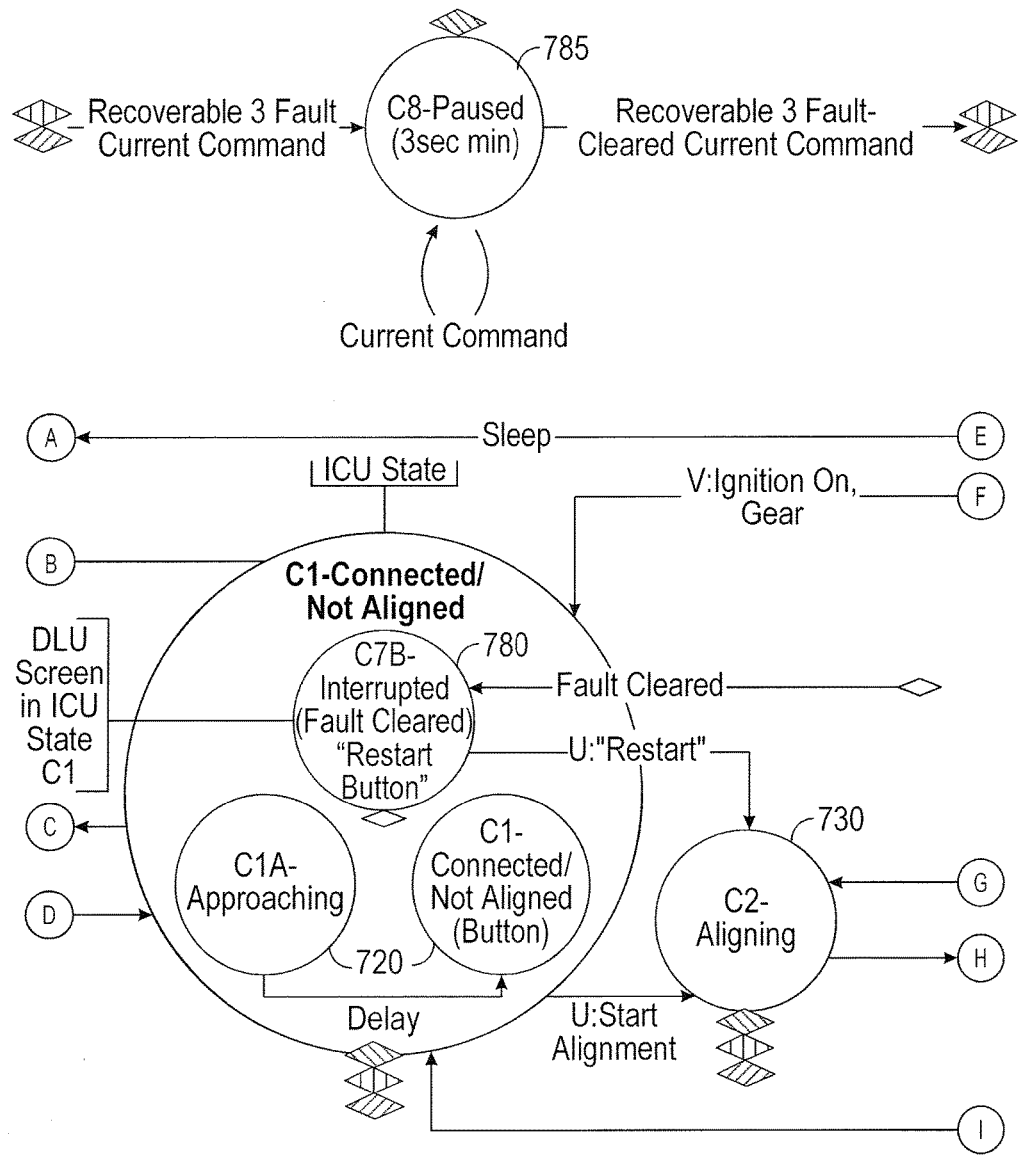
Figure 8B:
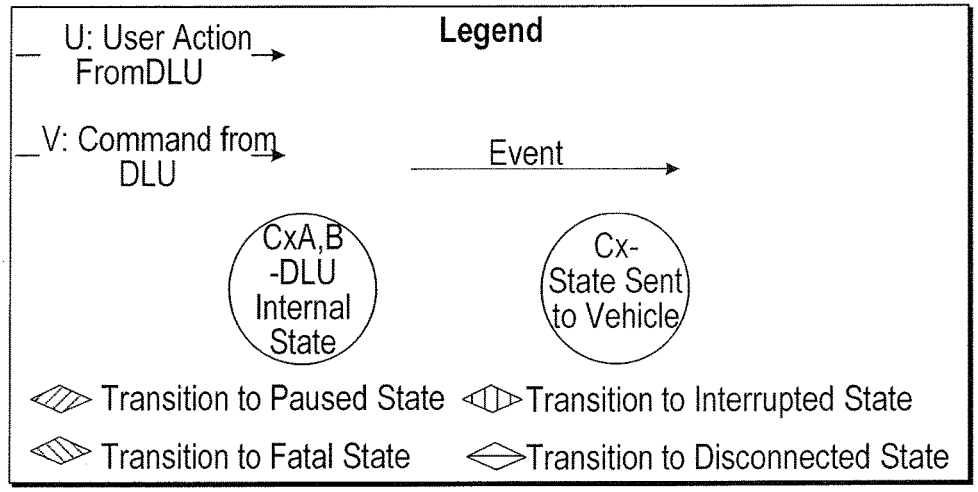
Figure 3:
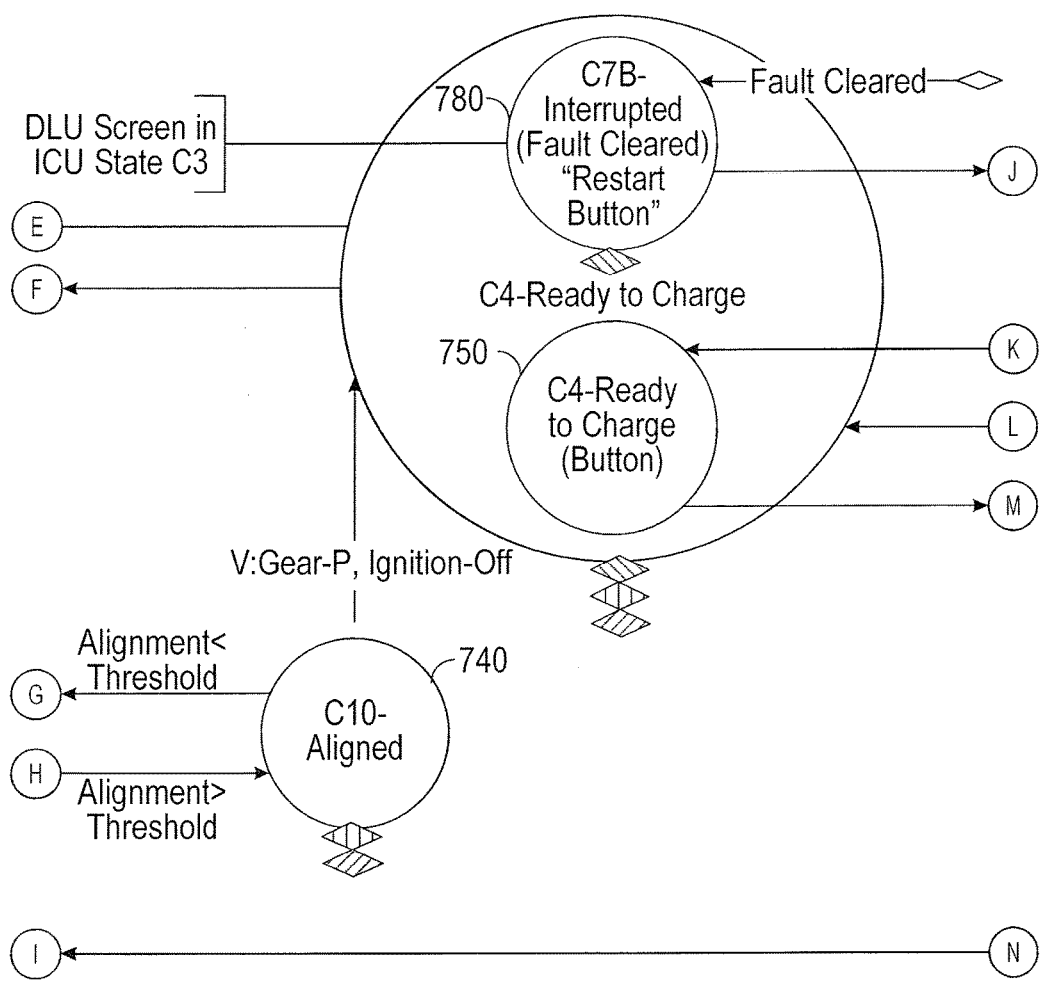
Figures 4, 8B:
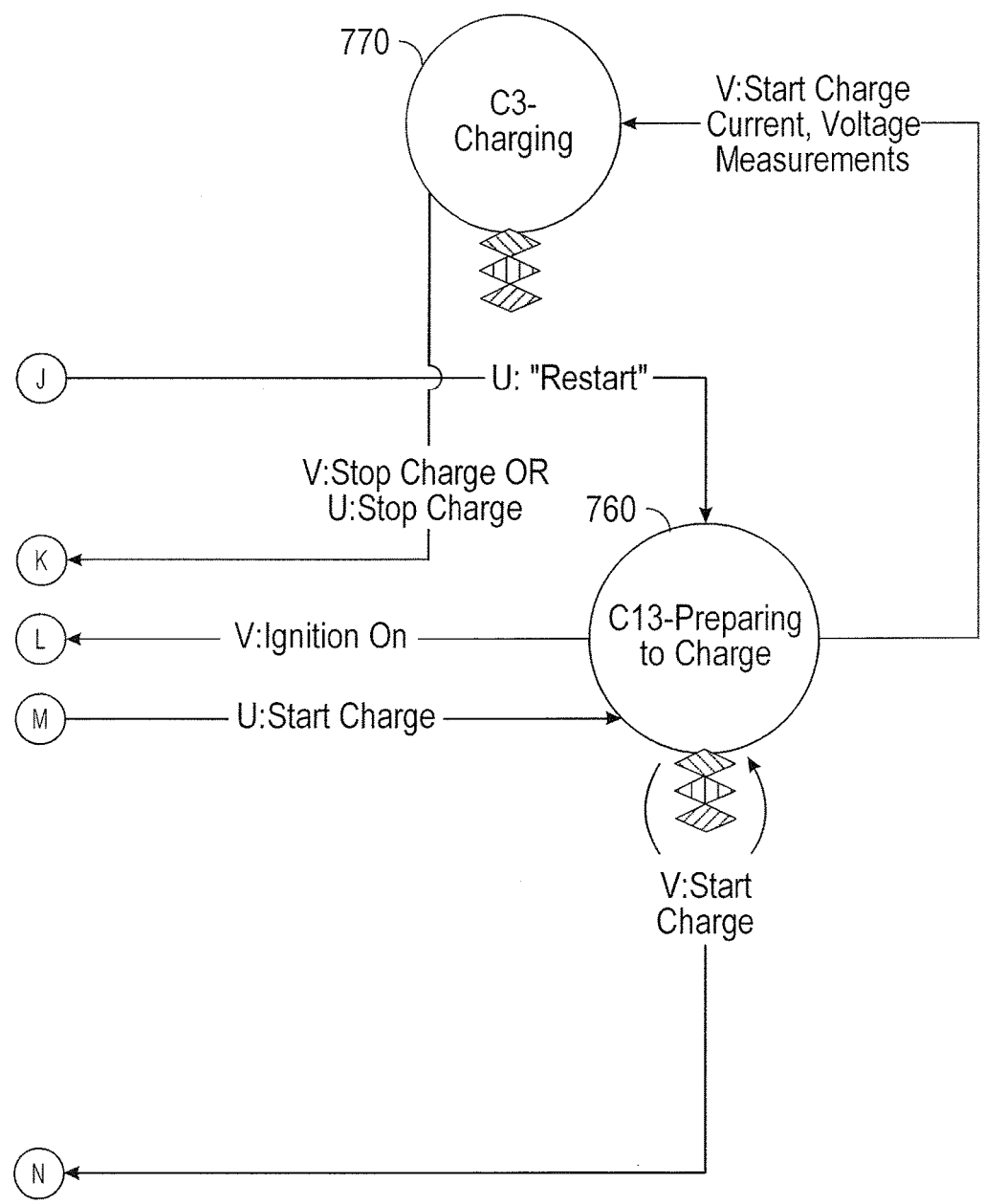

FIGS. 5A-5C illustrate an exemplary scenario for wireless electric vehicle charging. FIG. 5A is a diagram of the electric vehicle 402 in a final parked position with the charging station 404. The electric vehicle 402 and charging station 404 illustrated in FIGS. 5A-5C are similar to and adapted from the electric vehicle 402 and charging station 404 illustrated in FIGS. 4A-4E. Elements common to both share common reference indicia, and only differences between the figures are described herein for the sake of brevity. In FIG. 5A, the electric vehicle 402 in a final parked position, is properly aligned with the base pad 405, and is ready to receive a charge from the base pad 405.

FIG. 5B is a diagram of the electric vehicle 402 in a final parked position and beginning a charging process with the charging station 404. In FIG. 5B, the electric vehicle 402 initiates charging with base pad 405. In some implementations, the driver can initiate charging through the DLU 330 or other display unit. In other implementations, the VCU 322 or other controller can initiate charging. Once charging is initiated, the VCU 322 can engage the electric vehicle 402 battery (e.g., battery 318) and send a command to the BCU 410 to begin charging.

FIG. 5C is a diagram of the electric vehicle 402 battery charging with the charging station 404. In FIG. 5C, the BCU 410 can start/restart the charging process by sending a command to the base pad 405 to generate a magnetic field for power transfer. The vehicle pad 312 can then magnetically couple to the magnetic field and the VCU 322 can then charge the battery 318.

FIGS. 6A-6D illustrate an exemplary scenario for wireless electric vehicle object detection. As used herein, object detection can refer to LOD, FOD, and/or any other detection of non-charging objects. Moreover, techniques that are discussed herein with respect any particular form of object detection can also be employed with respect to any other form of object detection.

FIG. 6A is a diagram of the electric vehicle 402 battery charging with the charging station 404. The electric vehicle 402 and charging station 404 illustrated in FIGS. 6A-6D are similar to and adapted from the electric vehicle 402 and charging station 404 illustrated in FIGS. 5A-5C. Elements common to both share common reference indicia, and only differences between the figures are described herein for the sake of brevity.

FIG. 6B is a diagram of living objects 625 and a foreign object 630 near the electric vehicle 402 and charging station 404. The living objects 625 can include any living object such as people, dogs, cats, insects, etc. The foreign object 630 can include any inanimate object such as an aluminum can, pen, keys, metal object, etc. In FIG. 6B, the living objects 625 and the foreign object 630 are not located close enough to the electric vehicle 402 and charging station 404 to be detected.

FIG. 6C is a diagram of living objects 625 and the foreign object 630 near the electric vehicle 402 and charging station 404. In FIG. 6C, a living object protection (LOP) unit or a foreign object detection (FOD) unit in the electric vehicle 402 or charging station 404 can detect the living objects 625 and the foreign object 630 and interrupt the charging process to avoid any harmful exposure to the living objects 625 or overheating to the charging system. In various implementations, charge interruption can trigger one or more fault states and/or severity levels, which can be presented to the user according to various implementations discussed herein (for example, with respect to Table 1, FIG. 13, and FIGS. 14A-14E). In various implementations, fault states shown in various state diagrams herein can correspond with severity levels such as those shown below in Table 1. In various implementations, the correspondence can be one-to-one, one-to-many, etc. For example, although certain severity levels are shown herein leading to a common fault state in a state diagram, in other implementations, each severity level can be implemented with an individual fault state in the state diagram.

FIG. 6D, is a diagram of the foreign object 630 located on the base pad 405. In FIG. 6D, the FOD of the base pad 405 can be triggered and the FOD can determine whether the foreign object 630 is a chargeable device. The FOD of the base pad 405 can also perform this analysis when the electric vehicle 402 is located over the base pad 405.

Figure 7A:
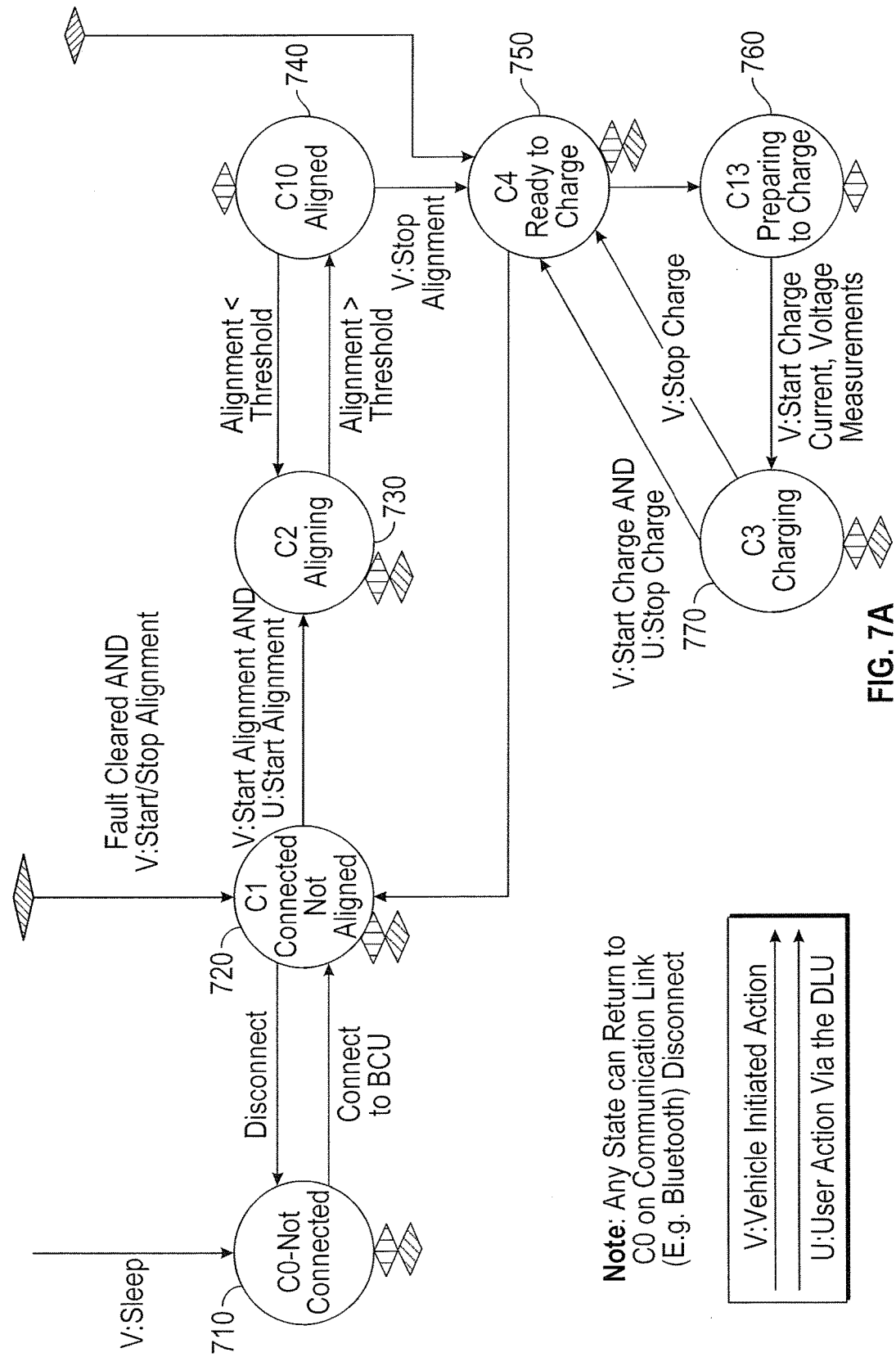
FIGS. 7A-7C are state diagrams showing state transitions in an exemplary wireless power transfer system, in accordance with some exemplary implementations.

FIG. 7A is a state diagram showing state transitions for the VCU 322 in an exemplary wireless power transfer system, in accordance with some exemplary implementations. In some aspects, the exemplary wireless power transfer system can include the wireless power transfer system 300 of FIG. 3A. In various implementations, the state diagram of FIG. 7A can be implemented by the ICU 316, one or more processors in conjunction with a memory, and/or any other programmable controller or hard-coded logic block. The VCU 322 states can include a "C0—Not Connected" state 710, a "C1—Connected Not Aligned" state 720, a "C2—Aligning" state 730, a "C10—Aligned" state 740, a "C4—Ready To Charge" state 750, a "C13—Preparing To Charge" state 760, and a "C3—Charging" state 770.

As shown in FIG. 7A, a V: can denote an action or state presented or initiated by the vehicle (for example, the BMS ECU 324), while a U: an can denote action or state presented by a user (for example, through the DLU 330). As used herein, user can include a human user and/or a machine user agent such as, for example, an automated system, computer program, etc. In various implementations, user actions can be received or generated at the DLU 330, and can be communicated to the ICU 316.

In various implementations, the VCU 322 can transition from any state to the first, C0 state 710 upon disconnect of the wireless (e.g., Bluetooth) connection between the VCU 322 on the vehicle side and the BCU 306 on the charging station side. The vehicle controller (e.g., VCU 322) can be in the "C0—Not Connected" state 710 while an electric vehicle (e.g., 402) is driving or while the electric vehicle 402 is stationary (e.g., parked position) and not connected to a charging station (e.g., charging station 310 or BCU 306). In some implementations, the electric vehicle 402 can implement a system to put the VCU 322 in a sleep state, based on the electric vehicle 402 state like speed, parked state, distance traveled etc. In some implementations, the "C0—Not Connected" state 710 can be similar to the electric vehicle 402 position illustrated in FIG. 4A as described above. As will be described in greater detail herein, in various implementations, the VCU 322 can enter a paused state, an interrupted state, and/or a fatal fault state (or severity level) while in the "C0—Not Connected" state 710. In various implementations, the VCU 322 can transition to the "C1—Connected Not Aligned" state 720 when the VCU 322 connects to the charging station 310 through the BCU 306 via a communication link.

In the "C1—Connected Not Aligned" state 720, the VCU 322 and BCU 306 can share charging information (e.g., battery charge level, etc.). From this state, the alignment with a charging station 404 can commence. In this state, there can be user interaction via the DLU 330. In some aspects, the electric vehicle 402 can receive user input (via the DLU 330) to initiate the alignment process (for example, a "Start Alignment" command). In some aspects, the electric vehicle 402 can start/restart the alignment process on its own. In some implementations, the VCU 322 may only start alignment when it receives a "Start Alignment" instruction from both the vehicle and user.

In some implementations, the "C1—Connected Not Aligned" state 720 can be similar to the electric vehicle 402 position illustrated in FIG. 4B as described above. As will be described in greater detail herein, in various implementations, the VCU 322 can enter a paused state, an interrupted state, and/or a fatal (or severity level) while in the "C1—Connected Not Aligned" state 720. In various implementations, the VCU 322 can transition to the "C2—Aligning" state 730 when the VCU 322 determines that it should start alignment with the charging station 310, if the driver of the electric vehicle 402 determines it should start alignment, or if both the VCU 322 and the user determine the electric vehicle 402 should start alignment with the charging station 310.

In the "C2—Aligning" state 730, the electric vehicle 402 can instruct the VCU 322 to start an alignment procedure, which can include an alignment animation screen on the DLU 330. During the "C2—Aligning" state 730, the VCU 322 can report an alignment score to the DLU 330 and the electric vehicle 402. In some implementations, the "C2—Aligning" state 730 can be similar to the electric vehicle 402 positions illustrated in FIGS. 4C and 4D as described above. As will be described in greater detail herein, in various implementations, the VCU 322 can enter a paused state, an interrupted state, and/or a fatal fault state (or severity level) while in the "C2—Aligning" state 730. The VCU 322 can then transition to the "C10—Aligned" state 740 if during the "C2—Aligning" state 730 the alignment score satisfies a certain threshold.

In some implementations, the alignment score can be based on a degree of magnetic coupling between the vehicle pad 312 and the base pad 302. In some aspects, the alignment score can be based the location of the vehicle pad 312 in relation to the base pad 302. In some implementations, the DLU 330 can show that the vehicle pad 312 is aligned with the base pad 302. When the alignment score satisfies a certain threshold, the VCU 322 can interpret the result to mean that the vehicle pad 312 and the base pad 302 are aligned for efficient wireless power transfer and can transition to the "C10—Aligned" state 740.

In some implementations, the "C10—Aligned" state 740 can be similar to the electric vehicle 402 position illustrated in FIG. 4E as described above. Once in the "C10—Aligned" state 740, the VCU 322 can receive a signal from the vehicle 402 to stop alignment. In some aspects, the signal can be the driver removing the key from the ignition or setting a gear to park. As will be described in greater detail herein, in various implementations, the VCU 322 can enter an interrupted state, and/or a fatal fault state (or severity level) while in the "C10—Aligned" state 740. The VCU 322 can then transition to the "C4—Ready To Charge" state 750 after receiving the stop alignment signal.

In various implementations, when in the "C4—Ready To Charge" state 750, the VCU 322 awaits a command to charge. In some aspects, the DLU 330 can show a ready to charge screen with an option to start/restart charging. In some implementations, the VCU 322 can wait for a command from the user to charge (e.g., via the DLU 330) or the VCU 322 can determine to start charging on its own, or VCU 322 can require both a driver input and a VCU 322 determination to start charging in order transition to the "C13—Preparing To Charge" state 760. If the electric vehicle 402 moves away from the base pad 302 or is out of alignment, the VCU can transition back to the "C1—Connected Not Aligned" state 720. As will be described in greater detail herein, in various implementations, the VCU 322 can enter a paused state, an interrupted state, and/or a fatal fault state (or severity level) while in the "C4—Ready To Charge" state 750.

In the "C13—Preparing To Charge" state 760, once the user instructs charge and vehicle is ready to charge, the VCU 322 can start/restart the charging process. In this state, VCU 322 and BCU 306 can go through preparation stages such as exchanging charging information and powering up. As will be described in greater detail herein, in various implementations, the VCU 322 can enter an interrupted state, and/or a fatal fault state (or severity level) while in the "C13—Preparing To Charge" state 760. Once the "C13—Preparing To Charge" state 760 is complete, the VCU 322 can transition to the "C3—Charging" state 770.

In the "C3—Charging" state 770, the VCU 322 can report instantaneous charging parameters (e.g., voltage, current, etc.) to the vehicle and DLU 330 for showing charging progress. If during the "C3—Charging" state 770 the VCU 322 receives a stop charging command from the vehicle or user, the VCU 322 can transition to the "C4—Ready To Charge" state 750 and await further input. As will be described in greater detail herein, in various implementations, the VCU 322 can enter a paused state, an interrupted state, and/or a fatal fault state (or severity level) while in the "C3—Charging" state 770.

In some implementations, regardless of the state, the VCU 322 can receive a stop alignment command or a stop charge command. The VCU 322 can continue to receive such stop alignment command or stop charge command for a period of time. In some aspects, once the period of time of receiving stop commands reaches a threshold, and the stop commands are still being sent to the VCU 322, the VCU 322 can automatically enter into a low power mode (a particular sleep level). In this low power mode, the VCU 322 can, at a later time, transition out of the low power mode when a start command (e.g., start aligning, start charge, etc.) is received or enter a deep sleep and/or power off state if a sleep command is received.

Figure 7B:
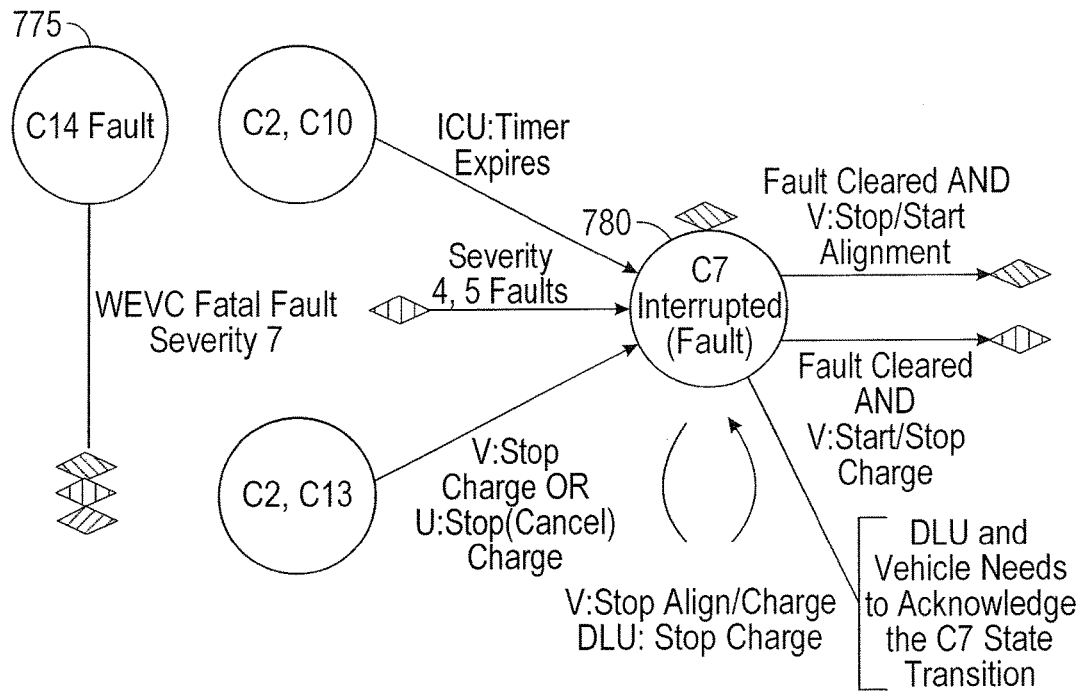
Figure 7C:
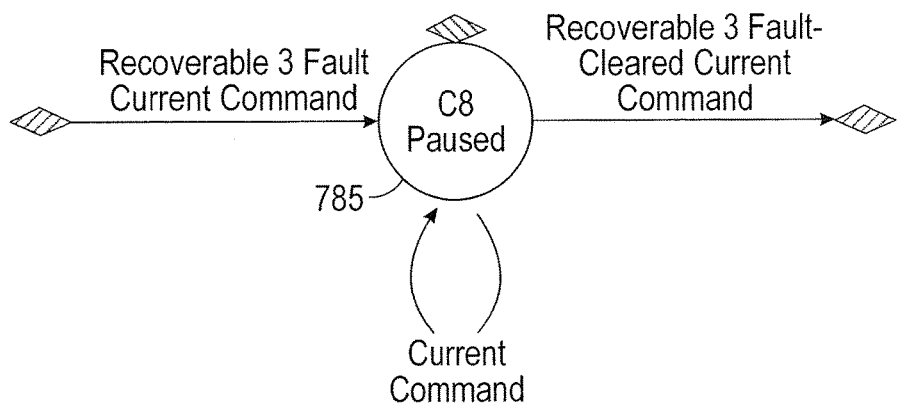

FIGS. 7B-7C are state diagrams showing fault state transitions for a vehicle controller in an exemplary wireless power transfer system, in accordance with some exemplary implementations. In some aspects, the exemplary wireless power transfer system can include the wireless power transfer system 300 of FIG. 3A. The vehicle controller states in FIG. 7B can include a "C14—Fault" state 775 and a "C7—Interrupted" (fault) state 780. The vehicle controller states in FIG. 7C can include a "C8—Paused" state 785. The VCU 322 can enter the "C14—Fault" state 775 when it experiences a fault that is unrecoverable in any of the VCU 322 states.

In some aspects, the VCU 322 can move the DLU 330 to this state to notify the user of the fault. Faults can have different severity levels such as, for example, fatal (or service required), critical/user interventions required, recoverable, user action, slow recovery, informational/warning, or other designation. In various implementations, fault severity can escalate to higher fault levels, for example due to repeated occurrence. As shown below, Table 1 shows exemplary fault severities and accompanying actions.

TABLE 1

| Level | Name | Action |
| --- | --- | --- |
| 0 | No Error | None or No Error |
| 1 | Info/Warn | Provide information or warning to user to optionally be displayed to a user without system interruption. |

TABLE 1-continued

| Level | Name | Action |
| --- | --- | --- |
| 2 | Fast Recovery | Recover without providing user notification. For example, restart/unpause within 3 seconds. |
| 3 | Slow Recovery | Recover and provide user notification. For example, display a message to use that system is paused and recovering from a fault and restart/unpause after 3 seconds. |
| 4 | User Action | Wait for user intervention. For example, display a message to use that system is paused and recovering from a fault and wait for the user to respond, press a button to resume, etc. |
| 5 | Critical | Provide user notification of critical fault, for example, where user response will not cause the VCU 322 to restart the pending state. |
| 6 | Reserved | Reserved |
| 7 | Fatal | Fatal, for example where nothing more can be done. In various implementations, includes hardware failures and potential hardware failures |

The VCU 322 can enter the "C7—Interrupted" (fault) state 780 when there is interruption of charging due to LOP triggers or FOD triggers or any other software or hardware fault, VCU 322 stops the charging or alignment process. The interruption can occur in any state. In some aspects, the DLU 330 can show a screen with the appropriate message and can have an option to restart previous activity. In some implementations, the VCU 322 can wait for the DLU 330 and/or the vehicle to acknowledge the "C7—Interrupted" (fault) state 780 in order to clear the fault and transition to another state. The VCU 322 can enter the "C8—Paused" state 785 when there is interruption in a state due to transient faults. The VCU 322 can pause the activity and the DLU 330 can display information about the interruption. Once the fault is recovered or cleared, the VCU 322 can automatically resume the previous activity.

In some implementations, the fault severities described above allow for a much larger number of internal faults to be mapped to just one of the fault severities. For example, internal faults that may be mapped to fault severities may include faults such as: software loading errors, internal memory failures, foreign object detection system reset and operation, fan errors, current or voltage values exceeding one or more thresholds, mains frequency incompatibilities, coil tuning errors, one or more temperatures exceeding thresholds, foreign or living objects detected, communications errors, firmware failures, vehicle battery brown-outs or low levels, hardline communication faults, alignment problems, and the like. Some of these faults may include faults from the infrastructure side 310 (including the BCU 306, VAC supply 308, PSU 304, and/or the base pad 302), which can be propagated through the VCU 322 during operation. While all these faults may be logged and handled differently by the VCU 322, the VCU 322 may map each fault to a severity level and base any communications and/or interaction with the vehicle/user based on the severity level. As described above, this may allow for controlling what information is reported to the user to allow, in certain cases, the user not to have to specifically know details of faults the user has no control over and to improve the user experience. In addition, the upstream system such as a DLU 330 may be able to take action based on a severity level without having to have knowledge of the specific fault to allow for better user experience.

In addition, in certain implementations the system may require at least some acknowledgment by an upstream system (e.g., the DLU 330) for any fault to allow continuing on when the fault is recovered. This may allow the vehicle to always have full control over the charging system regardless of the fault. While the DLU 330 may automatically acknowledge the fault, the VCU 322 is required to wait at least until the acknowledgment from the DLU 330 before clearing the fault.

As shown below, Table 2 shows the mapping of the VCU 322 state to either vehicle or user interaction, according to various implementations.

TABLE 2

| State | User interaction required | Sleep/wake implementation | Vehicle command to VCU |
|---|---|---|---|
| C0: Not-Connected | No | Yes. | Stop Alignment/Charge - repeated |
| C1: Connected | Yes. Start Alignment | Yes | From "Stop Alignment/Charge" to "Start Alignment" |
| C2: Aligning | Yes. Cancel or Stop Alignment | No | Start Alignment |
| C10: Aligned | No | No | from "Start Alignment" to "Stop Alignment" |
| C4: Ready to Charge | Yes. Start Charge | Yes | from "Stop Alignment" to "Start Charge" |
| C13: Preparing to Charge | Yes. Cancel Charge | No | "Start Charge" |
| C3: Charging | Yes. Stop Charge | No | "Start Charge" |
| C7: Interrupted | Yes. Restart Activity (Charge or Alignment) | Yes | Acknowledge with "Stop Alignment/Charge" if in Alignment or Charge, else continue previous command |
| C8: Paused | No. | No | Continue previous command |
| C14: Fault | No. | Yes | Stop Alignment/Charge |

Likewise, as shown below, Table 3 shows various exemplary electric vehicle 402 interactions with the VCU 322 based on a state of the VCU 322, according to various implementations.

TABLE 3

| From State | To State | Vehicle Action | Comments |
|---|---|---|---|
| C0 | C1 | Start Align | |
| C1 | C2 | Start Align | |
| C2 | C10 | Stop Align | After vehicle has been parked, key removed, parking brake, etc. |
| C10 | C4 | Start Charge | |
| C4 | C13 | Start Charge | |
| C13 | C3 | Start Charge | |
| | C3 | Stop Charge | When charge complete, or when vehicle does not need to charge |
| C3 | C4 | Stop Charge | |
| Any State | C7 | Stop Align/Charge | Acknowledge Fault state, with Stop Align if current command Start Align or Stop Charge if current command is Start Charge |
| | C7 | Start Charge/Align | Once the fault is cleared, to resume to Aligning related state if state transitions to C0 or C1 or to resume to Charging related state if state transitions to C4 |
| Any State | C0 | Stop Charge/Align | |

In some implementations, the commands described above in connection with the various vehicle and VCU states with respect to FIGS. 7, 8A1-8A5, and 8B1-8B4 can be implemented in a communication interface. In some aspects, the communication interface can allow communication between the electric vehicle 402 and the VCU 322 (e.g., via the connection 325 shown in FIG. 3A). In some aspects, the communication interface can allow communication between the electric vehicle 402 or VCU 322 and the BCU 306. In some aspects, the communication interface can be an application programming interface (API). In some aspects, the VCU 322 can receive the commands (e.g., start charge/align, stop charge/align, sleep/wake, etc.) via the communication interface from the electric vehicle 402. The VCU 322 can then perform the functions associated with the commands. In some aspects, the BCU 306 can receive the commands (e.g., start charge/align, stop charge/align, sleep/wake, etc.) via the communication interface from the vehicle 402 or the VCU 322. The BCU 306 can then perform the functions associated with the commands.

FIGS. 8A1-8A5 and 8B1-8B5 are state diagram showing state transitions in an exemplary wireless power transfer system, in accordance with another exemplary implementation. FIGS. 8A1-8A5 and 8B1-8B5 are similar to FIGS. 7A-7C, and show additional or alternative state transitions, user inputs, vehicle inputs, and/or fault states. In particular, FIGS. 8A1-8A5 and 8B1-8B4 show various state transitions within the "C0—Not Connected" state 710, the "C1—Connected Not Aligned" state 720, and the "C4—Ready To Charge" state 750, discussed above with respect to FIG. 7A.

As shown in FIGS. 8A1-8A5 and 8B1-8B5, various states can be associated with user notification and/or input preconditions. For example, a "C7A—Interrupted" state can include a user notification including an "OK" button (see, for example, FIG. 14B). In the "C7A—Interrupted" state, the ICU 316 can wait for user acknowledgement from the DLU 330 before proceeding to the next state. Similarly, a "C7B—Interrupted" state, can include a user notification including a "Restart" button (see, for example, FIG. 14C). In the "C7B—Interrupted" state, the ICU 316 can wait for user acknowledgement from the DLU 330 before proceeding to the next state.

Various states, including a "C1B—Alignment Off" state and a "C4A—Charge Off" state can include a notification with no input button (see, for example, FIG. 14E). In contrast, a "C1—Connected/Not Aligned" state and a "C4—Ready to Charge" state can include a user notification including an input button (see, for example, FIG. 14B). In the "C1—Connected/Not Aligned" state, the ICU 316 can wait for user acknowledgement from the DLU 330 before proceeding to the next state.

Figure 9:
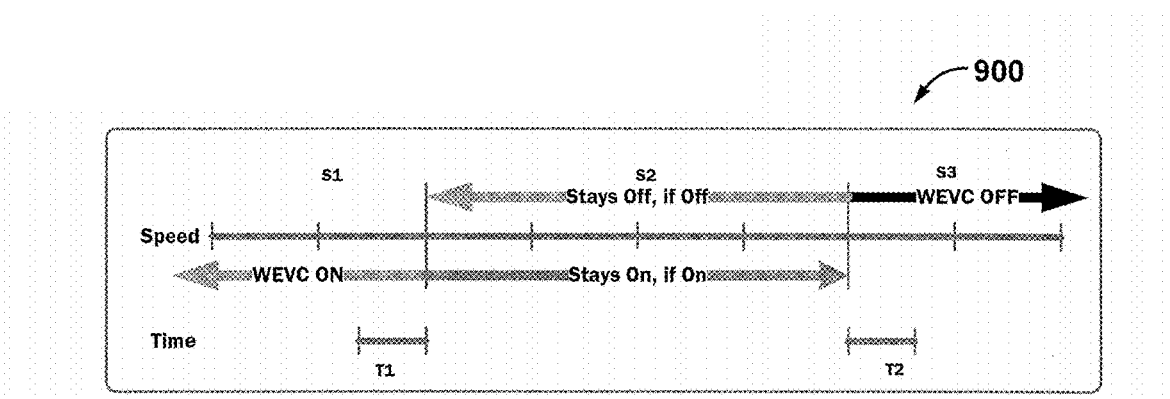
FIG. 9 shows a chart for enabling and disabling a WEVC system of a vehicle in a drive mode.

FIG. 9 shows a chart 900 for enabling and disabling a WEVC system of a vehicle (e.g., vehicle side portion 320 of FIG. 3A) in a drive mode. For example, while in a drive mode, the WEVC system may be enabled to search for the BCU 306, based at least in part on the following criteria. When moving at a speed below a low speed threshold as shown by the portion S1 (e.g., 20 km/hr) for a period of time (e.g., T1 seconds) the WEVC system may be enabled (e.g., transitioned out of a sleep mode). When the vehicle is moving at a speed greater than a high speed threshold as shown by the position S3 (e.g., 30 km/hr) for a period of time (e.g., T2 seconds) the WEVC system may be disabled (e.g., transitioned into a sleep mode). If the speed of the vehicle is between the low and high speed thresholds as shown by the position T2, the system may maintain its previous state. In this way, the system is enabled or disabled utilizing one or both of a speed hysteresis and a time hysteresis. This may prevent undesirably frequent on/off cycling of the system.

Figure 10:
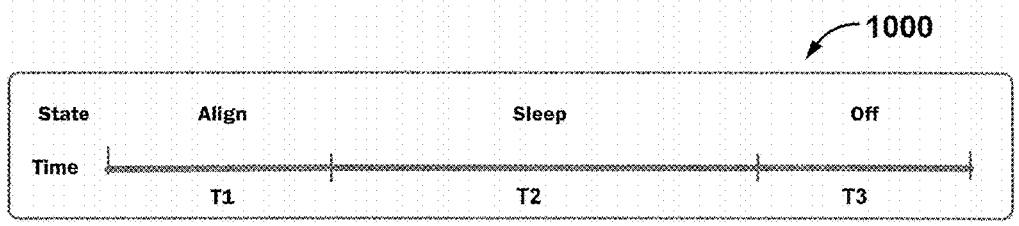
FIG. 10 shows a diagram for enabling and disabling a WEVC system of a vehicle based on a dual-stage timer, in accordance with some exemplary implementations.

FIG. 10 shows a diagram 1000 for enabling and disabling a WEVC system of a vehicle based on a dual-stage timer, in accordance with some exemplary implementations. When the vehicle is aligned or aligning, a user intention to charge the vehicle may be assumed. However, the charging process may not begin immediately. In such a case, when the vehicle is aligned or aligning a two stage WEVC system disable timer may be used to provide a better user experience. The user may initiate the charge session within a first stage T1 of the timer (e.g., a first 5 minutes of the timer), in which case the charge session may begin immediately. During or after the second stage T2 of the timer (e.g., a second 5 minutes of the timer), the WEVC system may transition to a sleep mode to conserve power. If a charging session is begun during the T2 sleep mode the charging session may begin after a slight delay as a validation of readiness to charge may need to be completed (e.g., the WEVC system may first need to transition out of the sleep mode). If no charge is requested during the T1 or T2 stages, the vehicle may disable the WEVC system in a third stage T3 (e.g., after the expiration of the T2 stage).

Figure 11:
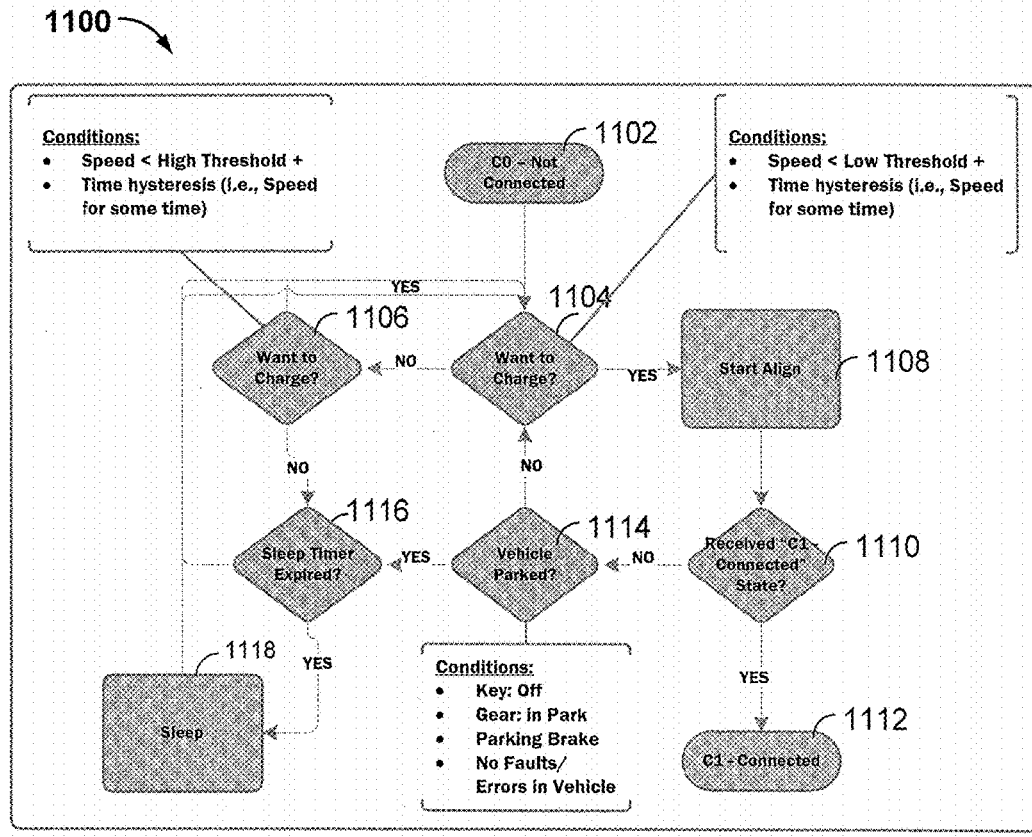
FIG. 11 shows a flowchart for enabling and disabling a WEVC system when in a drive mode and/or when not connected, in accordance with some exemplary implementations.

FIG. 11 shows a flowchart 1100 for enabling and disabling a WEVC system (e.g., the vehicle side portion 320 of FIG. 3A) when in a drive mode and/or when not connected, in accordance with some exemplary implementations. The flowchart 1100 may begin at block 1102 where the WEVC system is in the C0—Not connected state. The flowchart 1100 may advance to block 1104, where it is determined whether charging is desired. The conditions for determining that charging is desired may include but are not limited to the vehicle speed being below the low threshold for at least a threshold amount of time as described above, that the vehicle is indicated as being parked, and/or that the WEVC system has transitioned from a sleep state to an awake state. In addition, in some implementations, a distance traveled by the vehicle above or below any one of the above-mentioned thresholds may also be utilized to make such a determination. For example, a vehicle sensor may directly measure distance traveled, may utilize several velocity measurements at successive timeframes to determine the distance traveled, or may utilize acceleration measurements at successive timeframes to determine the distance. If the determination is no, the flowchart may advance to block 1106. If the determination is yes, the flowchart may advance to block 1108 where alignment may begin. The flowchart may then move to block 1110 where a determination is made as to whether the "C1—Connected State" is received. If the determination is no the flowchart may advance to block 1114. If the determination is yes, the flowchart may advance to block 1112 where the state is modified to the C1-Connected state.

Turning back to block 1114, a determination is made as to whether the vehicle is parked. Such a determination may be made if one or more of the following exemplary but not limiting conditions are met: the ignition key state is off, the gear state is park, the parking break is engaged, there are no faults or errors currently associated with the WEVC system. If the determination is no, the flowchart may advance back to block 1104. If the determination is yes, the flowchart may advance to block 1116. At block 1116 a determination may be made as to whether a sleep timer has expired, as described below in connection with FIG. 10. If the determination is no, the flowchart 1100 may advance back to block 1104. If the determination is yes, the flowchart 1100 may advance to block 1118, where the WEVC system may transition to a sleep mode. Once the vehicle sends the sleep command, it may continue to decide whether to send the WEVC system to sleep or to power the WEVC system off or to start align/charge again by transitioning back to block 1104.

Turning back to block 1104, if the determination is no, the flowchart may advance to block 1106 where a determination is made as to whether charging is desired. However, in contrast to block 1104, at block 1106 the determination is yes if the vehicle speed is less than the high threshold for at least the threshold amount of time as described above. If the determination is no, the flowchart may advance to block 1116. If the determination is yes, the flowchart may advance back to block 1104. Accordingly, the vehicle may utilize the vehicle states to determine if the WEVC system is to be enabled or disabled using signals such as the ignition key state, the gear state, the parking break state and/or the speed, acceleration or distance traveled by the vehicle.

In an aspect, this may allow the electric vehicle 402 to determine whether or not a user intends to charge even when the wireless charging system in the vehicle detects that there is a charger nearby. For example, if car is moving, it may be inferred that no charging should be initiated even if the vehicle is in proximity to base pad. Rather than implementing functions to detect car movement (or any other vehicle function) within the wireless charging components and controllers integrated in the vehicle, other vehicle controllers may be able to detect this information and determine when charging should be initiated. In one aspect, separating functions between different controllers in the vehicle may allow the same wireless charging system components to be integrated into a variety of different types of vehicles with different ways to detect based on vehicle states, how to control charging. As such, communications between the systems may be implemented in accordance with aspects described herein to support certain separation of functions and allowing the vehicle to control general charging functions based on vehicle speed etc., but independent of information the VCU 322 may need to actually control the transfer of power and functions specific to wireless charging such as alignment.

By contrast, when the vehicle is in a parked mode the WEVC system may be in one of the following states: connected to the BCU 306 and aligned (e.g., parked over the base pad of the WEVC system), connected to the BCU 306 but not aligned (e.g., parked near the base pad but not over the base pad of the WEVC system), and not connected to the BCU 306 (e.g., parked away from a WEVC system). In some implementations, separate protocols may be utilized for enabling or disabling the WEVC system 370 depending on whether the vehicle 402 is in a drive mode or a parked mode. The park mode may be described in more detail in connection with FIG. 14 below.

Figure 12:
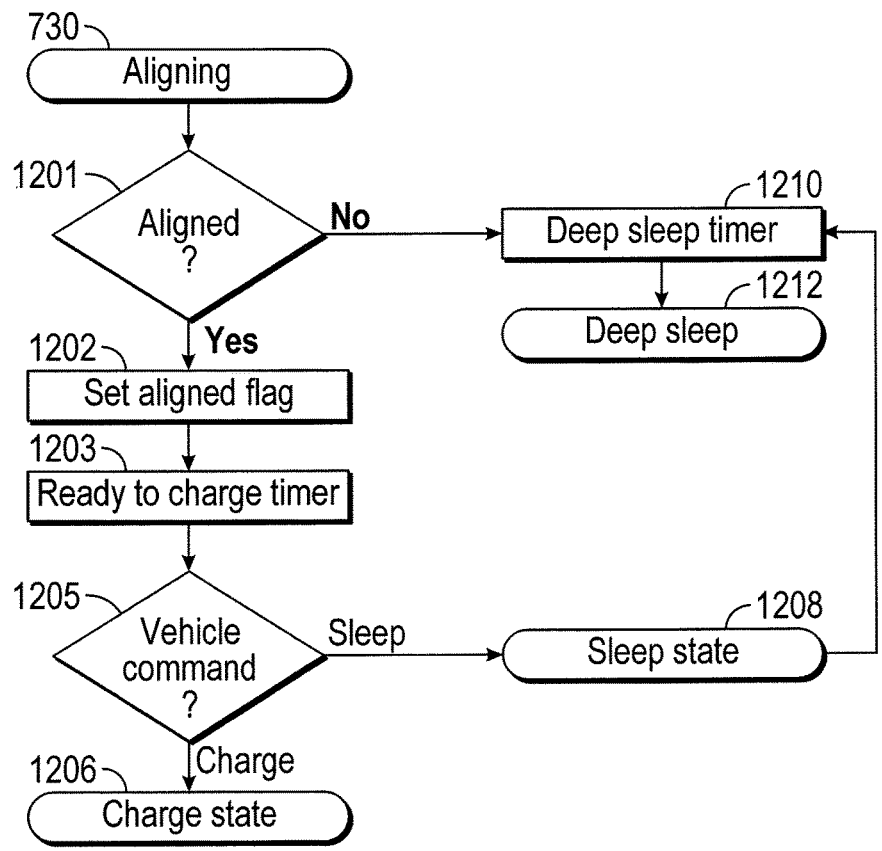
FIG. 12 shows a flowchart for controlling a WEVC system according to the state machine diagrams of FIGS. 7A-7C, in accordance with some exemplary implementations.

FIG. 12 is a flowchart illustrating different vehicle functions associated with the states of the state diagram of FIG. 7A. More particularly, FIG. 9 illustrates the vehicle functions associated with the C2-aligning state 730, the C10-aligned state 740, the C4-ready to charge state 750, the C13-preparing to charge state 760, and the C3-charging state 770 described in FIG. 7. In FIG. 12, the electric vehicle 402 is in the C2-aligning state 730. In block 1201, the electric vehicle 402 determines whether it is aligned with the base pad 302. In some aspects, the VCU 322 may send a signal indicating or the DLU 330 may indicate that the vehicle pad 312 is aligned with the base pad 302. If so, the electric vehicle 402 may transition to block 1202 and set an aligned flag. Once the aligned flag is set, the electric vehicle 402 may transition to block 1203 and start a ready to charge timer. In some aspects, the ready to charge timer, may correspond to the disable timer illustrated and discussed above with reference to FIG. 10. In block 1205, the electric vehicle 402 may command the VCU 322 to charge, which may transition to the charge state 1206. The charge state 1206 may comprise the VCU 322 entering and completing the C13-preparing to charge state 760 and the C3-charging state 770 described with respect to FIG. 7A. In block 1205, the electric vehicle 402 may command the VCU 322 to enter a sleep state 1208. In some aspects, the electric vehicle 402 may command the VCU 322 to enter a sleep state 1208 based on the expiration of the ready to ready to charge timer. In some implementations, the sleep state 1208 may correspond to the reduced power level in T2 of FIG. 10.

If the electric vehicle 402 is not aligned with the base pad 302 or if the electric vehicle 402 commands the VCU 322 to enter the sleep state 1208, the vehicle may also start a deep sleep timer 1210. After the deep sleep timer elapses, the electric vehicle 402 may command the VCU to enter a deep sleep mode 1212. In some implementations, the deep sleep mode 1212 may correspond to powering off the VCU 322 during T3 as illustrated and described in FIG. 10B.

Figure 13:
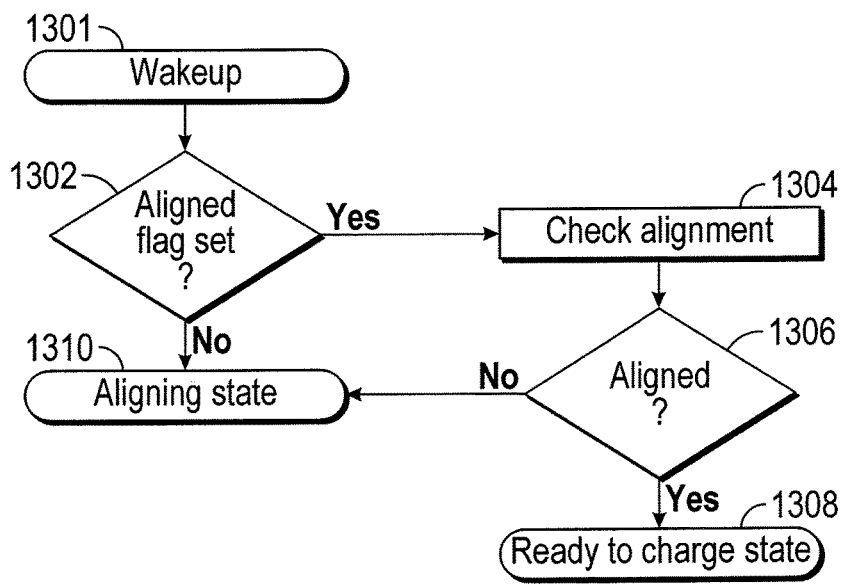
FIG. 13 shows a flowchart for waking up a WEVC system in a parked mode, in accordance with some exemplary implementations.

FIG. 13 is a flowchart illustrating different vehicle functions associated with the states of the state diagram of FIG. 7. More particularly, FIG. 13 illustrates the electric vehicle 402 functions associated with the C1-connected not aligned state 720. At block 1301, the electric vehicle 402 may command the VCU 322 to wake up from a sleep state. In some implementations, the VCU 322 may wake from the sleep state 1208 or the deep sleep state 1212 described with respect to FIG. 12. In block 1302, the VCU 322 may determine whether the aligned flag was set prior to the VCU 322 entering the sleep state. If yes, in block 1304, the VCU 322 may check the alignment of the vehicle pad 312 with the base pad 302. If no, the VCU 322 may enter an aligning state 1310. In block 1306, after checking the alignment, the VCU 322 may then determine whether vehicle pad 312 is aligned with the base pad 302. If they are aligned the VCU 322 may enter the ready to charge state 1308. In some implementations, the ready to charge state 1308 may correspond to the C4-ready to charge state 750. If the vehicle pad 312 and the base pad 302 are not aligned, the VCU may enter the aligning state 1310. In some implementations, the aligning state 1310 may correspond to the C2-aligning state 730.

Figure 14:
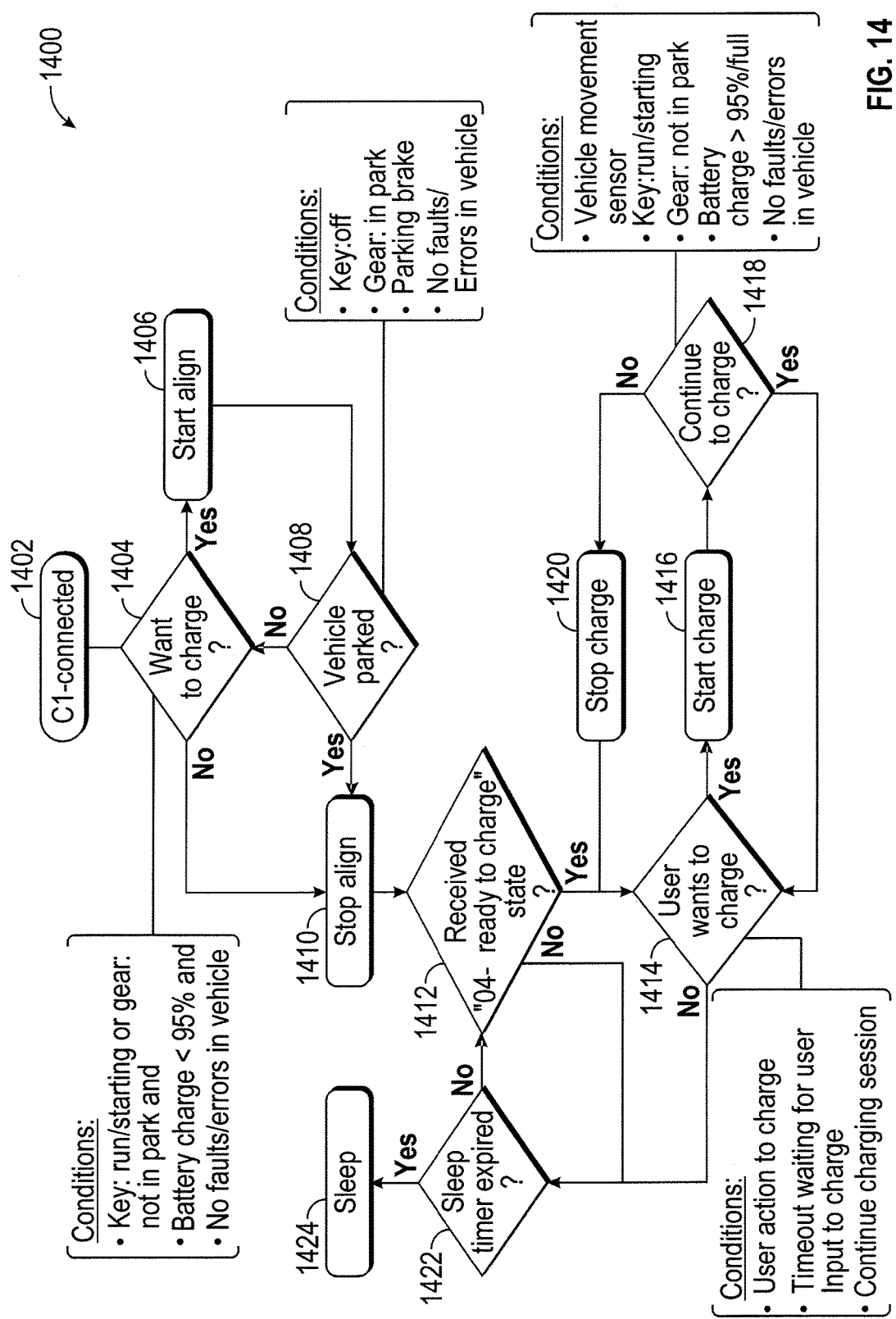
FIG. 14 shows a flowchart for enabling and disabling a WEVC system when in a park mode and/or when connected, in accordance with some exemplary implementations.

FIG. 14 shows a flowchart 1400 for enabling and disabling a WEVC system when in a park mode and/or when connected, in accordance with some exemplary implementations. The flowchart 1400 may begin at block 1402 in the C1-connected state. The flowchart 1400 may advance to block 1404 where a determination is made as to whether charging is desired. Conditions upon which charging may be determined as desired may comprise the following: the ignition key is in the run or start position or the gear position is not in park and the battery charge is less than a threshold level (e.g., 95% full), and there are no faults or errors associated with the vehicle. If the determination is no the flowchart 1400 may advance to block 1410. If the determination is yes, the flowchart 1400 may advance to block 1406 where the alignment process is started. The flowchart 1400 may then advance to block 1408 where a determination is made as to whether the vehicle is parked. Conditions which may indicate a parked vehicle include one or more of the following: the ignition key is in the off position, the gear position is in park, the parking brake is engaged and there are no faults or errors associated with the vehicle. If the determination is no, the flowchart 1400 may advance back to block 1404. If the determination is yes, the flowchart 1400 may advance to block 1410, where the alignment process is stopped. The flowchart 1400 may then advance to block 1412 where a determination is made as to whether the "C4 Ready to Charge" state has been received. If the determination is no, the flowchart 1400 may advance to block 1422. If the determination is yes, the flowchart 1400 may advance to block 1414 where a determination is made as to whether the user wants to charge the vehicle. Conditions under which an affirmative determination may be made include one or more of the following: user input indicates charging, a timeout waiting for the user to input an indication of charging, or that charging, already in progress, is to continue. If the determination is no, the flowchart 1400 may advance to block 1422. If the determination is yes, the flowchart 1400 may advance to block 1416 and charging is started. The flowchart may then advance to block 1418 where a determination is made as to whether charging should continue. Exemplary and non-limiting conditions under which a negative determination may be made include one or more of the following: a vehicle movement sensor detects movement above a threshold, the key is in the run or start positions, the gear position is not in park, the battery charge is greater than a threshold level (e.g., 95% charged), and there are no faults and/or errors associated with the vehicle. If the determination is no, the flowchart 1400 may advance to block 1420 where charging is stopped. The flowchart 1400 may then advance back to block 1414. If the determination is yes, the flowchart 1400 may advance back to block 1414.

Turning back to block 1422, at block 1422 a determination may be made as to whether a sleep timer has expired. If the determination is no, the flowchart 1400 may advance back to block 1412. If the determination is yes, the flowchart 1400 may advance to block 1424 where the system may transition to a sleep mode.

Figure 15:
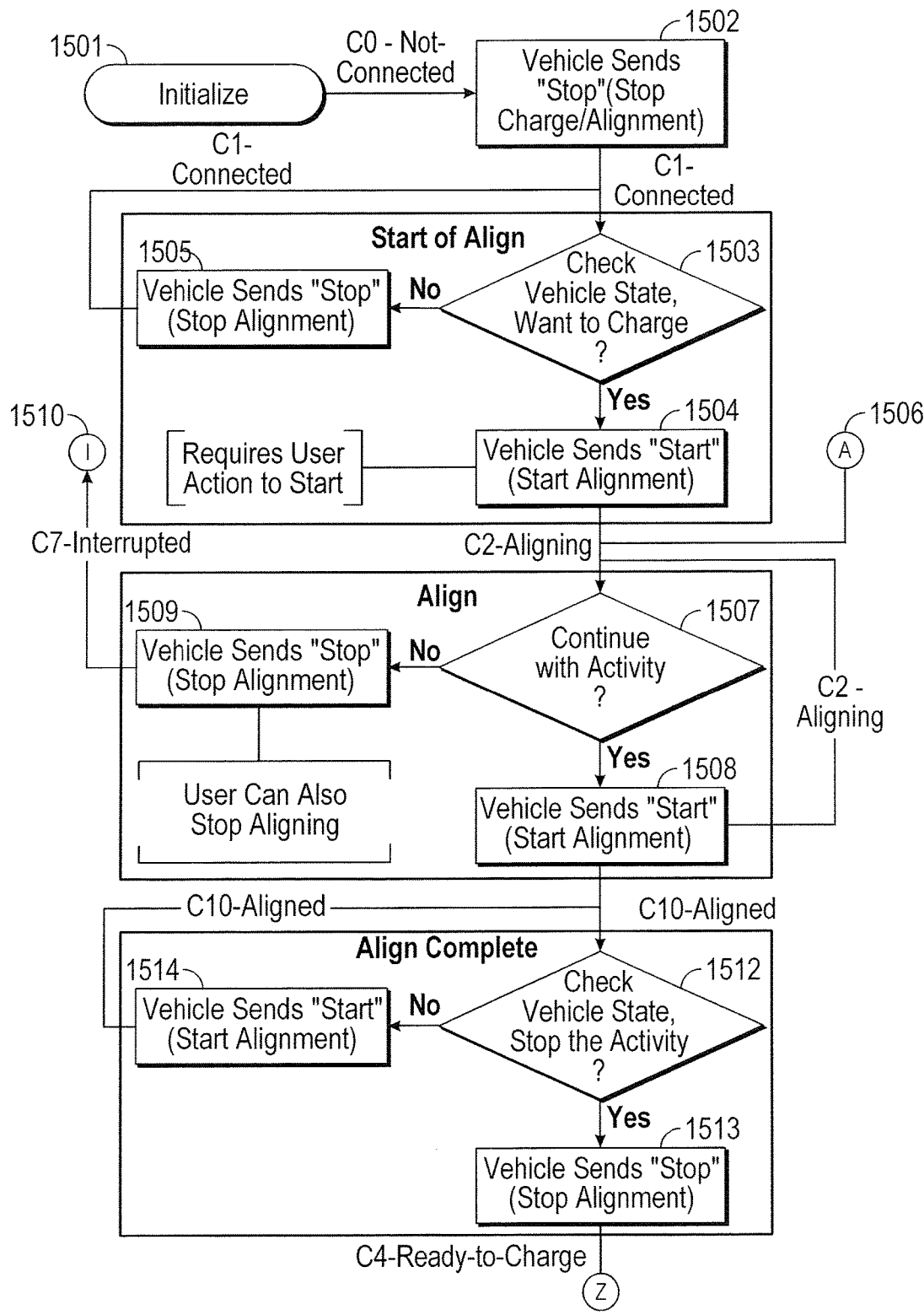
FIG. 15 is a flowchart illustrating different vehicle functions associated with some of the states of the state diagram of FIG. 7A.
Figure 15:
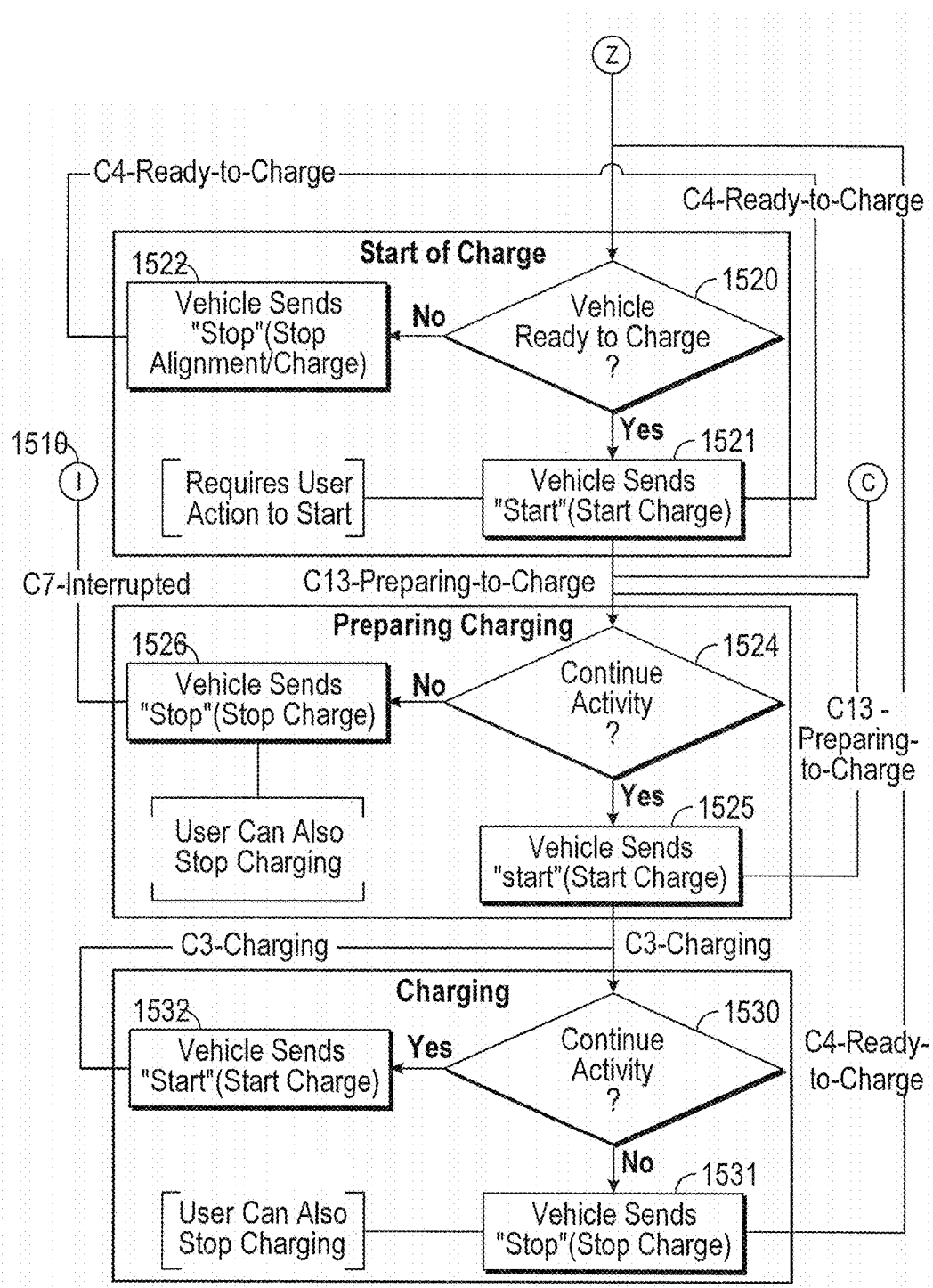

FIG. 15 is a flowchart illustrating different vehicle functions associated with some of the states of the state diagram of FIG. 7A. In block 1502, the VCU 322 is in an initialized state where it can be powered on. In block 1502, the VCU 322 is in the "C0—Not Connected" state 710 and the electric vehicle 402 can send a stop charge or stop alignment command to the VCU 322. In block 1503, the VCU 322 can enter the "C1—Connected Not Aligned" state 720 and check the electric vehicle 402 state to determine whether it should charge the battery 318. In some implementations, the block 1503 can perform similar function to the block 1302. If the VCU 322 determines not to charge, the electric vehicle 402 can send a stop alignment command in block 1505 and the VCU 322 can then return to block 1503. If the VCU 322 determines to charge the battery 318, then the electric vehicle 402 can send a start alignment command as indicated in block 1504. In some aspects, the user can send the start alignment command via the DLU 330. In some aspects, the start alignment command corresponds to starting the "C2—Aligning" state 730 (A 1506).

The VCU 322 can then determine whether it should continue aligning, as indicated in block 1507. If yes, in block 1508, the electric vehicle 402 sends a start alignment command and the VCU 322 continues aligning. If no, in block 1509, the electric vehicle 402 can send a stop alignment command and the VCU 322 transitions to the "C7—Interrupted" (fault) state 780 as indicated in block 1510. In some implementations, the user can send the stop alignment command via the DLU 330. As the VCU 322 is aligning after block 1508, it can receive an alignment score that indicates that the vehicle pad 312 is aligned with the base pad 302. The VCU 322 can enter the "C10—Aligned" state 740 and in block 1512 can check the electric vehicle 402 state to determine whether to continue aligning. If no, then the electric vehicle 402 can send a start alignment command as indicated in block 1514 and the VCU 322 can continue aligning and return to block 1512. If yes, then the vehicle can send a stop alignment command, as indicated in block 1513, and the VCU 322 can transition from the "C10—Aligned" state 740 to the "C4—Ready To Charge" state 750 of block 1520.

In block 1520, the VCU 322 determines whether the electric vehicle 402 is ready to charge. If no, the electric vehicle 402 can send a stop alignment or stop charge command, as indicated in block 1522 and the VCU 322 can return to block 1520. If yes, then the electric vehicle 402 can send a start charge command to the VCU 322 as indicated in block 1521. In some implementations, the user can send the start charge command via the DLU 330. The VCU 322 can then enter the "C13—Preparing To Charge" state 760 and in block 1524 can determine whether to continue preparing to charge. If no, the electric vehicle 402 can send a stop charge command to the VCU 322, as indicated in block 1526, and the VCU 322 can enter the "C7—Interrupted" (fault) state 780 as indicated in block 1510. In some implementations, the user can send the stop charge command in block 1526 via the DLU 330. If the VCU 322 determines to continue preparing to charge, the electric vehicle 402 can send a start charge to the VCU 322, as indicated in block 1525. After the VCU 322, receives the start charge command, the VCU 322 can enter the "C3—Charging" state 770 and can then determine whether to continue charging, as indicated in block 1530. In block 1530, if the VCU 322 determines to continue charging, then the electric vehicle 402 can send a start charge command to the VCU 322 as indicated in block 1532, and the VCU 322 can continue charging. If the VCU 322, determines not to continue charging, the electric vehicle 402 can send a stop charging command to the VCU 322, as indicated in block 1531, and the VCU 322 can return to "C4—Ready To Charge" state 750 of block 1520. In some implementations, the user can send the stop charge command via the DLU 330.

Figure 16A:
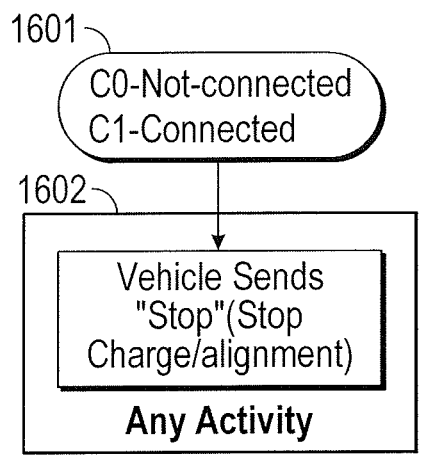
FIGS. 16A-16C are flowcharts illustrating different vehicle functions associated with some of the states of the state diagram of FIG. 7A.

FIG. 16A is a flowchart illustrating different vehicle functions associated with some of the states of the state diagram of FIG. 7A. At block 1601, the VCU 322 can be in the "C0—Not Connected" state 710 or the "C1—Connected Not Aligned" state 720. At block 1602, if the electric vehicle 402 sends a stop charge or stop alignment command to the VCU 322, the VCU 322 can be in an idle mode.

Figure 16B:
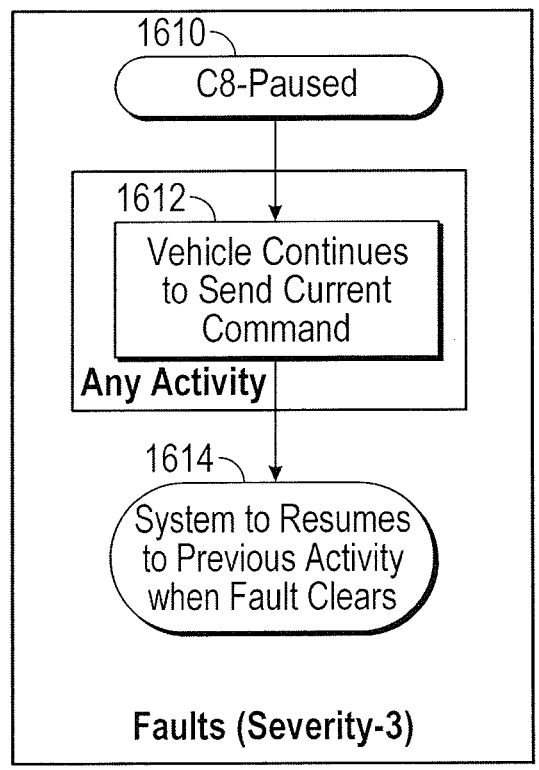

FIG. 16B is a flowchart illustrating different vehicle functions associated with some of the states of the state diagram of FIG. 7A. In block 1610, the VCU 322 can be in the "C8—Paused" state 785. In block 1612, the electric vehicle 402 can continue to send the current command. During such time, the WEVC system 370 can correct any faults and when such faults clear, the VCU 322 can resume its previous activity, as indicated in block 1614.

Figure 16C:
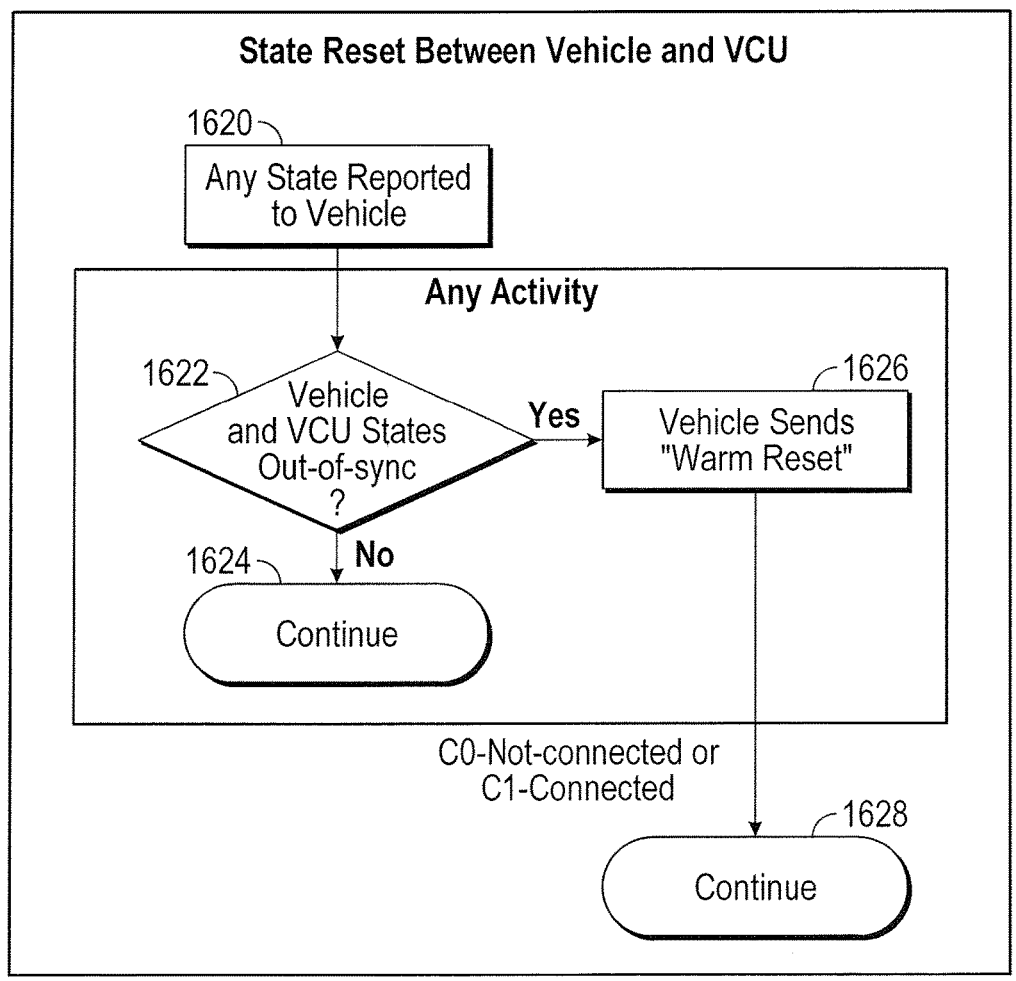

FIG. 16C is a flowchart illustrating different vehicle functions associated with some of the states of the state diagram of FIG. 7A. In particular, FIG. 16C illustrates a state reset between the VCU 322 and the electric vehicle 402. In block 1620, the VCU 322 can be in any state described previously with respect to FIGS. 7A-7C. In block 1622, the VCU 322 can check to determine whether the VCU 322 and the electric vehicle 402 states are out of sync. If the determination is no then the VCU 322 continues with its current activity, as indicated in block 1624. If the determination is yes, then the electric vehicle 402 can send a "warm reset" to the VCU 322 to re-initiate and sync the states of both as shown in block 1626. An example of this is when WEVC system 370 is in Ready-to-Charge C4 state. In one aspect, if the electric vehicle 402 detects the movement or other conditions that might put the electric vehicle 402 out of alignment, then the electric vehicle 402 can send "warm reset" command in block 1626 to re-initiate the state machine in WEVC system 370. The warm reset can send the VCU 322 back to the "C0—Not Connected" state 710 or the "C1—Connected Not Aligned" state 720 and then the VCU 322 can continue with its previous activity, as indicated in block 1628.

Figure 17A:
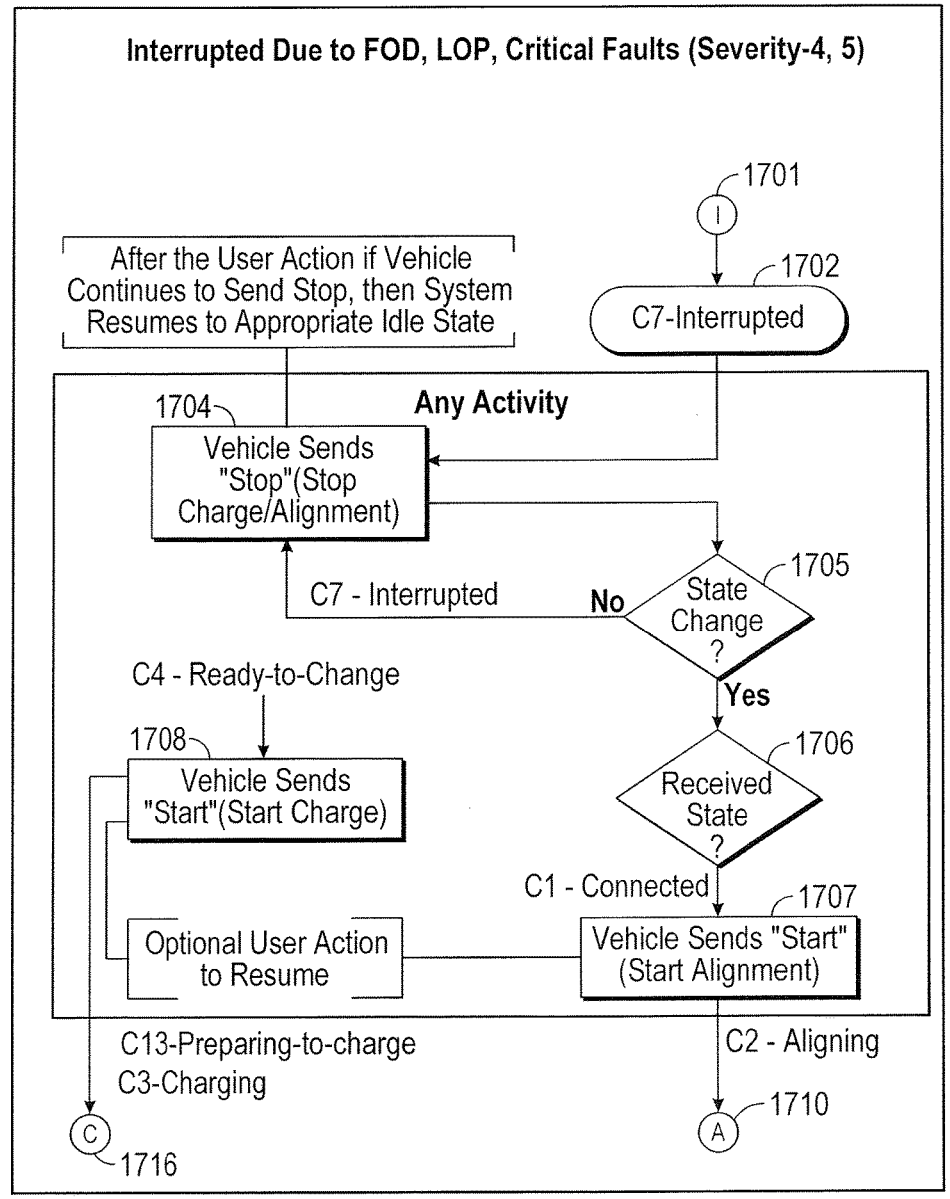
FIGS. 17A-17B are flowcharts illustrating different vehicle functions associated with some of the states of the state diagram of FIG. 7A.

FIG. 17A is a flowchart illustrating different vehicle functions associated with some of the states of the state diagram of FIG. 7A. In particular, FIG. 17A illustrates the "C7—Interrupted" (fault) state 780. As described in FIG. 9, the VCU 322 can enter the block 1701 when the electric vehicle 402 sends a stop alignment or stop charge command. In some aspects, the electric vehicle 402 can send such stop command when the BCU 306 or the VCU 322 LOP or FOD detects a living or foreign object or when a critical fault occurs in any state. In block 1702, the VCU 322 is in the "C7—Interrupted" (fault) state 780. When the electric vehicle 402 receives a message indicating the "C7—Interrupted" (fault) state 780, the electric vehicle 402 should acknowledge the "C7—Interrupted" (fault) state 780 by sending a stop command, as indicated in block 1704. In some implementations, a user can send the stop command via the DLU 330. In some aspects, if the electric vehicle continues to send stop commands after the user stop command, the WEVC system 370 can resume to an appropriate idle state. In block 1705, the VCU 322 determines whether a state change occurred. If no, the VCU 322 returns to block 1704 and the electric vehicle 402 can send another stop charge or stop alignment command. If yes, the VCU 322 can continue to the received state as indicated in block 1706. In the received state, the VCU 322 can enter the "C1—Connected Not Aligned" state 720 and the electric vehicle 402 can send a start alignment command to the VCU 322, as indicated in block 1707. Once the VCU 322 receives the start alignment command, it can enter the "C2—Aligning" state 730 as indicated in block 1710. Turning back to the received state in block 1706, the VCU can also enter the "C4—Ready To Charge" state 750 and the electric vehicle 402 can send a start charge command to the VCU 322, as indicated in block 1708. Once the VCU 322 receives the start charge command, it can enter the "C13—Preparing To Charge" state 760 and the "C3—Charging" state 770 as indicated in block 1711. In some implementations, the blocks 1707 and 1708 can require user action (e.g., input via the DLU 330) in order for the VCU 322 to resume its previous activity. Although in certain implementations described and illustrated herein may state a particular requirement (e.g., user action), it will be understood that in some implementations, each such requirement described herein can be configurable, and thus in various implementations can be optional.

Figure 17B:
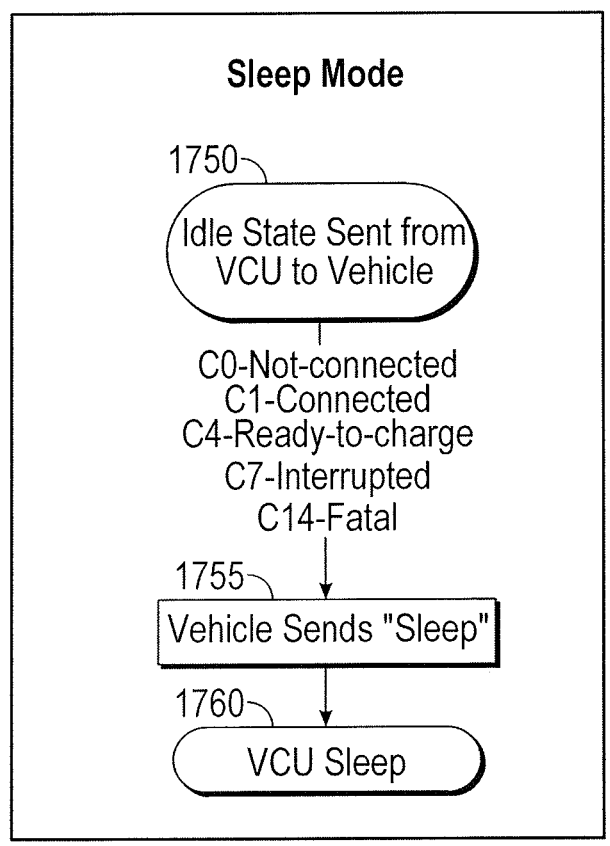

FIG. 17B is a flowchart illustrating different vehicle functions associated with some of the states of the state diagram of FIG. 7A. In particular, FIG. 17B illustrates sleep mode handling for the VCU 322. In block 1750, VCU 320 sends an idle state message to the electric vehicle 402. VCU 322 can send this message in any of the "C0—Not Connected" state 710, the "C1—Connected Not Aligned" state 720, the "C4—Ready To Charge" state 750, the "C7—Interrupted" (fault) state 780, or the "C14—Fault" state 775. Once the electric vehicle 402 receives the idle state message, it can send to the VCU 322 a sleep command, as indicated in block 1755. The VCU 322 can then enter a sleep mode as indicated in block 1760.

Figure 18:
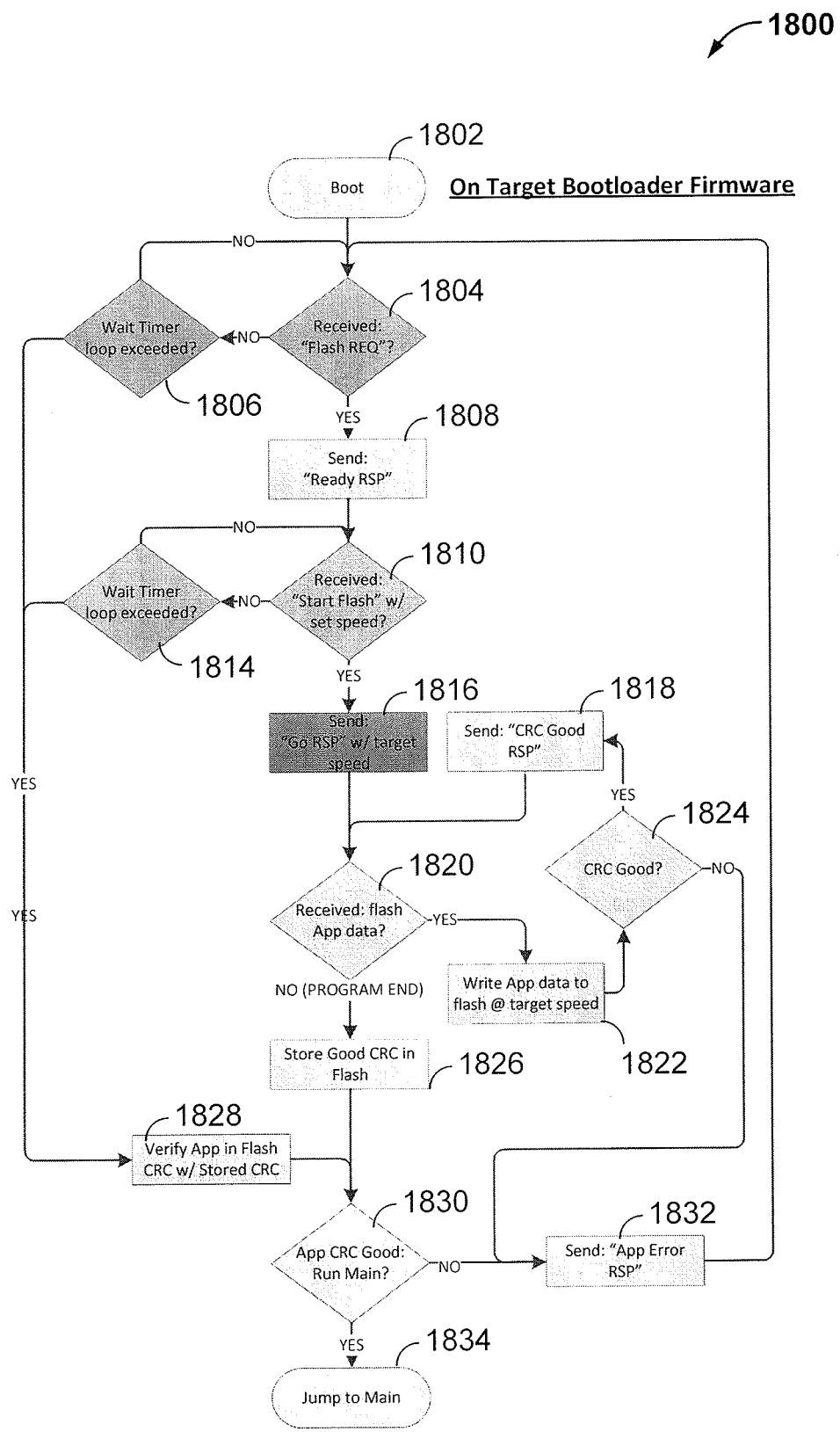
FIG. 18 shows a flowchart for an exemplary on-target boot loader firmware for a WEVC system, in accordance with some exemplary implementations.

FIG. 18 shows a flowchart 1800 for an exemplary on-target boot loader firmware for a WEVC system, in accordance with some exemplary implementations. The flowchart 1800 may describe a program intended to run on a microcontroller on the target device (e.g., the VCU 322 to implement the state machine, for example, as described above). The flowchart 1800 may be triggered from a request to load new software to the vehicle (e.g., a flash request to the VCU 322). The flowchart 1800 may begin at boot block 1802 and may advance to block 1804 where a determination is made as to whether a flash request (REQ) message has been received. If the determination is no, the flowchart 1800 may advance to block 1806. If the determination is yes, the flowchart 1800 may advance to block 1808 where a "ready" response (RSP) is sent. The flowchart 1800 may then advance to block 1810 where a determination is made as to whether a "start flash" message has been received including a set speed. If the determination is no, the flowchart 1800 may advance to block 1814. If the determination is yes, the flowchart 1800 may advance to block 1816 where a "go" response (RSP) including a target speed is sent. The flowchart 1800 may then advance to block 1820 where a determination as to whether flash application data has been received is made. If the determination is no, the flowchart 1800 may advance to block 1826 where a good CRC is stored in flash memory. If the determination is yes, the flowchart 1800 may advance to block 1822 where the application data is written to the flash memory at the target speed. The flowchart 1800 then advances to block 1824 where a determination is made as to whether the CRC is good. If the determination is yes, the flowchart 1800 may advance to block 1818 where a "CRC good" response (RSP) is sent. The flowchart 1800 may then advance back to the block 1820. However, if the determination at block 1824 is no, the flowchart 1800 may advance to block 1832.

Turning back to block 1806, at block 1806 a determination as to whether a wait timer loop has been exceeded is made. If the determination is no, the flowchart 1800 may advance back to block 1804. If the determination is yes, the flowchart 1800 may advance to block 1828.

Turning back to block 1814, at block 1814 a determination as to whether the wait timer loop has been exceeded is made. If the determination is no, the flowchart 1800 may advance back to block 1810. If the determination is yes, the flowchart 1800 may advance to block 1828. At block 1828, the application stored in the flash memory CRC may be verified against a stored CRC. The flowchart 1800 may then advance to block 1830. Since the application CRC has been verified in the previous block as being accurate (e.g., good), at block 1830, a determination is made whether to run the application on main. If the determination is no, the flowchart 1800 may advance to block 1832 where an "App error" response (RSP) is sent and the flowchart 1800 advances back to block 1804. If the determination is yes, the flowchart 1800 may advance to block 1834 where the application is run on main.

Figure 19:
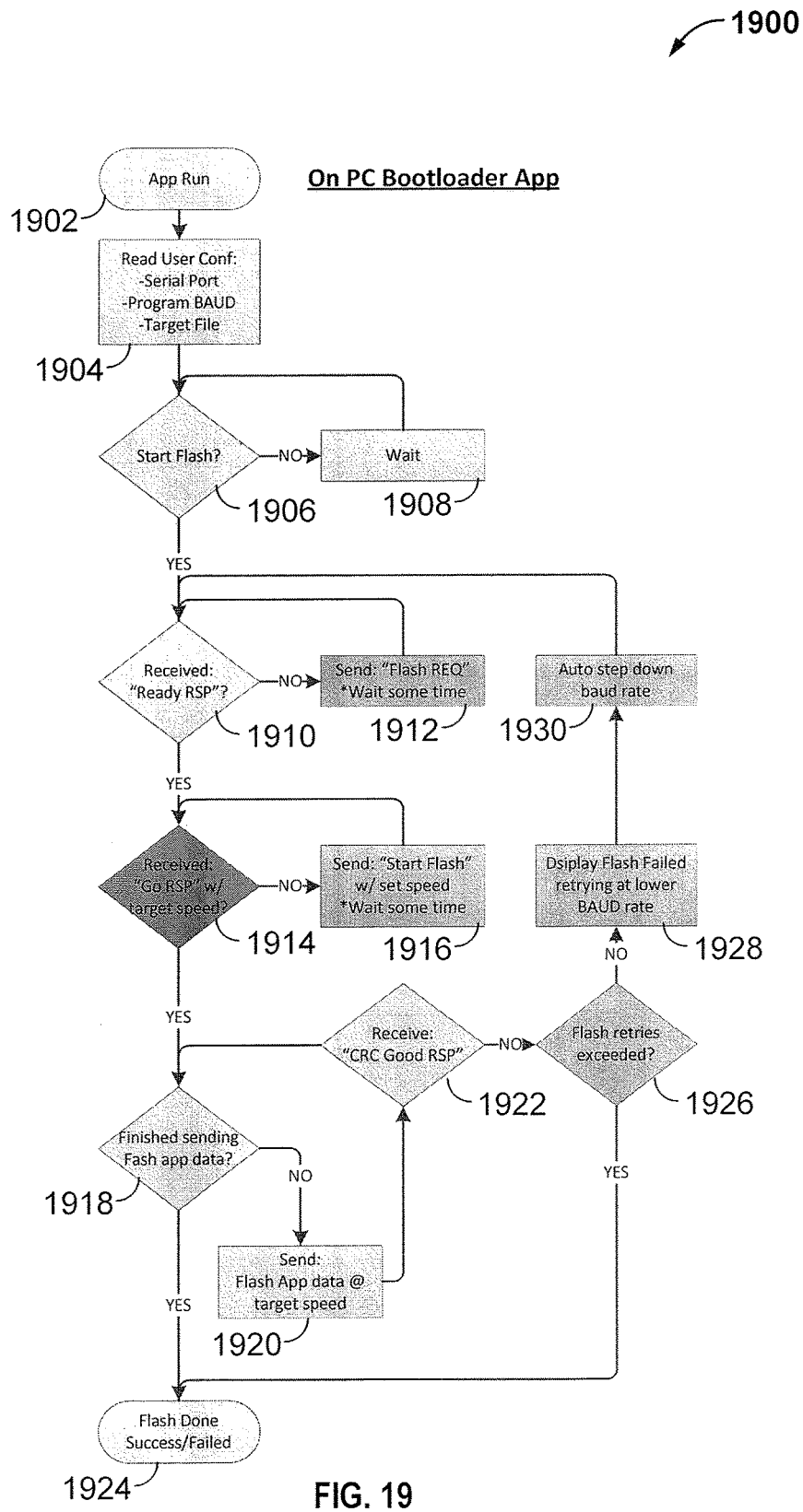
FIG. 19 shows a flowchart for an exemplary on-PC boot loader application for a WEVC system, in accordance with some exemplary implementations.

FIG. 19 shows a flowchart 1900 for an exemplary on-PC boot loader application for a WEVC system, in accordance with some exemplary implementations. The flowchart 1900 may begin at block 1902 where the boot loader application is run on the PC. The flowchart 1900 may advance to block 1904 where the user configuration is read utilizing a serial port at the program BAUD (unit of signaling speed equal to one code element per second) from the target file. The flowchart 1900 may then advance to block 1906 where a determination whether to start the flash is made. If the determination is no, the flowchart 1900 may advance to block 1908 where the PC boot loader application may wait for a predetermined period of time and then advance back to block 1906. If the determination is yes, the flowchart 1900 may advance to block 1910 where a determination is made as to whether a "ready" response (RSP) is received from the on-target microcontroller. If the determination is no, the flowchart 1900 may advance to block 1912 where a "flash request (REQ)" is sent to the on-target microcontroller. After a predetermined period of time, the flowchart 1900 may advance back to block 1910. If the determination is yes, the flowchart 1900 may advance to block 1914 where a determination is made whether a "Go" response (RSP) with target speed has been received. If the determination is no, the flowchart 1900 may advance to block 1916 where a "start flash" message is sent with a set speed. After a predetermined period of time, the flowchart 1900 may advance back to block 1914. If the determination is yes, the flowchart 1900 may advance to block 1918 where a determination is made whether the PC is finished sending the flash application data. If the determination is no, the flowchart 1900 may advance to block 1920 where the flash application data is sent at the target speed. The flowchart 1900 may then advance to block 1922. If the determination is yes, the flowchart 1900 may advance to block 1924 where the flash is completed as either successful or as failed.

Turning back to block 1922, at block 1922 a determination is made whether a "CRC Good" response (RSP) has been received from the on-target microcontroller. If the determination is yes, the flowchart 1900 may advance back to block 1918 and then to the final block 1924 where the flash has completed successfully. If the determination at block 1922 is no, the flowchart 1900 may advance to block 1926 where a determination is made whether a threshold number of flash retries has been exceeded. If the determination is yes, the flowchart 1900 advances to the final block 1924 where the flash has completed and failed. If the determination at block 1926 is no, the flowchart 1900 advances to block 1928 where a message indicating that the flash has failed and is being retries at a lower BAUD rate is displayed on the PC. The flowchart 1900 then advances to block 1930 where the BAUD rate is automatically stepped down or reduced to a particular rate or reduced by a particular amount. The flowchart 1900 then advances back to block 1910 for flash transfer retry. Thus, according to the flowchart 1900, new software may be downloaded to the on-target (e.g., on vehicle) microcontroller at a predetermined BAUD rate. If such a transfer at the predetermined BAUD rate is unsuccessful for any reason (e.g., increased interference, etc.) the PC may automatically reduce transfer speed and retry the transfer to the vehicle.

In one aspect, the methods described with reference to FIGS. 23 and 19 as described above may allow for providing a variable speed (e.g., bit-rate) for loading a program into the VCU 322. For example, in some implementations, a vehicle and/or an environment surrounding the vehicle may be subject to a high degree of electrical noise (e.g., as electrical systems are only grounded relative to the vehicle). This noise may cause corruption of program data as it is transferred. Therefore, providing variable loading rates as described above may allow for successfully loading software on a VCU 322 in a noisy environment. As such, in one aspect of some implementations a rate for loading a new program on a VCU 322 may be based at least in part on a level of electrical noise associated with a vehicle or its environment.

FIGS. 20A-20E show an exemplary call flow diagram for the state machine of FIG. 7A. FIGS. 20A-20E illustrate the call flow between the ICU 316 and the DLU 330 in different states and how the state transitions occur based on user interaction (e.g., input to DLU 330). In various implementations, a notation of "(R:Xs)" denotes that a call can be repeated every X seconds. Although various features are shown in the exemplary call flow of FIGS. 20A-20E, a person having ordinary skill in the art will appreciate that various calls, processes, and communications can be added, removed, and/or reordered within the scope of this disclosure.

Figure 20A:
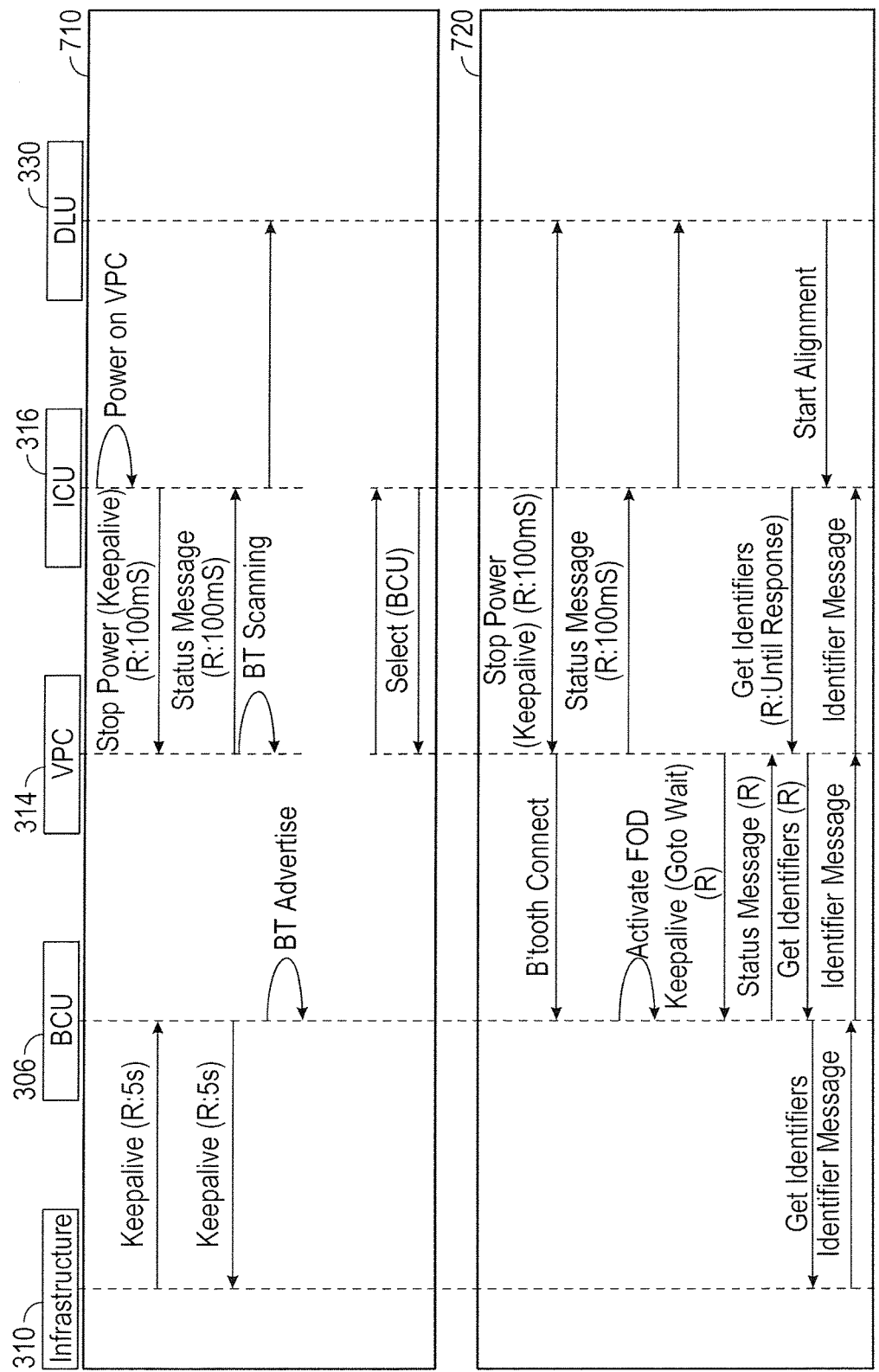
FIGS. 20A-20E show an exemplary call flow diagram for the state machine of FIG. 7A.

FIG. 20A shows an exemplary call flow diagram for the "C0—Not Connected" state 710 and the "C1—Connected Not Aligned" state 720. In the "C0—Not Connected" state 710, the ICU 316 can power on the VPC 314. The ICU 316 can provide one or more status messages to the DLU 330, for example indicating that the VPC 314 is not connected to the BCU 306. Meanwhile, the infrastructure side 310 and the BCU 306 can exchange one or more Keep Alive messages. Similarly, the VPC 314 and the ICU 316 can exchange one or more Keep Alice and/or Status messages. The BCU 306 can advertise, for example via Bluetooth (BT) and the VPC 314 can scan for the BCU 306 advertisement. The VPC 314 can provide the ICU 316 a list of available BCUs and the ICU 316 can indicate a selection to the VPC 314.

In various implementations, Keep Alive messages discussed herein can allow the system to allow the various units exchanging the Keep Alive messages to indicate and/or detect termination of communication before a physical communication link fails. For example, when a vehicle departs a charging station, the VPC 314 can stop sending and/or responding to Keep Alive messages from the BCU 306. Thus, the BCU 306 can determine that the vehicle is departing while the vehicle is still in wireless communications range. Accordingly, detection latency can be improved as compared to simply waiting for the vehicle to leave wireless communications range.

The VPC 314 can connect to the BCU 306. In the "C1—Connected Not Aligned" state 720, the ICU 316 can provide one or more status messages to the DLU 330, for example indicating that the VPC 314 is connected to the BCU 306, but not aligned. The DLU 330 can receive and/or generate a user instruction to start alignment, and can provide the instruction to the ICU 316. Meanwhile, the infrastructure side 310 and the BCU 306 can exchange one or more Keep Alive messages. Similarly, the VPC 314 and the ICU 316 can exchange one or more Keep Alice and/or Status messages. The infrastructure side 310, the BCU 306, and the VPC 314 can exchange identifiers and/or other information.

Figure 20B:
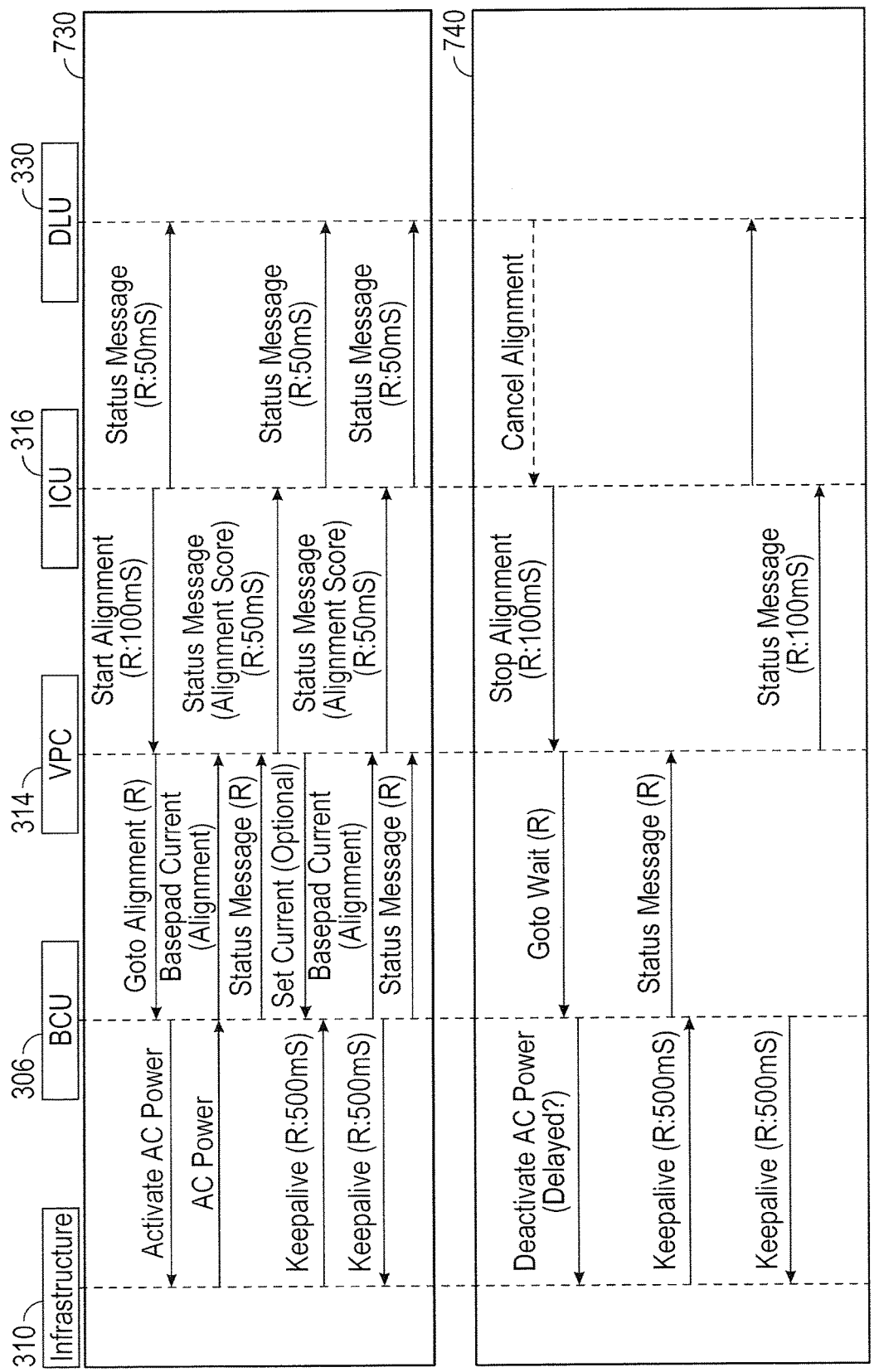

FIG. 20B shows an exemplary call flow diagram for the "C2—Aligning" state 730 and the "C10—Aligned" state 740. In the "C2—Aligning" state 730, the ICU 316 can provide one or more status messages to the DLU 330, for example indicating an alignment score, threshold, etc. Meanwhile, the infrastructure side 310 and the BCU 306 can exchange one or more Keep Alive messages and/or alignment status messages while the infrastructure 310 and the BCU 306 provides alignment current to the base pad. Similarly, the VPC 314 and the ICU 316 can exchange one or more Keep Alice and/or Status messages.

In the "C10—Aligned" state 740, the DLU 330 can optionally cancel, provide, or generate an instruction to the ICU 316 to cancel alignment. Meanwhile, the ICU 316 can provide one or more status messages to the DLU 330, for example indicating that the system is ready to charge. The infrastructure side 310 and the BCU 306 can exchange one or more Keep Alive messages. Similarly, the VPC 314 and the ICU 316 can exchange one or more Keep Alive and/or Status messages. The infrastructure side 310 can deactivate AC power in response to an instruction to stop alignment and/or successful alignment.

Figure 20C:
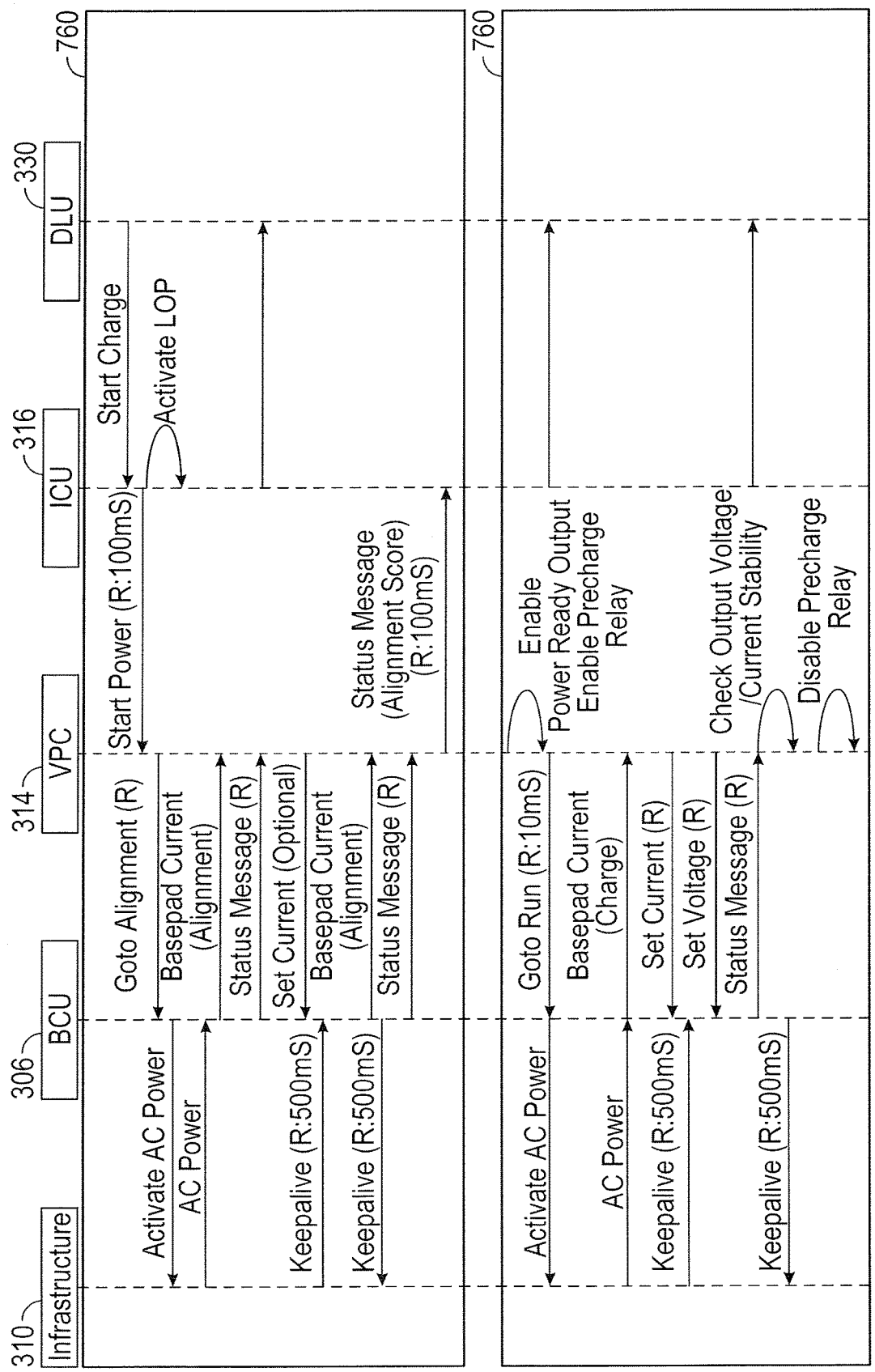

FIG. 20C shows an exemplary call flow diagram for the "C13—Preparing To Charge" state 760. In the "C13—Preparing To Charge" state 760, the DLU 330 can provide or generate an instruction to the ICU 316 to start charging. In response, the ICU 316 can activate the LOD or Living Object Protection (LOP) system and can provide one or more status messages to the DLU 330, for example indicating that the system is preparing to charge. Meanwhile, the infrastructure side 310 and the BCU 306 can exchange one or more Keep Alive messages and/or alignment status messages while the infrastructure 310 and the BCU 306 provides alignment current to the base pad. Moreover, the infrastructure side 310, the BCU 306, and the VPC 314 can verify the alignment. After verifying alignment, the infrastructure side 310, the BCU 306, and the VPC 314 can prepare to charge.

Figure 20D:
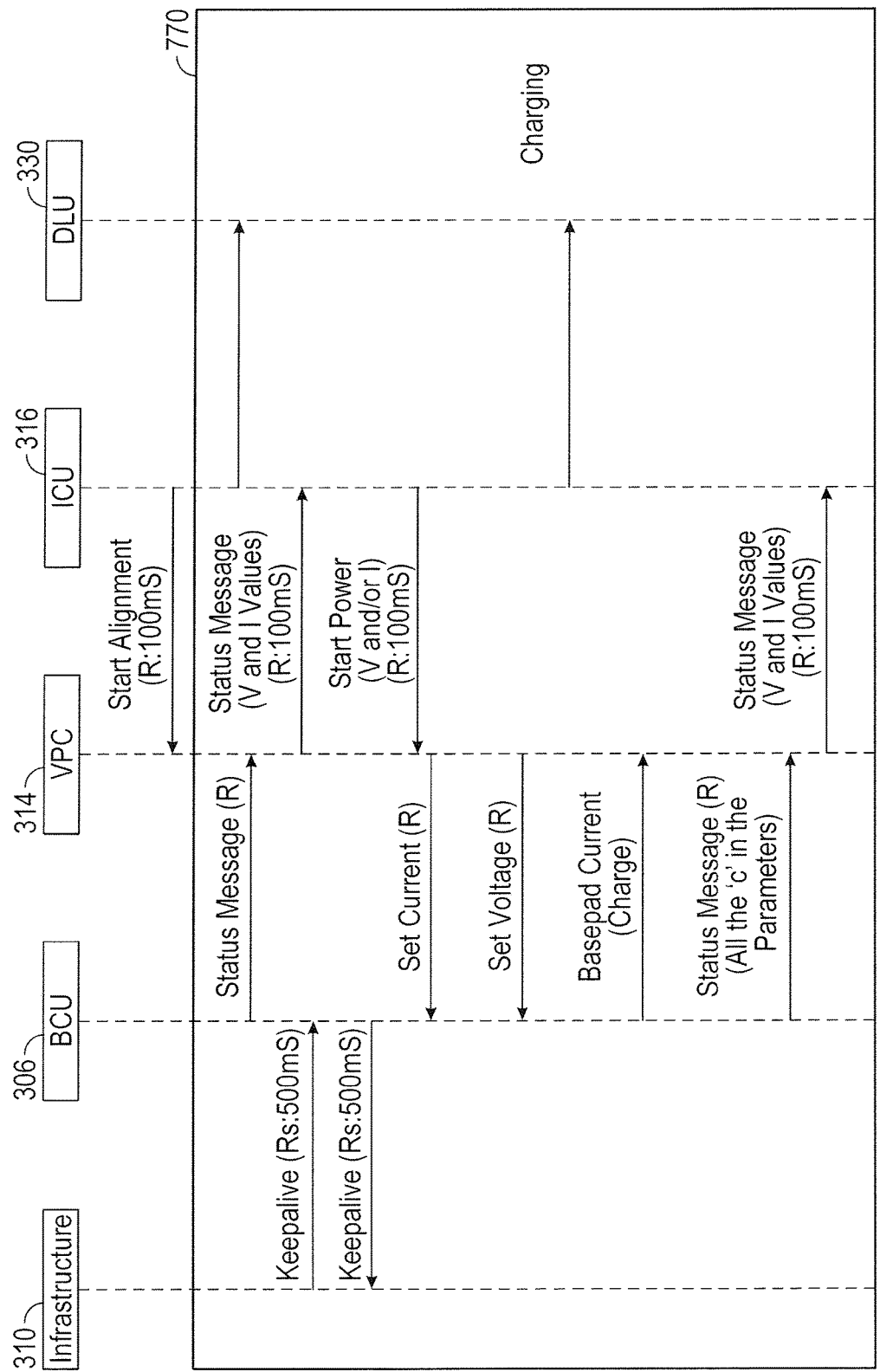

FIG. 20D shows an exemplary call flow diagram for the "C3—Charging" state 770. In the "C3—Charging" state 770, the ICU 316 can provide one or more status messages to the DLU 330, for example indicating a charging voltage, current, etc. Meanwhile, the infrastructure side 310 and the BCU 306 can exchange one or more Keep Alive messages and the BCU 306 provides wireless charging power to the VPC 314. Moreover, the ICU 316 can manage wireless charging parameters through the VPC 314.

Figure 20E:
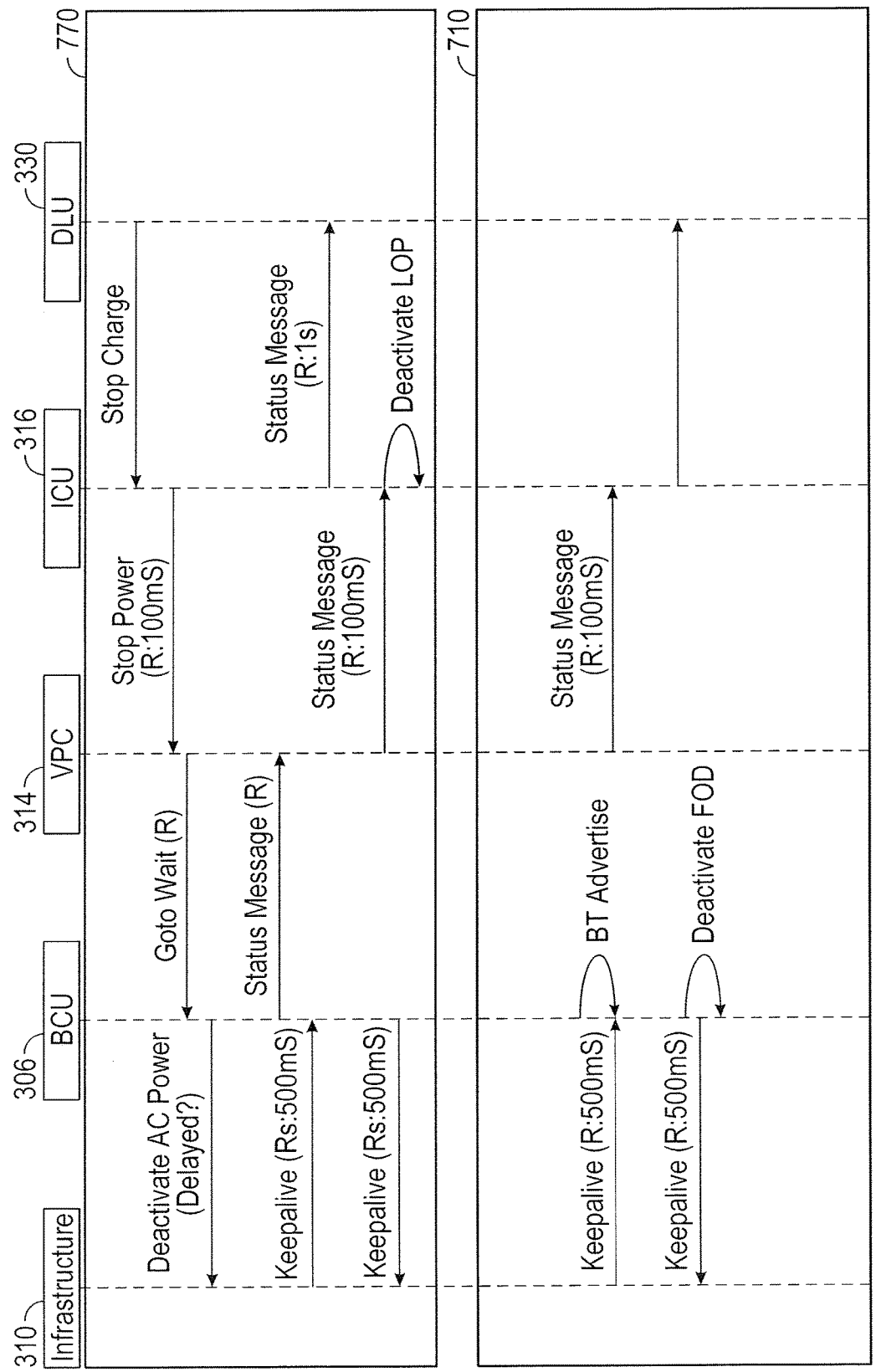

FIG. 20E shows an exemplary call flow diagram for transitioning back to the "C0—Not Connected" state 710. In various states, the "C10—Aligned" state 740 being illustrated, the DLU 330 can interrupt charging. For example, the DLU 330 can provide an instruction to stop charging to the ICU 316, which can cause the infrastructure 310 to deactivate AC power. In various implementations, deactivation of wireless charging power can be delayed. Meanwhile, the infrastructure side 310 and the BCU 306 can exchange one or more Keep Alive and/or status messages. Moreover, the ICU 316 can deactivate the LOP. Accordingly, the system can return to the "C0—Not Connected" state 710.

As discussed above, in various implementations, the infrastructure 310 can deactivate wireless charging power, with or without a delay. For example, the ICU 316, or another component, can detect a non-charging object such as a living object. The DLU 330 and/or the ICU 316 can instruct the VPC 314, the BCU 306, and/or the infrastructure 306 to deactivate wireless charging power, for example for safety reasons. In various implementations, the ICU 316 can delay restarting wireless charging so as to reduce false positives in the LOP.

Figure 21:
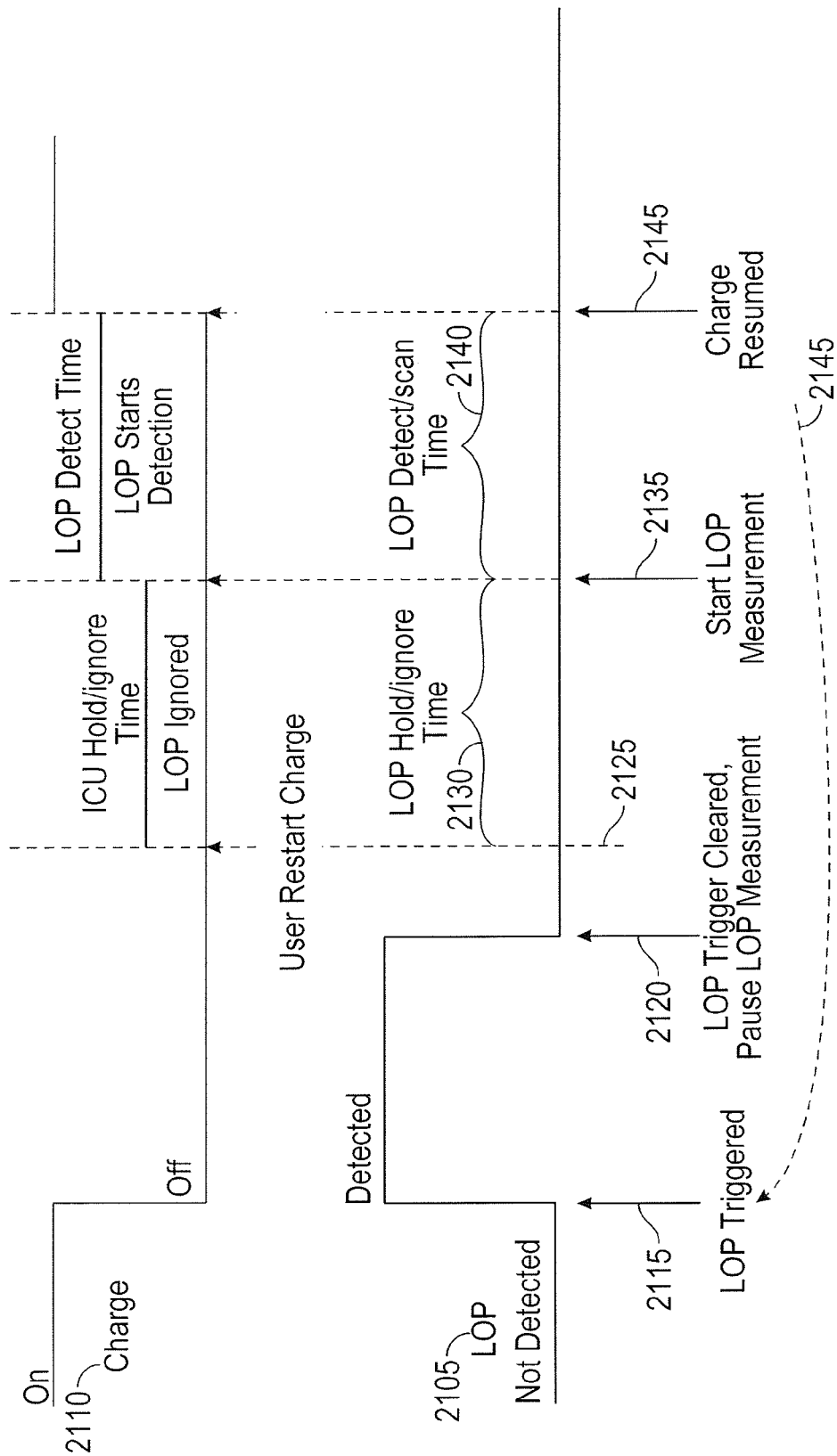
FIG. 21 shows a signal diagram for the wireless power transfer system 300 of FIG. 3A, according to some implementations.

FIG. 21 shows a signal diagram for the wireless power transfer system 300 of FIG. 3A, according to some implementations. In various implementations, the signals shown in FIG. 21 can be inputs and/or outputs from, for example, the ICU 316 of FIG. 3A. As shown, the ICU 316 receives an LOP detection signal 2105, which can be in a "detected" state or a "not detected state." The ICU 316 outputs a charging enable signal 2110, which can indicate whether the infrastructure 310 (FIG. 3) should provide wireless charging power.

As shown in FIG. 21, the ICU 316 starts in an initial state of charging, with no LOP detected. In various implementations, this initial state can be, for example, the "C3—Charging" state 770 of FIG. 7A. At a time 2115, LOP is triggered, for example due to detection of a living object in the charging area. Accordingly, the ICU 316 turns off wireless charging. At a time 2120, the LOP trigger is cleared.

For example, the detected object may have left the charging area. In some implementations, the LOP system is not restarted immediately. For example, the LOP system can be paused until at least a predetermined time, until a user restarts wireless charging in response to a fault notification, or both.

After the predetermined time 2125 or restart of wireless charging by a user, the ICU 316 can wait for an LOP hold/ignore time 2130. During the LOP hold/ignore time 2130, output from the LOP can be ignored. Accordingly, false positives can be reduced or eliminated. In various implementation, the LOP hold/ignore time 2130 can be 1-60 seconds long, 10-30 seconds long, or more particularly, 15 or 25 seconds long.

After the LOP hold/ignore time 2130, the ICU 316 can start LOP measurement again at a time 2135. After restarting LOP measurement at the time 2135, the ICU 316 can wait for an LOP detect time 2140. The ICU 316 can keep wireless charging deactivated during the LOP detect time 2140. If no LOP trigger occurs during the LOP detect time 2140, the ICU 316 can restart wireless charging at a time 2145. Accordingly, repetitive restarts can be avoided.

In various implementations, if another LOP trigger, e.g., at time 2145, occurs during the LOP detect time 2140, the ICU 316 can return to the state at the original LOP trigger, e.g., time 2115. Thus, the ICU 316 can again wait for the LOP trigger to clear, the user to restart charge, the LOP hold/ignore time 2130, the LOP detect/scan time, etc., before restarting charging. Waiting for the LOP trigger to clear, the user to restart charge, the LOP hold/ignore time 2130, the LOP detect/scan time, etc., can be repeated one or more times in response to one or more additional LOP triggers.

Although FIG. 21 is discussed herein with respect to LOP triggers, equivalent alternative or additional mechanisms can be employed with respect to FOD and/or any other fault trigger or condition. In various implementations, one or more aspects can be omitted such as, for example, the precondition of user input, the hold/ignore time, and/or the detect/scan time.

FIGS. 22A-22F show exemplary user notifications and interfaces. In some implementations, the notifications and interfaces of FIGS. 22A-22F can be utilized in the DLU 330. Although FIGS. 22A-22F are shown with various aspects, a person having ordinary skill in the art will appreciate that aspects can be rearranged, added, and/or removed within the scope of this disclosure.

Figures 22A, 22B, 22C:
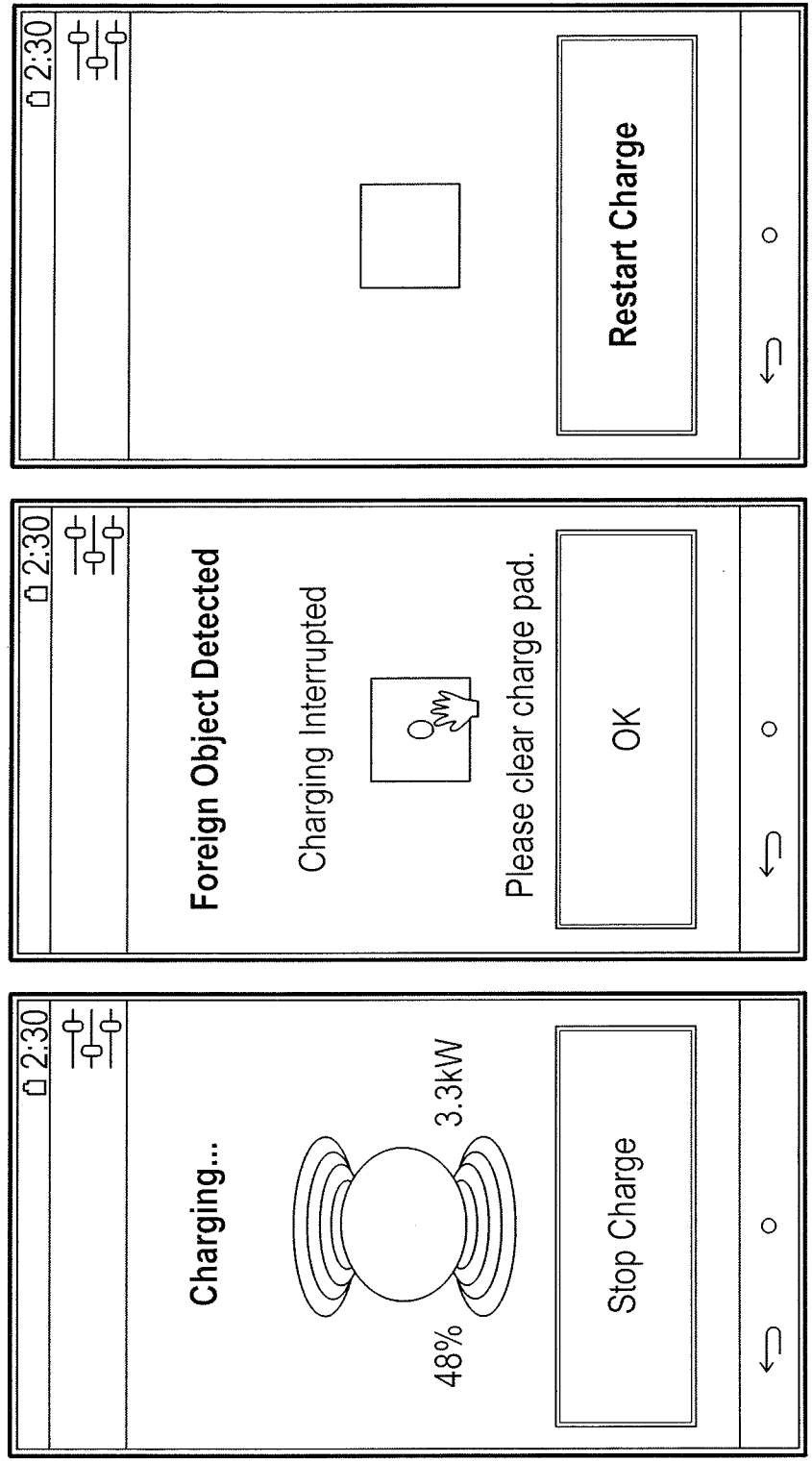
FIGS. 22A-22F show exemplary user notifications and interfaces.

FIG. 22A shows a user interface with charging details and an option for the user to stop charging. In some implementations, FIG. 22A can correspond with fault severity level 1 discussed above with respect to Table 1, above. FIG. 22B shows a notification that a foreign object is detected and an option to dismiss the screen. FIG. 1. In some implementations, FIG. 22B can correspond with fault severity level 5 discussed above with respect to Table 1, above.

FIG. 22C shows a notification that a living object is detected and an option to restart charging the screen. FIG. 1. In some implementations, FIG. 22C can correspond with fault severity level 4 discussed above with respect to Table 1, above. FIG. 22D shows a notification that a living object is detected and an option to restart charging the screen. In some implementations, FIG. 22D can correspond with fault severity level 4 discussed above with respect to Table 1, above. FIG. 22E shows a notification that a living object is detected and an option to restart charging the screen. In some implementations, FIG. 22E can correspond with fault severity level 7 discussed above with respect to Table 1, above.

Figure 22F:
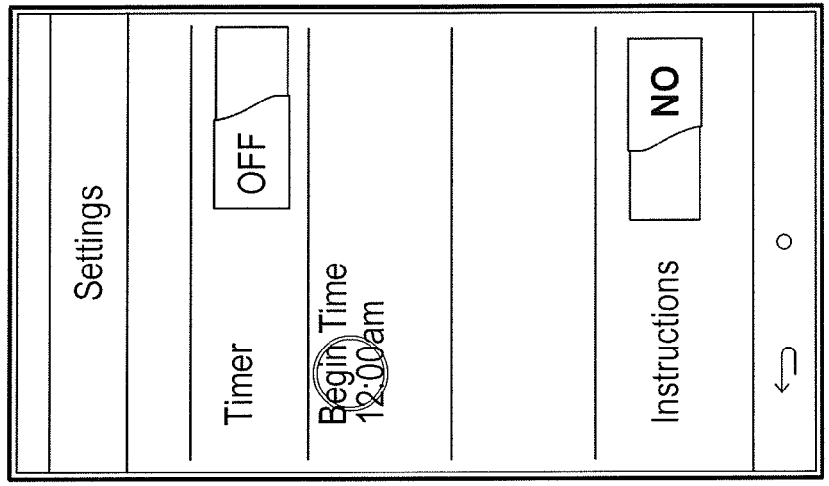
Figure 22E:
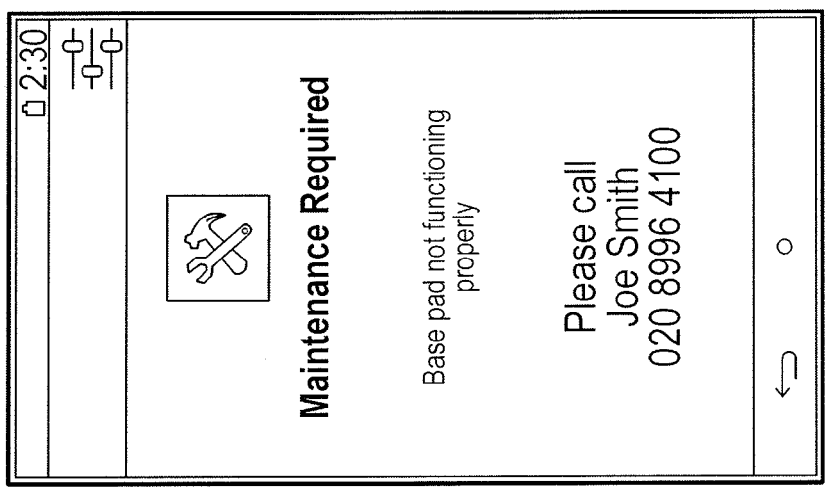
Figure 22D:
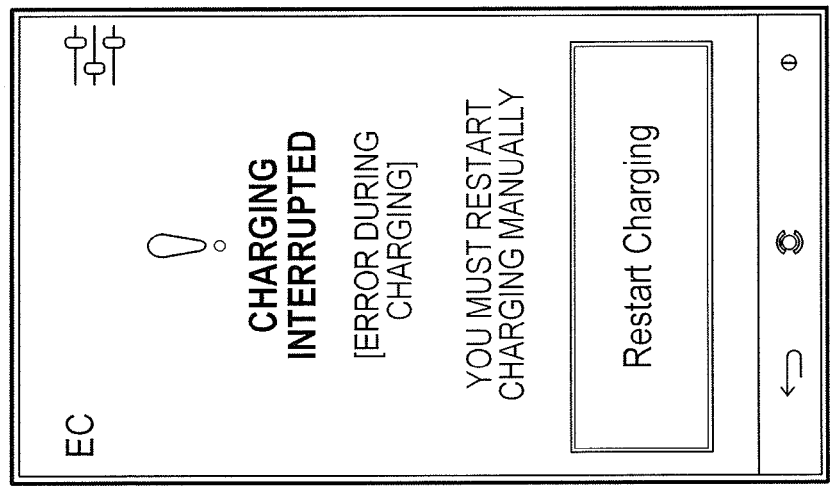

FIG. 22F shows an exemplary timer that can be configured to automatically start and/or stop wireless electric vehicle charging. As shown in FIG. 22F, the DLU 330 can be configured as a machine user agent. The user can set a timer on or off. The user can select a time to begin charging, which can be immediately or a future time. The user can select a charging duration. For example, the user can set charging to occur for a specified amount of time, to end at a particular time in the future, to end when charging is complete, or to end when a charging state reaches a specified fraction of full charge.

To allow for delaying charging, the VCU 322 may perform one or more validation functions at the time of the scheduled charge to ensure system safety and efficient operation, particularly where the user is driving at the time of the scheduled charged or has moved the car in between. For example, at the time of the scheduled charge the VCU 322 may check one or more car states (e.g., car is not moving or is in a parked state) to determine whether charging may occur at the delayed time. In addition, the VCU 322 may determine whether the vehicle is still aligned at the time of the delayed charge. In this case, while the VCU 322 may have progressed to a ready to charge state when the charge was scheduled (or some other state), upon detection that it is time to charge according to the schedule, the VCU 322 may transition to one of the alignment states (e.g., the charge state 760) to automatically check alignment.

If the VCU 322 detects misalignment then the vehicle may not charge and send the user a notification that charging will not occur at the scheduled time. When the vehicle is not scheduled for charge the VCU 322 may have any LOP or FOD systems deactivated. At the scheduled time, the VCU 322 may activate these systems and in accordance with the delays described above with reference to the LOP system, the VCU 322 may re-validate that it is safe to charge. The VCU 322 may perform other validation checks at the time of the scheduled charge and only initiate charging based on validating that charging may safely occur. Validation checks can be particularly useful in situations where the vehicle was previously aligned but subsequently moved, the vehicle was not aligned to begin with, the vehicle is currently moving, etc.

In various implementations, delayed charging parameters can include a recurring charging schedule. For example, charging can be set to begin and/or end at one or more times every day, every week, and so forth. In various implementations, a recurring charging schedule can be subject to exceptions such as, for example, different schedules for weekdays and weekends, preconditions such as a threshold charge state (or other vehicle or environmental conditions), real-time energy pricing thresholds, etc.

Figure 23A:
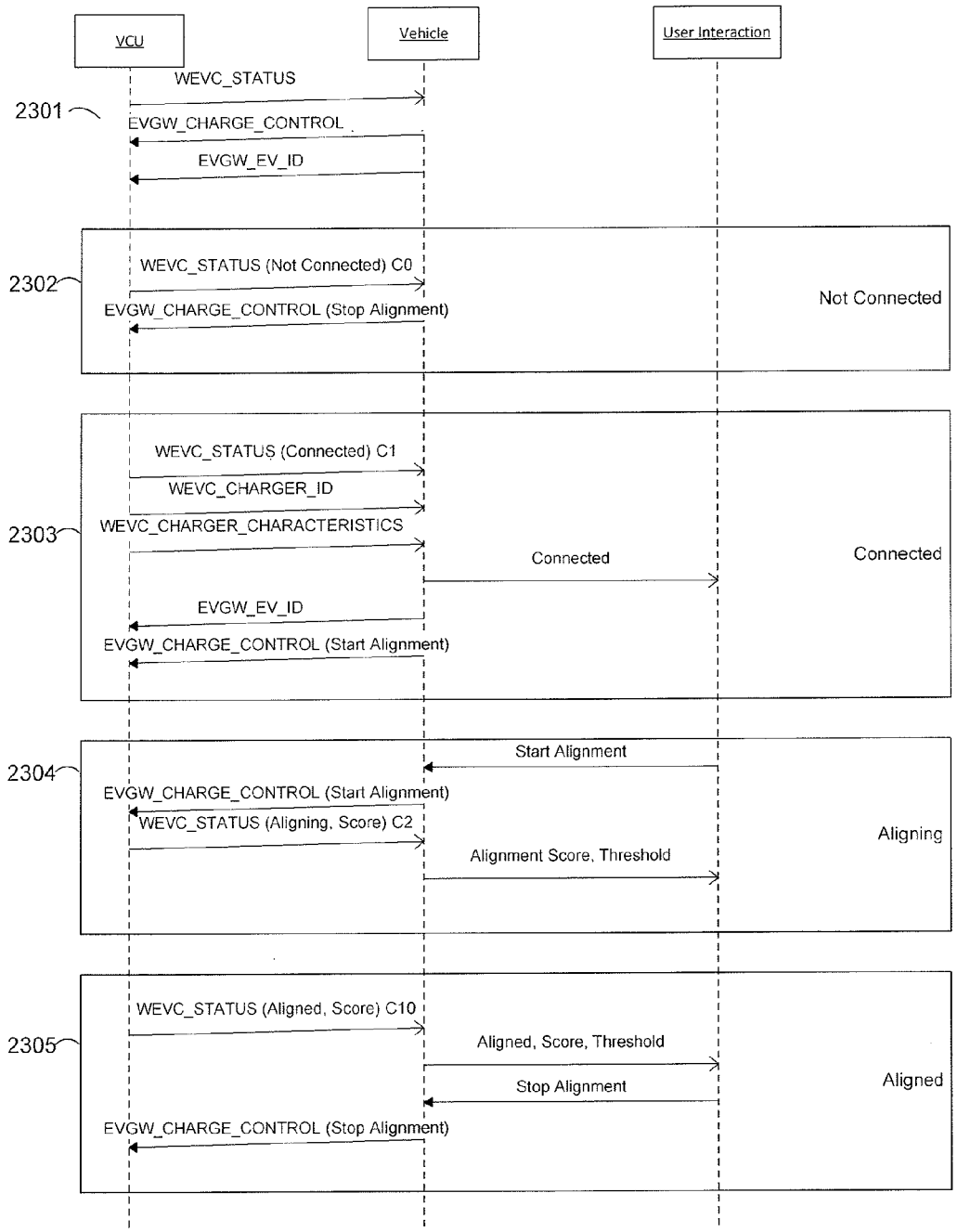
FIG. 23A shows an exemplary call flow for controlling a WEVC system according to the state machine diagrams of FIGS. 7A-7C, in accordance with some exemplary implementations.

FIG. 23A is an exemplary call flow diagram for the state machine of FIG. 7A. FIG. 23A illustrates the call flow between the VCU 322 and the electric vehicle 402 in different states and how the state transitions occur based on various messages and/or user interaction (e.g., input to DLU 330). In some aspects, the vehicle or BMS ECU 324, charge control ECU (BMS) 365, battery 318, or another electric vehicle 402 controller may send the calls depicted as being sent by the electric vehicle 402. In some aspects, the communication between the electric vehicle 402 and the VCU 322 may occur over the WEVC CAN bus 368. In some aspects, the user interaction described below may be optional and all communication may occur between the VCU 322 and the electric vehicle 402. In some implementations, the call flow messages illustrated in FIGS. 23A and 23B may include fewer or more messages and certain messages may be added or omitted.

The communication may begin in section 2301 when the VCU 322 sends a WEVC_STATUS message to the electric vehicle 402. The WEVC_STATUS is sent from the WEVC system 370 (or the VCU 322). This message includes the state of the WEVC system 370, faults that occur in the system, alignment and charging information. The electric vehicle 402 may use this message for making appropriate decisions in electric vehicle's 402 own state machine. Next in 2301, the electric vehicle 402 may send an EVGW_CHARGE_CONTROL message to the VCU 322. This message may include the commands sent from the vehicle 402 to the VCU 322. The electric vehicle 402 may also send an EVGW_ID message to the VCU 322. This message includes the identification information that is needed for the authorization/authentication before the commencement of the session.

Block 2302 illustrates the call flow for the C0—not connected state 710. In this state, the VCU may send a WEVC_STATUS message indicating that it is in the C0—not connected state 710. The electric vehicle 402 may then respond with an EVGW_CHARGE_CONTROL message indicating to the VCU 322 to stop alignment. Block 2303 illustrates the call flow for the C1-connected not aligned state 720. In this state, the VCU may send a WEVC_STATUS indicating that it is in the C1-connected not aligned state 720. The electric vehicle 402 may then respond to the VCU 322 with a WEVC_CHARGER_ID message which includes the charger identification information. The electric vehicle 402 may also send to the VCU 322 a WEVC_CHARGER_CHARACTERISTICS message which includes information about the WEVC system's 370 capabilities. The electric vehicle 402 then sends to the DLU 330 a message indicating that the electric vehicle 402 is connected to a wireless charger (BCU 306). In some implementations, this message is optional. The electric vehicle 402 may also send an EVGW_ID message to the VCU 322. The electric vehicle 402 may then send an EVGW_CHARGE_CONTROL message to the VCU 322 instructing the VCU 322 to start alignment.

Block 2304 illustrates the call flow for the C2-aligning state 730. In this state, the user may send a start alignment command to the electric vehicle 402. In some aspects, the electric vehicle 402 may send the command via the DLU 330. In some aspects, the electric vehicle 402 may independently determine to send the start alignment command to the VCU 322. The electric vehicle 402 may then send an EVGW_CHARGE_CONTROL message to the VCU 322 instructing the VCU 322 to start alignment. The VCU 322 may then send to the electric vehicle 402 a WEVC_STATUS message indicating that it is in the C2-aligning state 730 and an alignment score. The electric vehicle 402 may then send the alignment score and a threshold alignment score for efficient charging to the user via the DLU 330.

Block 2305 illustrates the call flow for the C10-aligned state 740. In this state, the VCU 322 may send a WEVC_STATUS message indicating that it is in the C10-aligned state 740 and the alignment score. The electric vehicle 402 may then send the aligned status, the alignment score and the threshold alignment score for efficient charging to the user via the DLU 330. The user may then send a stop alignment command to the electric vehicle 402. The user may send this command via the DLU 330. In some aspects, the electric vehicle 402 may independently determine to send the stop alignment command to the VCU 322. The electric vehicle 402 may then send an EVGW_CHARGE_CONTROL message to the VCU 322 instructing the VCU 322 to stop alignment.

Figure 23B:
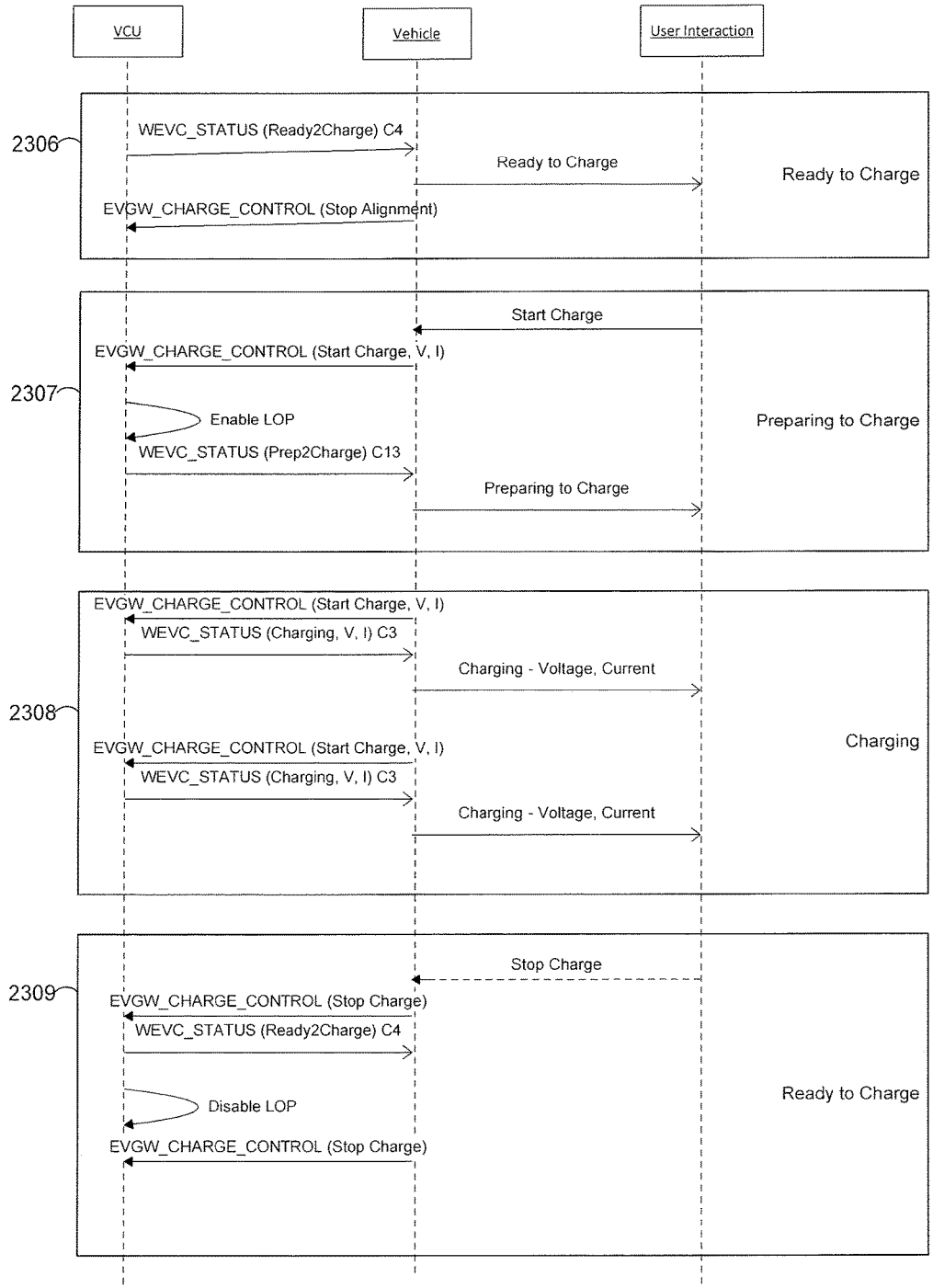
FIG. 23B shows an exemplary call flow for controlling a WEVC system according to the state machine diagrams of FIGS. 7A-7C, in accordance with some exemplary implementations.

FIG. 23B is an exemplary call flow diagram for the state machine of FIG. 7A. FIG. 23B illustrates the call flow between the VCU 322 and the electric vehicle 402 in different states and how the state transitions occur based on user interaction (e.g., input to DLU 330) and continues from the call flows described in FIG. 23A. Block 2306 illustrates the call flow for the C4-ready to charge state 750. In this state, the VCU 322 may send a WEVC_STATUS message indicating that it is in the C4-ready to charge state 750. The electric vehicle 402 may then send the state status (e.g., C4-ready to charge state 750) to the user via the DLU 330. The electric vehicle 402 may then send an EVGW_CHARGE_CONTROL message to the VCU 322 instructing the VCU 322 to stop alignment.

Block 2307 illustrates the call flow for the C13-preparing to charge state 760. In this state, the user may send a message to the electric vehicle 402 to start charging. The user may send this command via the DLU 330. In some aspects, the electric vehicle 402 may independently determine to send the start charge command to the VCU 322. The electric vehicle 402 may then send an EVGW_CHARGE_CONTROL message to the VCU 322 instructing the VCU 322 to start charging. The VCU 322 may then enable its LOP for identifying living objects. The VCU 322 may then send a WEVC_STATUS message indicating that it is in the C13-preparing to charge state 760. The electric vehicle 402 may then send the state status (e.g., C13-preparing to charge state 760) to the user via the DLU 330.

Block 2308 illustrates the call flow for the C3-charging state 770. In this state, the electric vehicle 402 may then send an EVGW_CHARGE_CONTROL message to the VCU 322 instructing the VCU 322 to start charging. The VCU 322 may then send a WEVC_STATUS message indicating that it is in the C3-charging state 770. The electric vehicle 402 may then send the state status (e.g., C3-charging state 770) along with the voltage and current being supplied or other charging information to the user via the DLU 330. As the base pad 302 continues to charge the battery 318, the electric vehicle 402 may then send an EVGW_CHARGE_CONTROL message to the VCU 322 instructing the VCU 322 to start charging. The VCU 322 may then send a WEVC_STATUS message indicating that it is in the C3-charging state 770. The electric vehicle 402 may then send the state status (e.g., C3-charging state 770) along with the voltage and current being supplied or other charging information to the user via the DLU 330.

Block 2309 illustrates the call flow for the C4-ready to charge state 750. In block 2309, the VCU 322 transitions from the C3-charging state 770 to the C4-ready to charge state 750. In this state, the user may send a command to the electric vehicle 402 to stop charging. The user may send this command via the DLU 330. In some aspects, the electric vehicle 402 may independently determine to send the stop charge command to the VCU 322. The electric vehicle 402 may send an EVGW_CHARGE_CONTROL message to the VCU 322 instructing the VCU 322 to stop charging. The VCU 322 may then send a WEVC_STATUS message indicating that it is in C4-ready to charge state 750. The VCU 322 may then disable its LOP. The electric vehicle 402 may send an EVGW_CHARGE_CONTROL message to the VCU 322 instructing the VCU 322 to stop charging.

Figure 24:
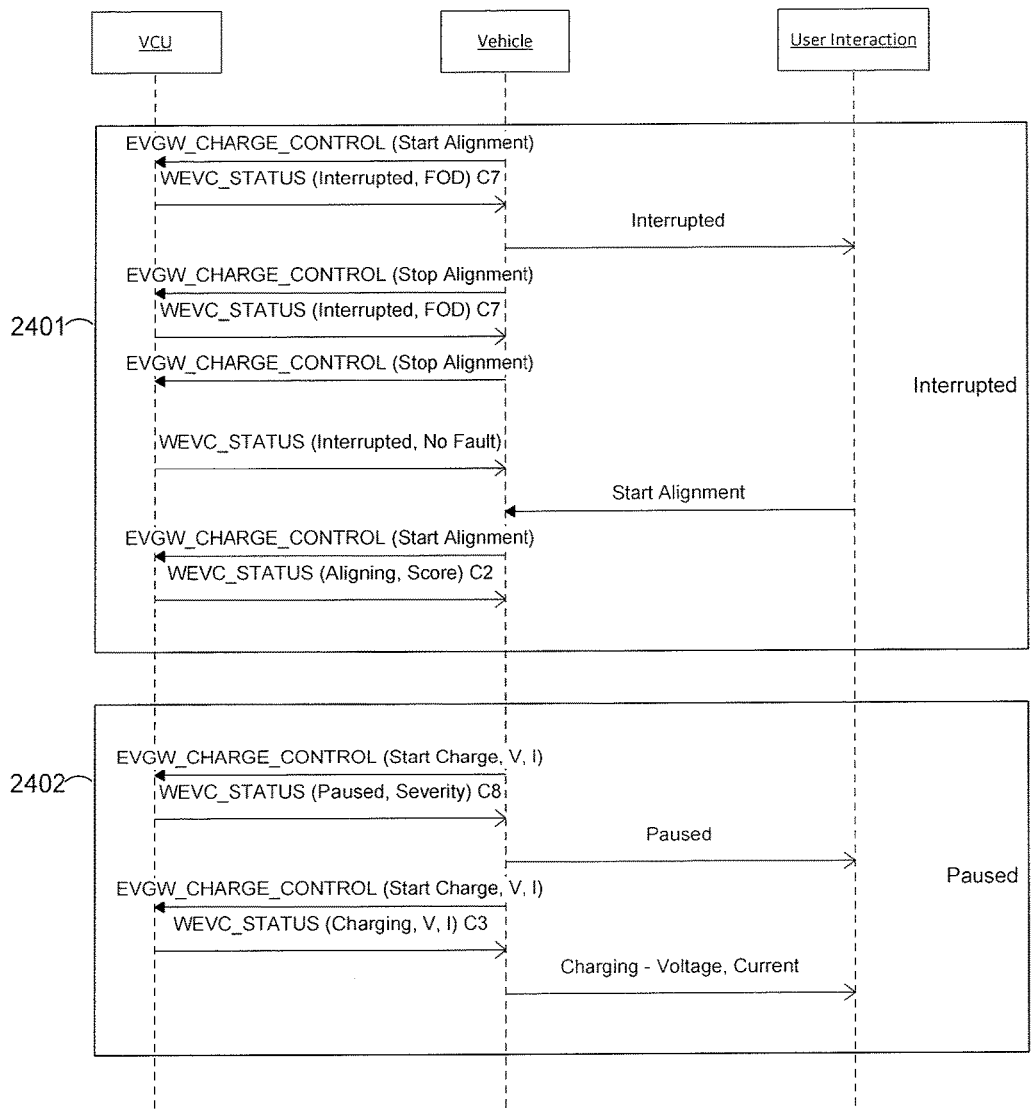
FIG. 24 shows an exemplary call flow for controlling a WEVC system according to the state machine diagrams of FIGS. 7B-7C, in accordance with some exemplary implementations.

FIG. 24 is an exemplary call flow diagram for the state machine of FIGS. 7B and 7C. FIG. 24 illustrates the call flow between the VCU 322 and the electric vehicle 402 in different states and how the state transitions occur based on various messages and/or user interaction (e.g., input to DLU 330) and continues from the call flows described in FIGS. 23A and 23B. In some aspects, the communication between the electric vehicle 402 and the VCU 322 may occur over the WEVC CAN bus 368. In some aspects, the user interaction described below may be optional and all communication may occur between the VCU 322 and the electric vehicle 402. In some implementations, the call flow messages illustrated in FIG. 24 may include fewer or more messages and certain messages may be added or omitted.

Block 2401 illustrates the call flow for the C7-interrupted (fault) state 780. In this state, the electric vehicle 402 may send an EVGW_CHARGE_CONTROL message to the VCU 322 instructing the VCU 322 to start alignment. The VCU 322 may then send a WEVC_STATUS message indicating that it is in C7-interrupted (fault) state 780 because of FOD. The electric vehicle 402 may then send the state status (e.g., C7-interrupted (fault) state 780) to the user via the DLU 330. The electric vehicle 402 may then send an EVGW_CHARGE_CONTROL message to the VCU 322 instructing the VCU 322 to stop alignment. The VCU 322 may then send a WEVC_STATUS message indicating that it is in C7-interrupted (fault) state 780 because of FOD. The electric vehicle 402 may then send an EVGW_CHARGE_CONTROL message to the VCU 322 instructing the VCU 322 to stop alignment. The VCU 322 may then send a WEVC_STATUS message indicating that it is in C7-interrupted (fault) state 780 but currently has no faults. The user may send a start alignment command to electric vehicle 402. In some aspects the user may send this command via the DLU 330. The electric vehicle 402 may then send an EVGW_CHARGE_CONTROL message to the VCU 322 instructing the VCU 322 to start alignment. The VCU 322 may then send a WEVC_STATUS message indicating that it is in C2-aligning state 730 and the alignment score.

Block 2402 illustrates the call flow for the C8-paused state 785. In this state, the electric vehicle 402 may send an EVGW_CHARGE_CONTROL message to the VCU 322 instructing the VCU 322 to start charging. The VCU 322 may then send a WEVC_STATUS message indicating that it is in C8-paused state 785 because of a fault with a threshold severity level. The electric vehicle 402 may then send the state status (e.g., C8-paused state 785) to the user via the DLU 330. The electric vehicle 402 may then send an EVGW_CHARGE_CONTROL message to the VCU 322 instructing the VCU 322 to start charging. The VCU 322 may then send a WEVC_STATUS message indicating that it is in C3-charging state 770. The electric vehicle 402 may then send the state status (e.g., C3-charging state 770) to the user via the DLU 330.

Figure 25A:
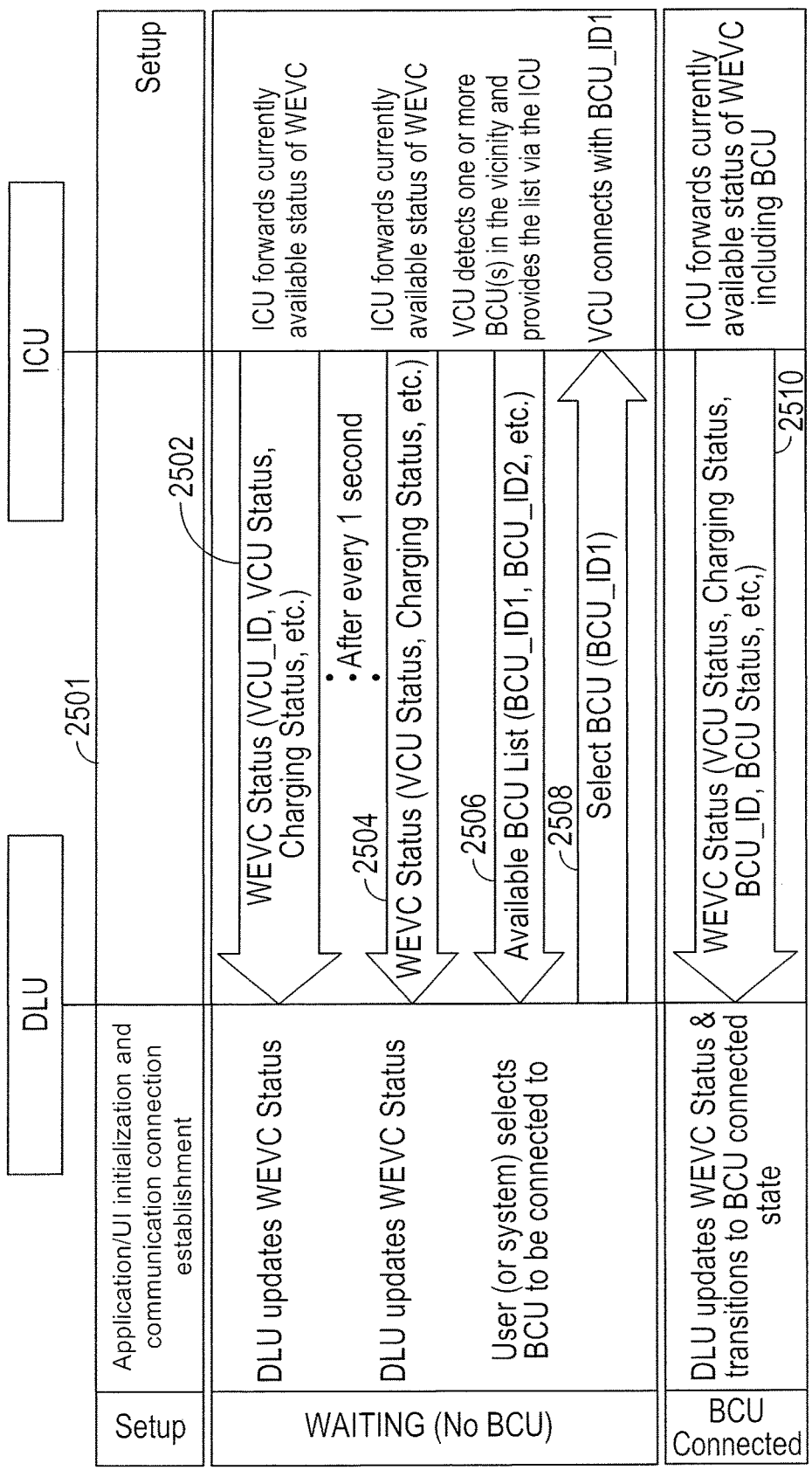
FIGS. 25A and 25B shows an exemplary call flow between a user interface and a vehicle controller, in accordance with exemplary embodiments.

FIG. 25A is an exemplary call flow diagram between the DLU 330 and the ICU 316 in different states and how the state transitions occur based on user interaction (e.g., input to DLU 330). Block 2501 illustrates the call flow for the setup state. In this state the DLU application/user interface (UI) initializes and establishes a communication connection with the ICU 316. Once connection is established the DLU 330 and the ICU 316 may enter the waiting (no BCU) state. In this state, the ICU 316 may send to the DLU 330 a WEVC_STATUS message 2502 indicating the current status of the WEVC system 370. The status information may include the VCU 322 ID, the VCU 322 status, the charging status of the battery 318, or other status information. The DLU 330 may update the WEVC system 370 status based on the WEVC_STATUS message 2502. The ICU 316 may continue to send the WEVC_STATUS message 2502 every interval of time. As illustrated, the ICU 316 sends the WEVC_STATUS message 2502 every 1 second, but other intervals are possible. The DLU 330 may update the WEVC system 370 status after receiving each WEVC_STATUS message 2502. The ICU 316 may then send a WEVC_STATUS message 2504 indicating the current status of the WEVC system 370 followed by an available BCU list message 2506. The ICU 316 may send the available BCU list message 2506 upon the VCU 322 detecting one or more BCU(s) 306 in the vicinity. The available BCU list message 2506 lists the identifications for each of the detected BCUs 306. Next the user or the WEVC system 370 may select the one BCU 306 to be connected to and the DLU 330 may send a message 2508 indicating the selected BCU 306. The ICU 316 may then instruct the VCU 322 to connect to the selected BCU 306.

Once the VCU 322 connects to the selected BCU 306, the DLU 330 and the ICU 316 may enter the BCU connected state. In this state, the ICU 316 may send to the DLU 330 a WEVC_STATUS message 2510 indicating the currently available status of the WEVC system 370, including the selected BCU 306. The status information may include the VCU 322 status, the charging status of the battery 318, the BCU ID, the BCU 306 status, or other status information. The DLU 330 may update the WEVC system 370 status and transition to the BCU connected state based on the WEVC_STATUS message 2510.

Figure 25B:
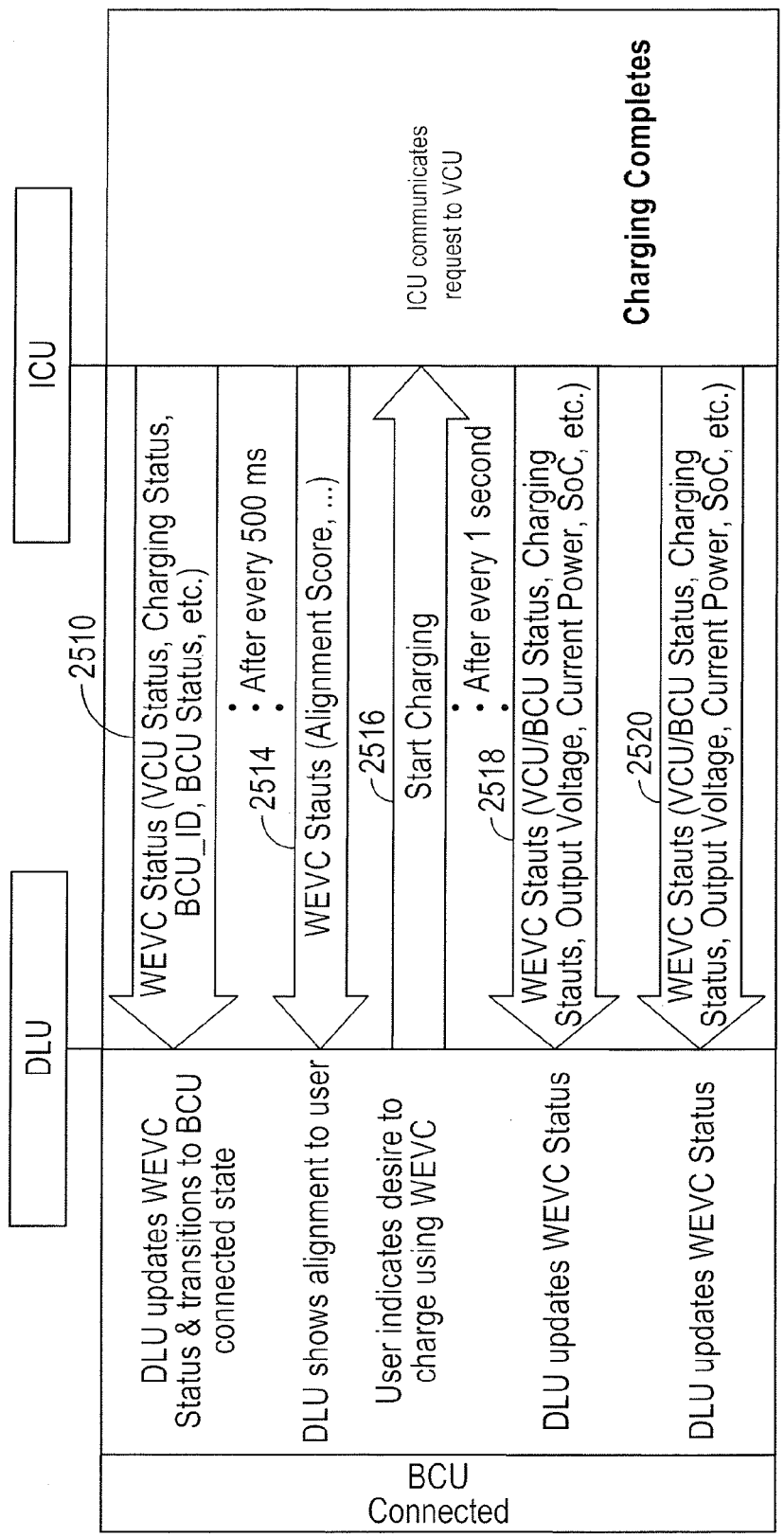

FIG. 25B is a call flow diagram continues from the call flows described in FIG. 25A. In FIG. 25B the DLU 330 and the ICU 316 are in the BCU connected state described with respect to FIG. 25A. The ICU 316 may continue to send to the DLU 330 the WEVC_STATUS message 2510 indicating the currently available status of the WEVC system 370, including the selected BCU 306 every interval of time. As illustrated, the ICU 316 sends the WEVC_STATUS message 2510 every 500 ms, but other intervals are possible. The DLU 330 may update the WEVC system 370 status after receiving each WEVC_STATUS message 2510. The ICU 316 may then send a WEVC_STATUS message 2514 indicating the current status of the WEVC system 370, including the selected BCU 306 and an alignment score. The DLU 330 may update the WEVC system 370 status and show the alignment to the user based on the WEVC_STATUS message 2514. Exemplary implementations of the display of the alignment score are discussed more fully below with reference to FIGS. 20A-20G. The user may then indicate a desire to charge using the WEVC system 300. The user may indicate the desire through an input to the DLU 330. The DLU 330 may then send a start charging message 2516 to the ICU 316 and the ICU 316 may communicate the request to the VCU 322. The DLU 330 may continue to send the start charging message 2516 to the ICU 316 every interval of time. As illustrated, the DLU 330 sends the start charging message 2516 every 1 second, but other intervals are possible. The ICU 316 may then send a WEVC_STATUS message 2518 indicating the current status of the WEVC system 370, including the selected BCU 306. The status information may include VCU 322 status, the BCU 306 status, the charging status, output voltage, the current power, the state of charge, or other status information. The DLU 330 may update the WEVC system 370 status based on the WEVC_STATUS message 2514. Once the charging process completes, the ICU 316 may send a WEVC_STATUS message 2520 indicating the current status of the WEVC system 370, updating the charging status to indicate a completed charge. The status information may include VCU 322 status, the BCU 306 status, the charging status, output voltage, the current power, the state of charge, or other status information. The DLU 330 may update the WEVC system 370 status based on the WEVC_STATUS message 2520.

Figure 26A:
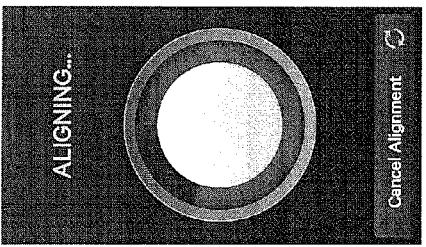
FIGS. 26A-26D are depictions of an exemplary alignment operation in a user interface display, in accordance with some exemplary implementations.
Figure 26B:
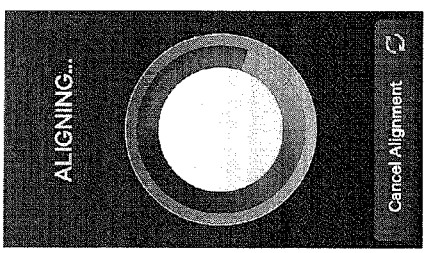
Figure 26C:
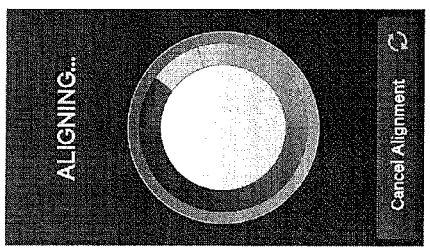
Figure 26D:
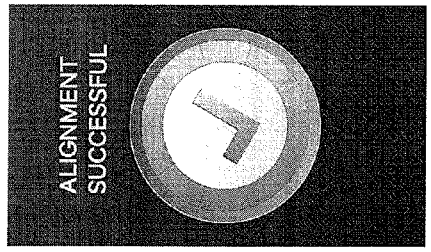

FIG. 26A-26D are exemplary displays of the DLU 330 indicating an alignment status of the vehicle pad 312 and the base pad 302. In some implementations, the displays may be utilized in the DLU 330. The display illustrates a circular object with a border that may become filled as the vehicle pad 312 becomes aligned with a base pad 302 as one example. Other shapes for the UI elements may be used in accordance with the principles herein. In some implementations, the electric vehicle 402 may be in the C2 aligning state 730 and the DLU 330 may display the alignment status. In FIG. 26A, the electric vehicle 402 may be starting alignment and has a lower alignment score as indicated by a small portion of the circular status display being filled with a red color. In some implementations, other color combinations are possible. In FIG. 26B, the electric vehicle 402 may be moving closer to the base pad 302 and the alignment score increase from the score in FIG. 26A as indicated by more portion of the display being filled. In FIG. 26C, the display border is nearly filled indicating that the vehicle pad 312 and the base pad 302 are almost aligned for efficient power transfer. In FIG. 26D, the border is completely filled, the color of the border turns to green and the center of the circular object illustrates a green check mark to indicate that the vehicle pad 312 and the base pad 302 are aligned for efficient power transfer. Other visual cues may also be used. In some implementations, each of the stages represented in FIGS. 26A-26D may be accompanied by audio cues to help the driver align the vehicle pad 312 to the base pad 302. In some aspects, the audio cues may include a tone that increase in volume and/or frequency as the vehicle pad 312 nears the base pad 302. In some aspects, the audio cues may include a voice message stating that the electric vehicle 402 is properly aligned. In some implementations, each of the stages represented in FIGS. 26A-26D may be accompanied by other sensory cues to help the driver align the vehicle pad 312 to the base pad 302. In some implementations, the sensory cues may include vibration, lights, or other audio or visual cues.

Figure 27A:
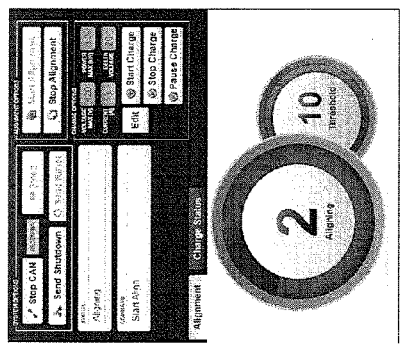
FIGS. 27A, 27B, and 28 are depictions of an exemplary alignment operation in a user interface display, in accordance with some exemplary implementations.
Figure 27B:
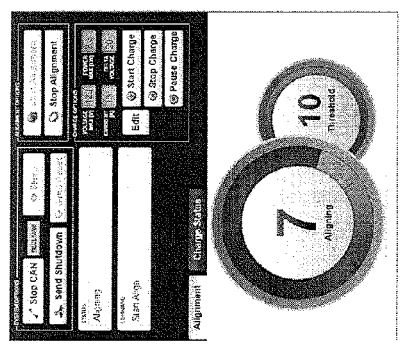
Figure 28:
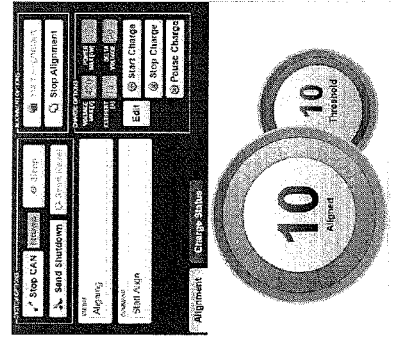

FIGS. 27A, 27B, and 28 are exemplary displays indicating a current alignment score and a threshold alignment score for wireless power transfer. In some implementations, the displays may be utilized in the DLU 330. As illustrated the display in FIG. 27A has a similar circular object with a border as describe above with reference to FIGS. 26A-D. FIG. 27A differs from FIGS. 26A-D in that in the center of the circular object, there is a number representation of the alignment score. In some aspects, this number may be a normalized value of the maximum degree of magnetic coupling needed for effective and efficient power transfer between the vehicle pad 312 and the base pad 302. In some aspects, the maximum degree of magnetic coupling possible may vary between different electric vehicles 402 and different base pads 302. FIG. 27A also illustrates a second circular object with a number representation in the middle of the object. The number in the second circular object may indicate the threshold alignment score for the WEVC system 370 to efficiently transfer power and give the aligned indication to the user, as illustrated in FIG. 26D. In some aspects the second circular object may not be visible to the user of the DLU 330. As illustrated in FIG. 27A, the current alignment score is 2 and the threshold value is 10. In some aspects, the threshold value may not equal the maximum possible coupling but may represent a value sufficient for efficient energy transfer. The numbers used in FIGS. 27A, 27B, and 28 are exemplary and other possible values may be used. In FIG. 27B, the electric vehicle 402 may continue to approach the base pad 302 and the alignment score has increase to 7, as indicated by the number representation and the partially filled in circular border. In FIG. 28, the number representation of the alignment score satisfies the threshold score of 10, the circular border fills completely and turns green to indicate that the vehicle pad 312 and the base pad 302 are aligned for efficient power transfer. In some implementations, other visual cues may also be used. In some implementations, each of the stages represented in FIGS. 27A, 27B, and 28 may be accompanied by audio cues to help the driver align the vehicle pad 312 to the base pad 302. In some aspects the audio cues may include a tone that increase in volume and/or frequency as the vehicle pad 312 nears the base pad 302. In some aspects, the audio cues may include a voice message stating that the electric vehicle 402 is properly aligned. In some implementations, each of the stages represented in FIGS. 27A, 27B, and 28 may be accompanied by other sensory cues to help the driver align the vehicle pad 312 to the base pad 302. In some implementations, the sensory cues may include vibration, lights, or other audio or visual cues.

Figure 29:
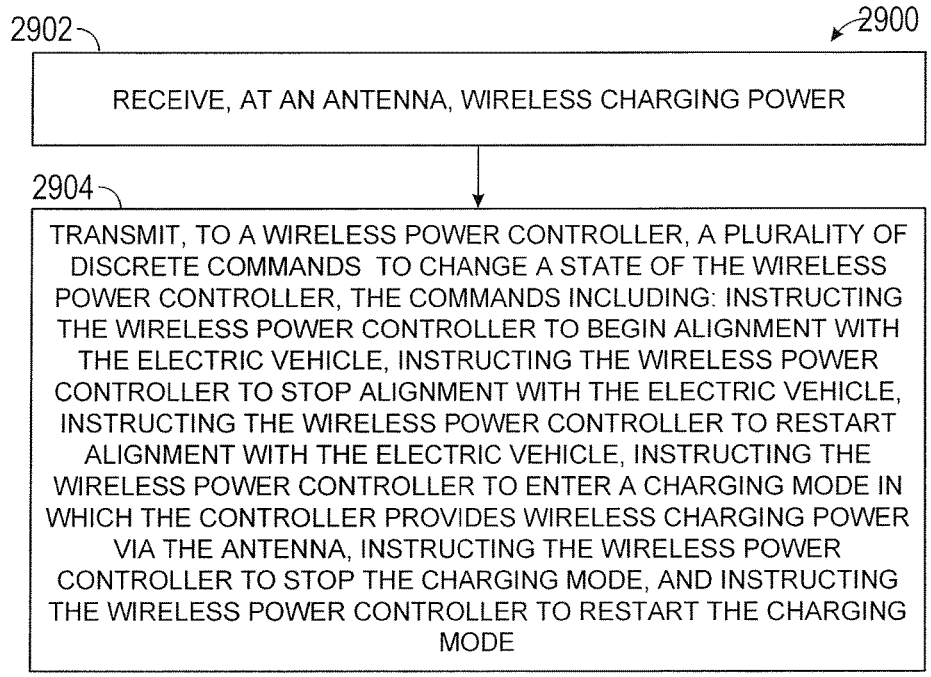
FIG. 29 illustrates a flowchart of a method for wirelessly charging an electric vehicle utilizing a wireless charger, in accordance with certain implementations described herein.

FIG. 29 illustrates a flowchart 2900 of a method for wirelessly charging an electric vehicle utilizing a wireless charger, in accordance with certain implementations described herein. The steps or actions described in FIG. 29 can be implemented in, or carried out by, any of the circuits and/or devices shown in either of FIGS. 1-3B. Although the method of flowchart 2900 is described below with respect to FIGS. 1-3B, those having ordinary skill in the art will appreciate that the method of flowchart 2900 may be implemented by any other suitable device. Although the method of flowchart 2900 is described herein with reference to a particular order, in various implementations, blocks herein may be performed in a different order, or omitted, and additional blocks may be added.

First, at block 2902, a wireless charging device receives, at an antenna, wireless charging power. For example, the vehicle segment 320 can receive wireless charging power from the charging station segment 310. More particularly, the VPC 314 can receive wireless charging power from the PSU 304 for charging the battery 318.

Next, at block 2904, the wireless charging device transmits, to a wireless power controller, a plurality of commands to change a state of the wireless power controller. The commands include instructing the wireless power controller to begin alignment with the electric vehicle, instructing the wireless power controller to stop alignment with the electric vehicle, instructing the wireless power controller to restart alignment with the electric vehicle, instructing the wireless power controller to enter a charging mode in which the controller provides wireless charging power via the antenna, instructing the wireless power controller to stop the charging mode, and instructing the wireless power controller to restart the charging mode. For example, the ICU 316 and/or the DLU 330 can transmit one or more of the messages, discussed above with respect to FIGS. 7A-8B4, 15-17B and 20A-20E, to the charging station segment 310.

In various implementations, the method can further include detecting a system fault. The method can further include activating one of a plurality of fault severity levels based on the system fault. For example, this may include mapping the system fault to one of the plurality of fault severity levels). The method can further include, when in a first fault severity level, providing a notification via a user interface and deactivating the fault severity level. The method can further include, when in a second fault severity level, deactivating the fault severity level without providing the notification. The method can further include, when in a third fault severity level, providing the notification, receiving an input via the user interface, and deactivating the fault severity level in response to the input. The method can further include, when in a fourth fault severity level, providing the notification and remaining in the fault severity level. For example, in various implementations, the ICU 316 can enter any of the fault severity levels discussed above with respect to Table 1 and FIG. 7A.

In various implementations, the system fault can include at least one of: a living object detection, a foreign object detection, and a hardware fault. In various implementations, the method can further include instructing the wireless power controller to stop the charging mode in response to the system fault. The method can further include ignoring one or more subsequent system faults for at least a first hold time. In various implementations, the method can further include instructing the wireless power controller to restart the charging mode when no system fault is detected for a first scan time after termination of the first hold time. For example, the ICU 316 can be configured with the hold time 2130 and/or scan time 2140 discussed above with respect to FIG. 21.

In various implementations, the method can further include receiving a delayed charging configuration indicating charging start criteria and/or charging end criteria. The method can further include instructing the wireless power controller to start the charging mode when the charging start criteria are met. The method can further include instructing the wireless power controller to stop the charging mode when the charging end criteria are met.

In various implementations, the charging start criteria can include one of an immediate charging start, an amount of time to wait before charging start, and a specific time for charging start. The charging end criteria can include one of a target fraction of full charge, an amount of charging time until charging end, and a specific time for charging end. For example, the ICU 316 and/or the DLU 330 can be configured to implement the timer discussed above with respect to FIG. 22F.

Figure 30:
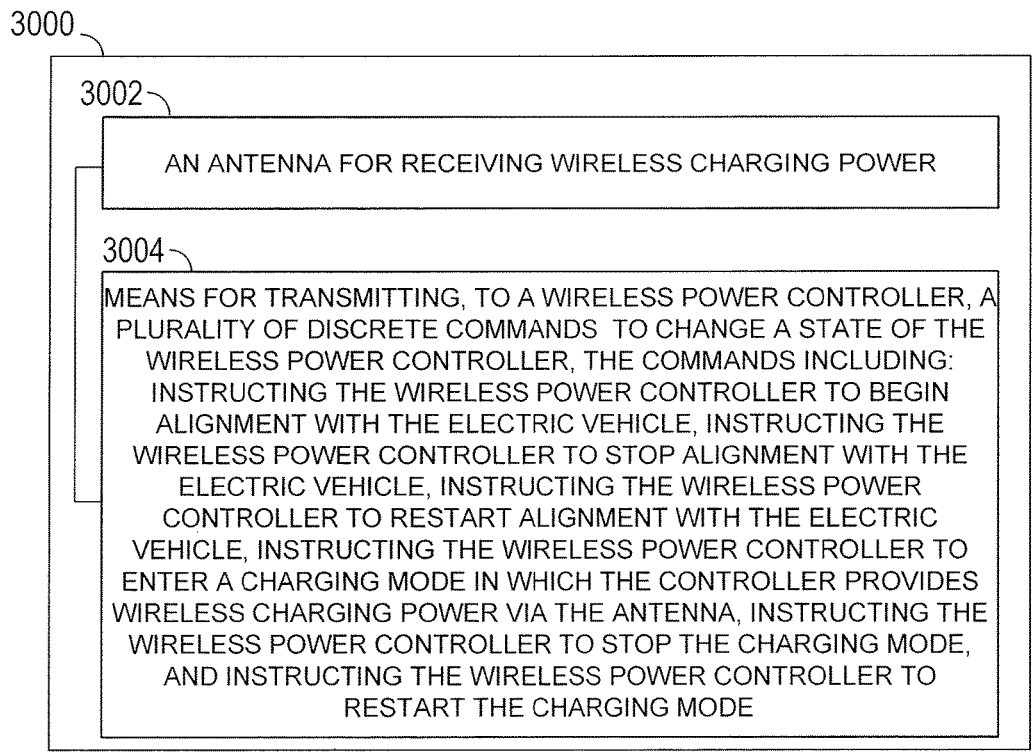
FIG. 30 is a functional block diagram of an apparatus, in accordance with some exemplary implementations.

FIG. 30 is a functional block diagram of an apparatus 3000, in accordance with some exemplary implementations. Those skilled in the art will appreciate that an apparatus for wirelessly charging an electric vehicle can have more components than the simplified apparatus 3000 shown in FIG. 30. The apparatus 3000 shown includes only those components useful for describing some prominent features of implementations within the scope of the claims.

The apparatus 3000 includes an antenna 3002 for receiving wireless charging power. In various implementations, the antenna 3002 can include means for receiving wireless charging power. In various implementations, means for receiving wireless charging power can include one or more of the coil 216, the VPC 314, and/or the VCU 322 of FIGS. 2-3A.

The apparatus 3000 further includes means 3004 for transmitting, to a wireless power controller, a plurality of commands to change a state of the wireless power controller. The commands can include instructing the wireless power controller to begin alignment with the electric vehicle, instructing the wireless power controller to stop alignment with the electric vehicle, instructing the wireless power controller to restart alignment with the electric vehicle, instructing the wireless power controller to enter a charging mode in which the controller provides wireless charging power via the antenna, instructing the wireless power controller to stop the charging mode, and instructing the wireless power controller to restart the charging mode. In various implementations, the means 3004 can be implemented by the ICU 316 and/or the DLU 330 of FIG. 3A.

Figure 31:
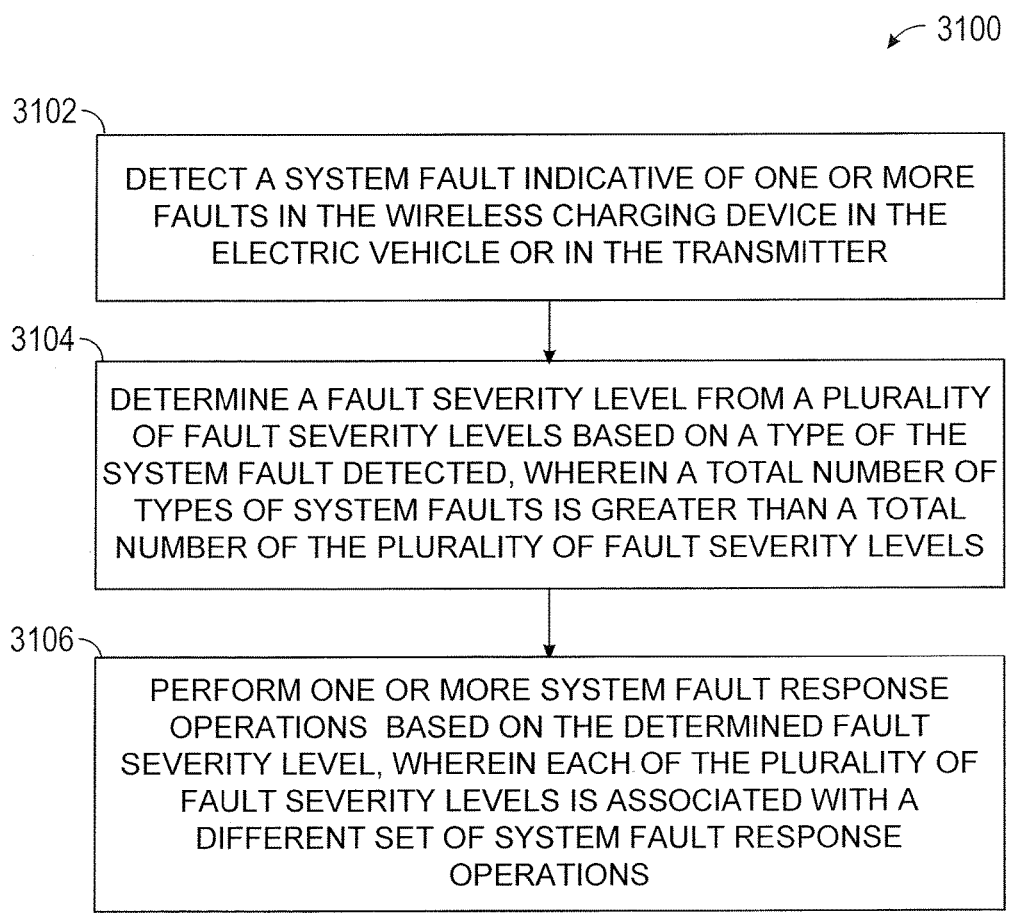
FIG. 31 illustrates a flowchart of another exemplary method for wirelessly charging an electric vehicle utilizing a wireless charger, in accordance with certain implementations described herein.

FIG. 31 illustrates a flowchart 3100 of a method for wirelessly charging an electric vehicle utilizing a wireless charger, in accordance with certain implementations described herein. The steps or actions described in FIG. 31 can be implemented in, or carried out by, any of the circuits and/or devices shown in either of FIGS. 1-3B. Although the method of flowchart 3100 is described below with respect to FIGS. 1-3B, those having ordinary skill in the art will appreciate that the method of flowchart 3100 may be implemented by any other suitable device. Although the method of flowchart 3100 is described herein with reference to a particular order, in various implementations, blocks herein may be performed in a different order, or omitted, and additional blocks may be added.

First, at block 3102, a wireless charging device detects a system fault. The system fault can be indicative of one or more faults in the wireless charging device in the electric vehicle or in the transmitter. In various implementations, the system fault can include at least one of: a living object detection, a foreign object detection, and a hardware fault. For example, the ICU 316 can detect a system fault when in the "C3—Charging" state 770 based on, for example a LOP trigger.

Next, at block 3104, the wireless charging device determines a fault severity level from a plurality of fault severity levels based on a type of the system fault detected. The total number of types of system faults can be greater than a total number of the plurality of fault severity levels. In various implementations, the ICU 316 can map the detected system fault to a severity level according to Table 1, above. For example, the ICU 316 can transition to the "C7—Interrupted" fault state 780.

Then, at block 3106, the wireless charging device performs one or more system fault response operations based on the determined fault severity level. Each of the plurality of fault severity levels can be associated with a different set of system fault response operations. For example, the ICU 316 can initiate any of the operations discussed above with respect to Table 1.

In various implementations, when in a first fault severity level, provides a notification via a user interface and deactivates the fault severity level. For example, the ICU 316 can notify the DLU 330 of the fault. In various implementations, the ICU 316 can deactivate the fault severity level without waiting for acknowledgement. For example, the ICU 316 can transition back to the "C1—Connected Not Aligned" state 720.

In various implementations, when in a second fault severity level, the ICU 316 can deactivate the fault severity level without providing the notification. For example, the ICU 316 can transition back to the "C1—Connected Not Aligned" state 720.

In various implementations, when in a third fault severity level, the ICU 316 can provide the notification, receive an input via the user interface, and can deactivate the fault severity level in response to the input. For example, the ICU 316 can notify the DLU 330 of the fault. In various implementations, the ICU 316 can wait for acknowledgement or other input from the DLU 330. After receiving acknowledgement, the ICU 316 can deactivate the fault severity level. For example, the ICU 316 can transition back to the "C1—Connected Not Aligned" state 720.

In various implementations, when in a fourth fault severity level, the ICU 316 can provide the notification and remain in the fault severity level. For example, the ICU 316 can notify the DLU 330 of the fault. In some implementations, the user cannot deactivate the fault severity level manually, as the fault may be critical.

In various implementations, at least one system fault response operations can include ignoring the system fault.

In various implementations, the system can be interrupted for charging or alignment in response to a first set of severity levels, and the system can continue charging in response to a second set of severity levels, different than the first severity levels. For example, the first set of severity levels can correspond with levels 0-4 discussed above with respect to Table 1, above. The second set of severity levels can correspond with levels 5-7 discussed above with respect to Table 1, above.

Figure 32:
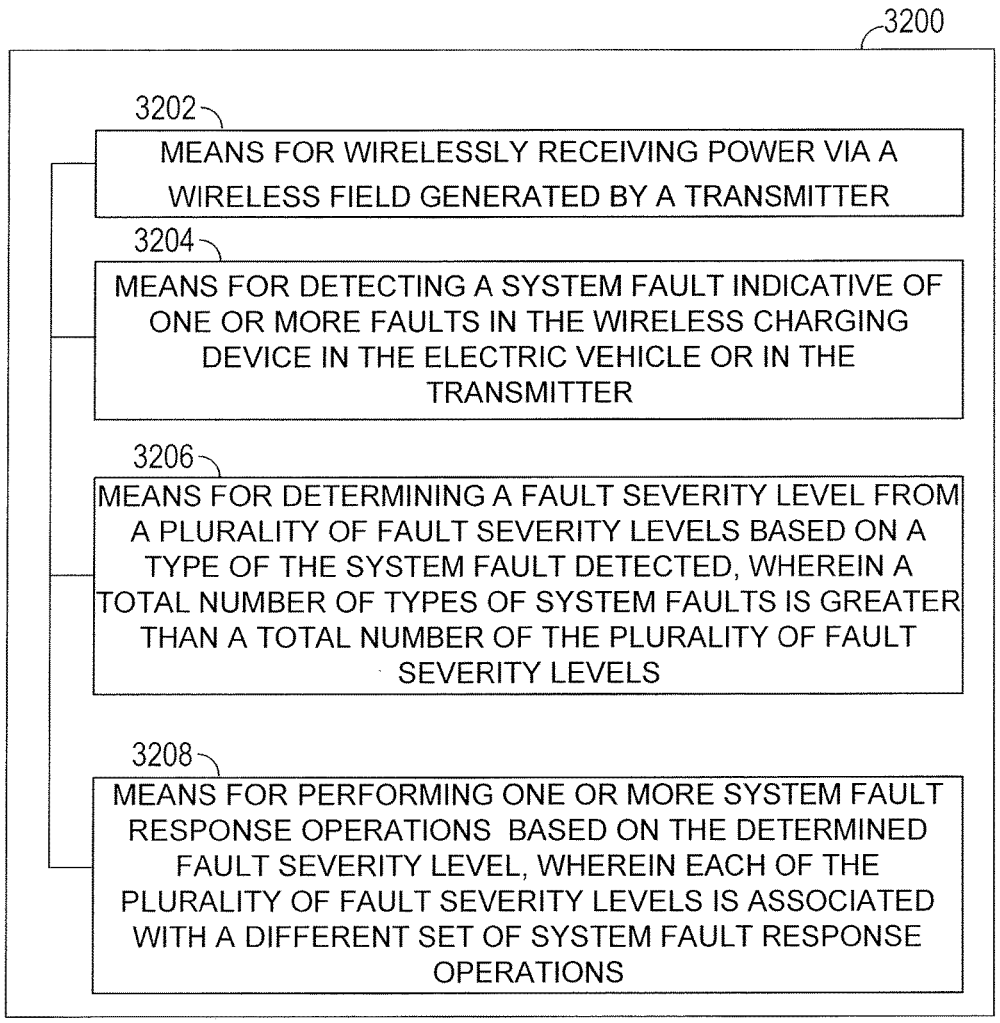
FIG. 32 is a functional block diagram of another apparatus, in accordance with some exemplary implementations.

FIG. 32 is a functional block diagram of an apparatus 3200, in accordance with some exemplary implementations. Those skilled in the art will appreciate that an apparatus for wirelessly charging an electric vehicle can have more components than the simplified apparatus 3200 shown in FIG. 32. The apparatus 3200 shown includes only those components useful for describing some prominent features of implementations within the scope of the claims.

The apparatus 3200 includes means 3202 for wirelessly receiving power. In various implementations, means 3202 for wirelessly receiving power can include one or more processors, controllers, antennas, the ICU 316 (FIG. 3), and/or the electric vehicle charging system 214 (FIG. 2). In various implementations, means 3202 for wirelessly receiving power can implement block 3102 of FIG. 31.

Figures 1, 8A:
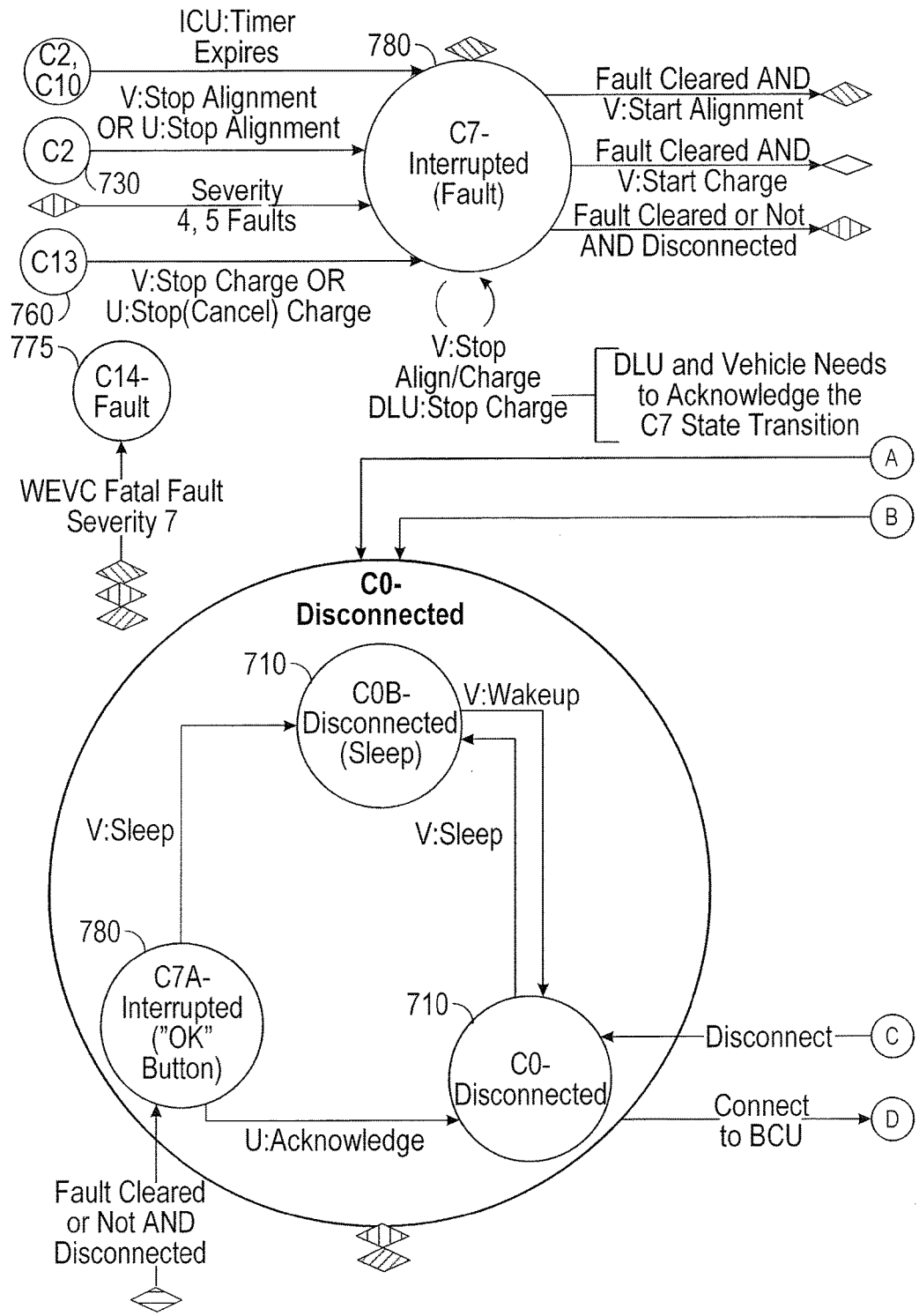
Figures 2, 8A:
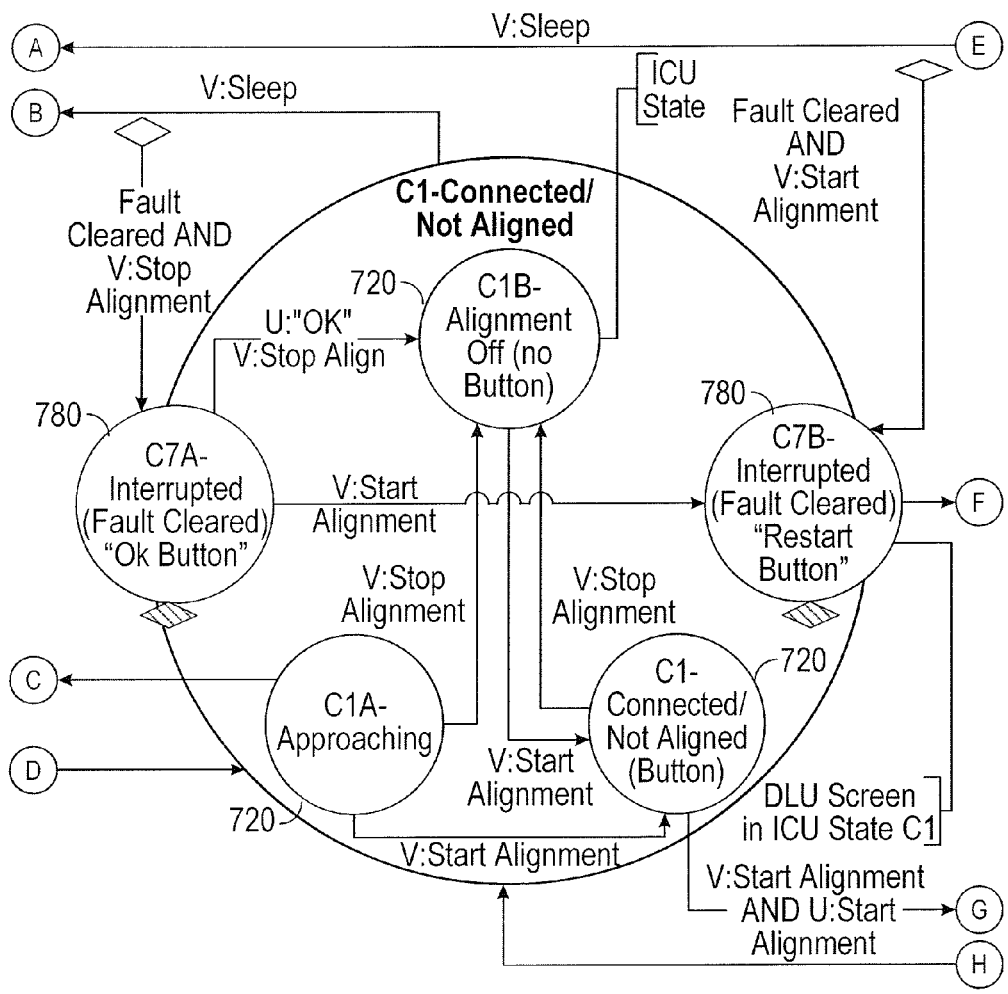
Figures 3, 8A:
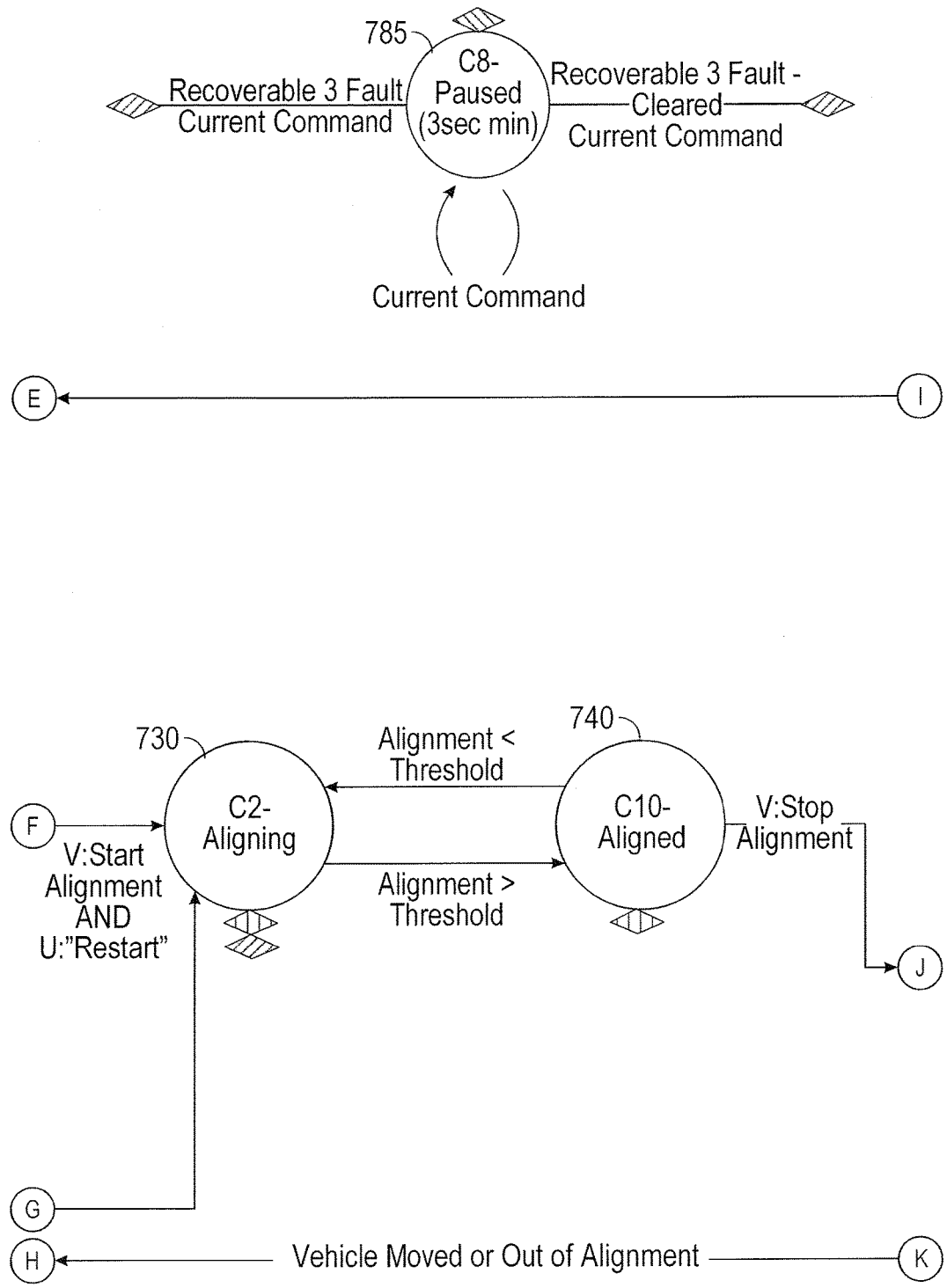
Figures 4, 8A:
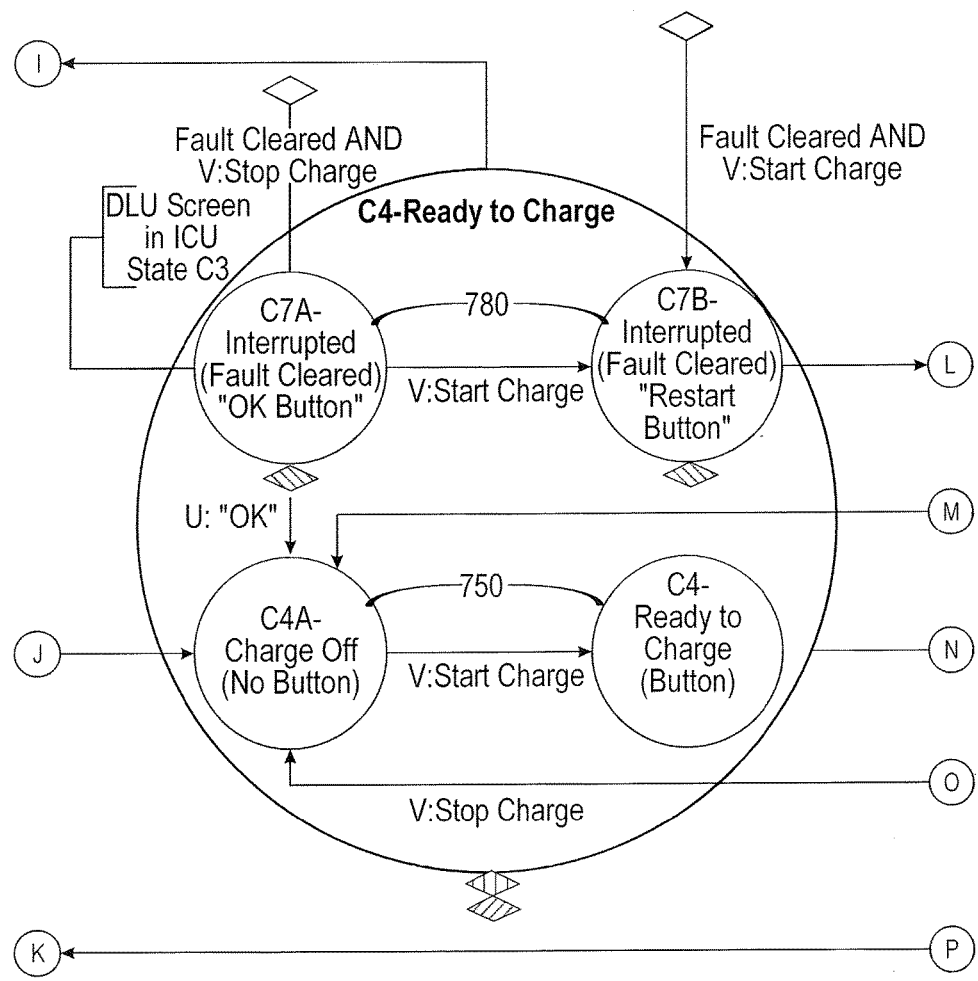
Figure 8A:
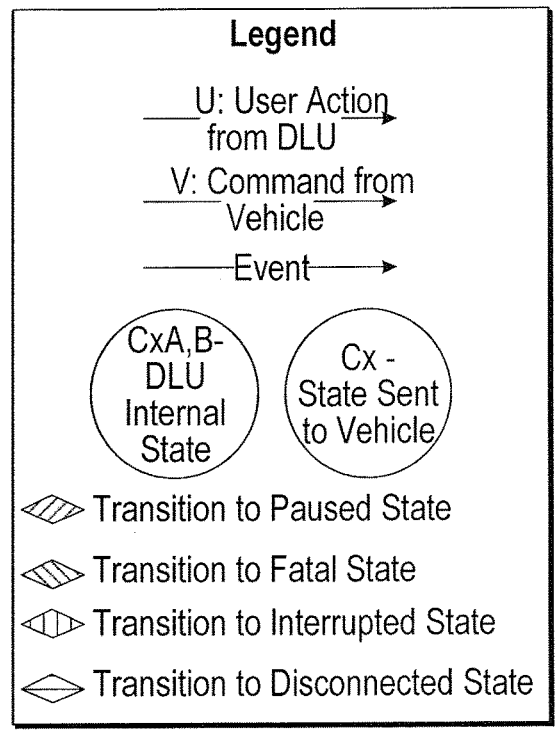

The apparatus 3200 further includes means 3204 for detecting a system fault. In various implementations, means 3204 for detecting a system fault can include one or more processors, controllers, and/or the ICU 316 (FIG. 3). In various implementations, means 3204 for detecting a system fault can implement block 3104 of FIG. 31.

The apparatus 3200 further includes means 3206 for determining a fault severity level. In various implementations, means 3206 for determining a fault severity level can include one or more processors, controllers, and/or the ICU 316 (FIG. 3). In various implementations, means 3206 for determining a fault severity level can implement block 3106 of FIG. 31.

The apparatus 3200 includes means 3208 for performing one or more system fault response operations. In various implementations, means 3208 for performing one or more system fault response operations can include one or more processors, controllers, and/or the DLU 330 (FIG. 3). In various implementations, means 3208 for performing one or more system fault response operations can implement block 3108 of FIG. 31.

In various implementations, the apparatus 3200 can further include additional means for implementing methods discussed herein. For example, in some implementations the apparatus 3200 can include means for, when in a first fault severity level, providing a notification via a user interface and deactivating the fault severity level. In various implementations, means for, when in a first fault severity level, providing a notification via a user interface and deactivating the fault severity level can include one or more processors, controllers, and/or the DLU 330 (FIG. 3). In various implementations, means for, when in a first fault severity level, providing a notification via a user interface and deactivating the fault severity level can implement block 3108 of FIG. 31.

In some implementations the apparatus 3200 can further include means for, when in a second fault severity level, deactivate the fault severity level without providing the notification. In various implementations, means or, when in a second fault severity level, deactivate the fault severity level without providing the notification can include one or more processors, controllers, the DLU 330 (FIG. 3) and/or the ICU 316 (FIG. 3). In various implementations, means or, when in a second fault severity level, deactivate the fault severity level without providing the notification can implement block 3108 of FIG. 31.

In some implementations the apparatus 3200 can further include means for, when in a third fault severity level, provide the notification, receiving an input via the user interface, and deactivate the fault severity level in response to the input. In various implementations, means for, when in a third fault severity level, provide the notification, receiving an input via the user interface, and deactivate the fault severity level in response to the input can include one or more processors, controllers, DLU 330 (FIG. 3) and/or the ICU 316 (FIG. 3). In various implementations, means for, when in a third fault severity level, provide the notification, receiving an input via the user interface, and deactivate the fault severity level in response to the input can implement block 3108 of FIG. 31.

In some implementations the apparatus 3200 can further include means for, when in a fourth fault severity level, provide the notification and remain in the fault severity level. In various implementations, means for, when in a fourth fault severity level, provide the notification and remain in the fault severity level can include one or more processors, controllers, and/or the DLU 330 (FIG. 3). In various implementations, means for, when in a fourth fault severity level, provide the notification and remain in the fault severity level can implement block 3108 of FIG. 31.

Figure 33:
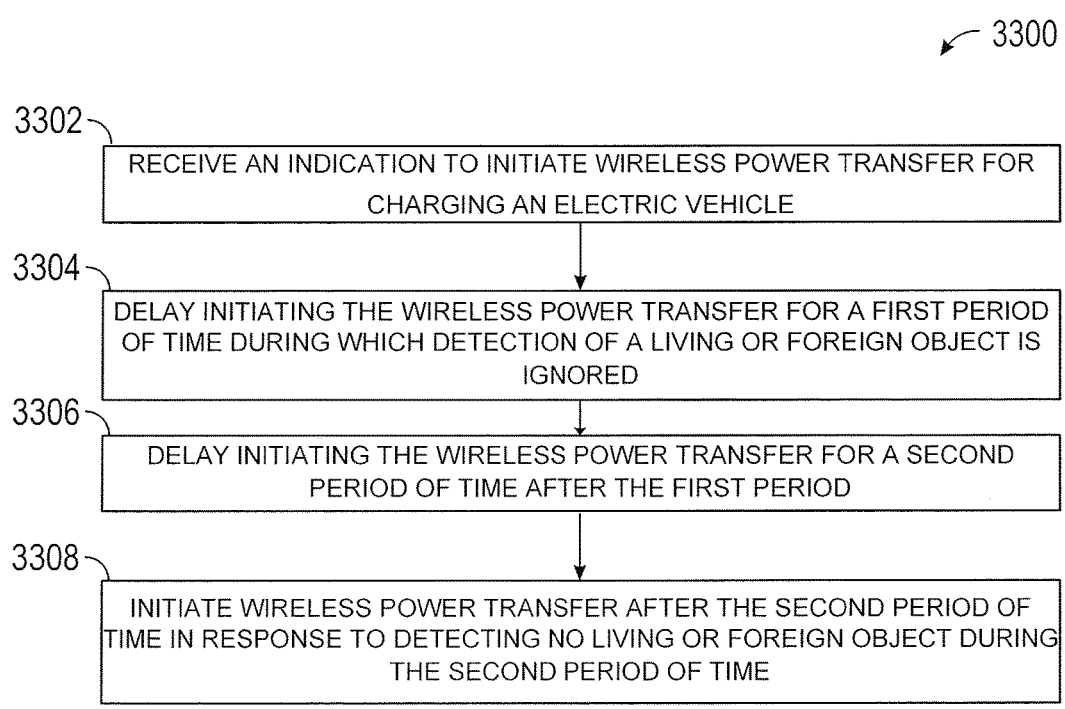
FIG. 33 illustrates a flowchart of another exemplary method for wirelessly charging an electric vehicle utilizing a wireless charger, in accordance with certain implementations described herein.

FIG. 33 illustrates a flowchart 3300 of a method for wirelessly charging an electric vehicle utilizing a wireless charger, in accordance with certain implementations described herein. The steps or actions described in FIG. 33 can be implemented in, or carried out by, any of the circuits and/or devices shown in either of FIGS. 1-3B. Although the method of flowchart 3300 is described below with respect to FIGS. 1-3B, those having ordinary skill in the art will appreciate that the method of flowchart 3300 may be implemented by any other suitable device. Although the method of flowchart 3300 is described herein with reference to a particular order, in various implementations, blocks herein may be performed in a different order, or omitted, and additional blocks may be added.

First, at block 3302, a wireless charging device receives an indication to initiate wireless power transfer for charging an electric vehicle. For example, the BCU 306 can receive an indication to initiate power transfer from the VPC 314.

Next, at block 3304, the device delays initiating the wireless power transfer for a first period of time during which detection of a living or foreign object is ignored. For example, the BCU 306 (FIG. 3) and/or the ICU 316 can delay wireless power transfer for the ignore time 2130 (FIG. 21).

Then, at block 3306, the device delays initiating the wireless power transfer for a second period of time after the first period. For example, the BCU 306 (FIG. 3) and/or the ICU 316 can delay wireless power transfer for the detect/scan time 2140 (FIG. 21) after the ignore time 2130 (FIG. 21) has elapsed.

Thereafter, at block 3308, the device initiates wireless power transfer after the second period of time in response to detecting no living or foreign object during the second period of time. For example, the BCU 306 (FIG. 3) and/or the ICU 316 can initiate wireless power transfer after the detect/scan time 2140 (FIG. 21) has elapsed without detection of a non-charging object.

In various implementations, receiving the indication to initiate wireless power transfer can be in response to an indication to re-start power transfer after a foreign or living object was cleared by a user. For example, the user can be presented with a notification (for example, see FIGS. 22C-22D). At the time 2125 (FIG. 21), the user can initiate charge restart. Accordingly, the ICU 316 can cause charging to restart.

In various implementations, the system operation can be interrupted in response to detecting a foreign or living object during the second period of time. For example, if during the detect/scan time 2140 (FIG. 21) another LOP is triggered, the system can return to LOP triggered state, e.g., at time 2115 (FIG. 21). Thus, in various implementations, the system can again wait for the user to restart charging as discussed above with respect to FIG. 21.

Figure 34:
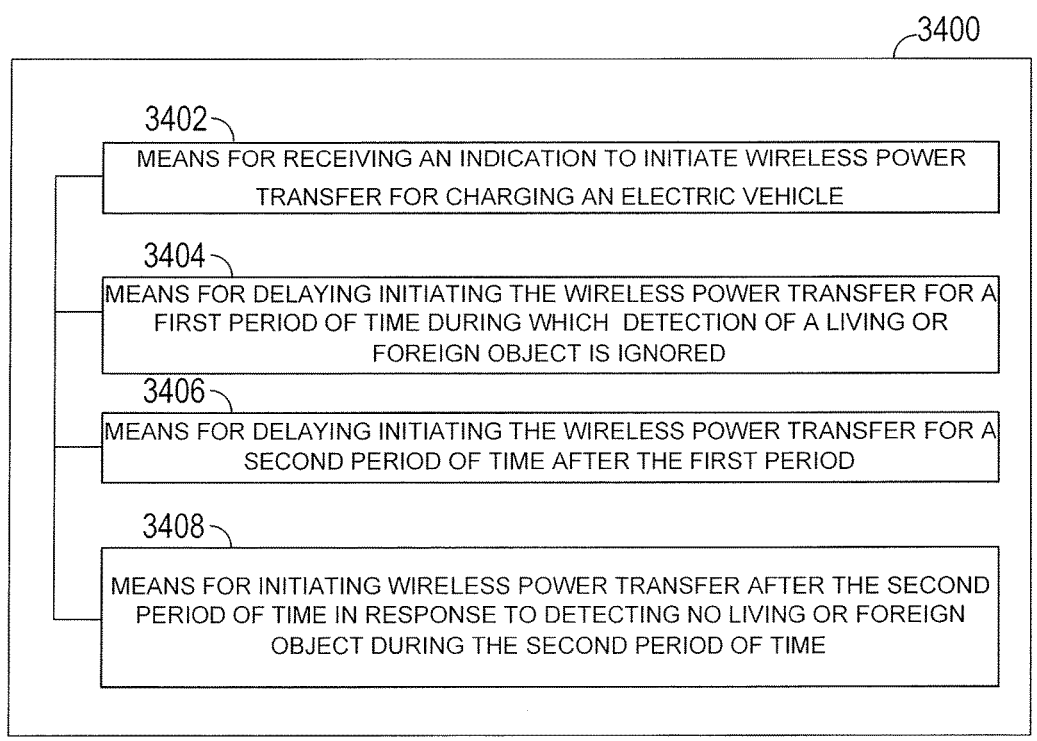
FIG. 34 is a functional block diagram of another apparatus, in accordance with some exemplary implementations.

FIG. 34 is a functional block diagram of an apparatus 3400, in accordance with some exemplary implementations. Those skilled in the art will appreciate that an apparatus for wirelessly charging an electric vehicle can have more components than the simplified apparatus 3400 shown in FIG. 34. The apparatus 3400 shown includes only those components useful for describing some prominent features of implementations within the scope of the claims.

The apparatus 3400 includes means 3402 for receiving an indication to initiate wireless power transfer for charging an electric vehicle. In various implementations, means 3402 for receiving an indication to initiate wireless power transfer for charging an electric vehicle can include one or more processors, controllers, the BCU 306 (FIG. 3) and/or the ICU 316 (FIG. 3). In various implementations, means 3402 for receiving an indication to initiate wireless power transfer for charging an electric vehicle can implement block 3302 of FIG. 33.

The apparatus 3400 further includes means 3404 for receiving an indication to initiate wireless power transfer for charging an electric vehicle. In various implementations, means 3404 for receiving an indication to initiate wireless power transfer for charging an electric vehicle can include one or more processors, controllers, the BCU 306 (FIG. 3) and/or the ICU 316 (FIG. 3). In various implementations, means 3404 for receiving an indication to initiate wireless power transfer for charging an electric vehicle can implement block 3304 of FIG. 33.

The apparatus 3400 further includes means 3406 for delaying initiating the wireless power transfer for a second period of time after the first period. In various implementations, means 3406 for delaying initiating the wireless power transfer for a second period of time after the first period can include one or more processors, controllers, the BCU 306 (FIG. 3) and/or the ICU 316 (FIG. 3). In various implementations, means 3406 for delaying initiating the wireless power transfer for a second period of time after the first period can implement block 3306 of FIG. 33.

The apparatus 3400 further includes means 3408 for initiating wireless power transfer after the second period of time in response to detecting no living or foreign object during the second period of time. In various implementations, means 3408 for initiating wireless power transfer after the second period of time in response to detecting no living or foreign object during the second period of time can include one or more processors, controllers, the BCU 306 (FIG. 3) and/or the ICU 316 (FIG. 3). In various implementations, means 3408 for initiating wireless power transfer after the second period of time in response to detecting no living or foreign object during the second period of time can implement block 3308 of FIG. 33.

FIG. 35 illustrates a flowchart of a method 3500 method for wirelessly charging an electric vehicle utilizing a wireless charger, in accordance with certain implementations described herein. The steps or actions described in FIG. 35 may be implemented in, or carried out by, either of the circuits and/or devices shown in either of FIGS. 1-3B. Block 3502 may include measuring a speed of the electric vehicle for a period of time. Block 3504 may include selectively powering the wireless charger based at least in part on the measured speed over the period.

FIG. 36 is a functional block diagram of an apparatus, in accordance with some exemplary implementations. Those skilled in the art will appreciate that an apparatus may have more components than the simplified apparatus 3600 for wirelessly charging an electric vehicle utilizing a wireless charger shown in FIG. 36. The apparatus 3600 shown includes only those components useful for describing some prominent features of implementations within the scope of the claims.

The apparatus 3600 includes means 3602 for measuring a speed of the electric vehicle for a period of time. In some implementations, the means 3602 for measuring a speed of the electric vehicle for a period of time can be configured to perform one or more of the functions described above with respect to block 2302 (FIG. 23). In various implementations, the means 3602 for measuring a speed of the electric vehicle for a period of time can be implemented by the VCU 322 of FIG. 3A.

The apparatus 3600 further includes means 3604 for selectively powering the wireless charger based at least in part on the measured speed over the period. In some implementations, the means 3604 can be configured to perform one or more of the functions described above with respect to block 2304 (FIG. 23). In various implementations, the means 3604 can be implemented by the VCU 322 of FIG. 3A.

FIG. 37 illustrates a flowchart of a method 3700 for aligning an electric vehicle with a wireless charger, in accordance with certain implementations described herein. The steps or actions described in FIG. 37 may be implemented in, or carried out by, either of the circuits and/or devices shown in either of FIGS. 1-3B. Block 3702 may include measuring a degree of magnetic coupling between the wireless charger and the electric vehicle. Block 2304 may include displaying a sensorial representation of the measured degree of magnetic coupling. In some implementations the sensorial representation may include a display on the DLU 330.

In accordance with another some implementations, a method for indicating alignment information on a user interface may include receiving a message with one or more values indicative of instantaneous alignment positions between a wireless charging receiver element and a wireless charging transmitter element. The one or more values indicative of instantaneous alignment positions may correspond to instantaneous degrees of coupling between the wireless charging receiver element and a wireless charging transmitter element as a vehicle moves over a wireless charging base pad. The method may further include receiving a message with a value indicative of an alignment threshold. The alignment threshold may represent a degree of coupling between the receiver element and transmitter element for which the system determines power may be transferred efficiently and at an sufficient power level for charging a load of the electric vehicle. The method may further include displaying a sensorial representation of alignment progress (e.g., how close the vehicle is to being sufficiently aligned over time) based on both the received instantaneous values and the received alignment threshold value. This method may be implemented in, or carried out by, any combination of the circuits, controllers, and/or devices shown in FIGS. 1-3B. As described above, in one aspect, in accordance with this method, instantaneous values for alignment and the alignment threshold may be different, be in different ranges or of different types depending on the type of wireless charging system for which the alignment indication is being displayed (e.g., for example different WEVC systems may require different levels of coupling for power transfer). In accordance with this method, a user interface for managing a wireless charging system may be able to display an accurate graphical indication of the alignment process regardless of the type of WEVC system configuration.

Figure 38:
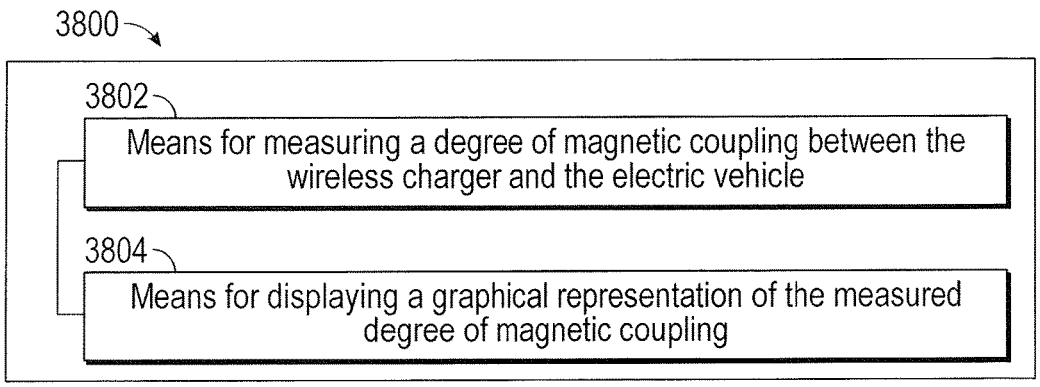
FIG. 38 is a functional block diagram of an apparatus for wirelessly charging a vehicle, in accordance with some exemplary implementations.

FIG. 38 is a functional block diagram of an apparatus, in accordance with some exemplary implementations. Those skilled in the art will appreciate that an apparatus may have more components than the simplified apparatus 3800 shown in FIG. 38. The apparatus 3800 shown includes only those components useful for describing some prominent features of implementations within the scope of the claims.

The apparatus 3800 includes means 3802 for measuring a degree of magnetic coupling between the wireless charger and the electric vehicle. In some implementations, the means 3802 for measuring a degree of magnetic coupling between the wireless charger and the electric vehicle can be configured to perform one or more of the functions described above with respect to block 3702 (FIG. 37). In various implementations, the means 3802 for measuring a degree of magnetic coupling between the wireless charger and the electric vehicle can be implemented by the VCU 322 of FIG. 3A.

The apparatus 3800 further includes means 3804 for displaying a sensorial representation of the measured degree of magnetic coupling. In some implementations, the means 3804 can be configured to perform one or more of the functions described above with respect to block 3704 (FIG. 37). In various implementations, the means 3804 can be implemented by the VCU 322 of FIG. 3A.

Figure 39:
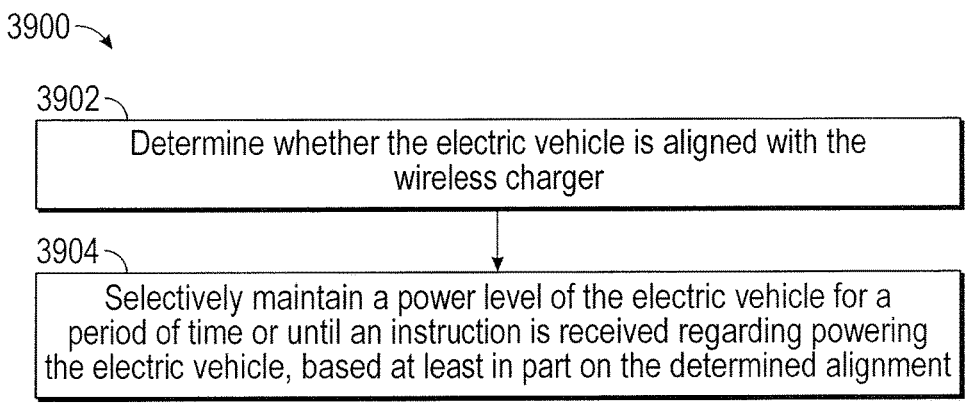
FIG. 39 is a flowchart of a method for wirelessly charging a vehicle, in accordance with some exemplary implementations.

FIG. 39 illustrates a flowchart of a method 3900 for wirelessly charging an electric vehicle utilizing a wireless charger, in accordance with certain implementations described herein. The steps or actions described in FIG. 39 may be implemented in, or carried out by, either of the circuits and/or devices shown in either of FIGS. 1-3B. Block 3902 may include determining whether the electric vehicle is aligned with the wireless charger. Block 3904 may include selectively maintaining a power level of the electric vehicle for a period of time, or until an instruction is received regarding powering the electric vehicle, based at least in part on the determined alignment.

Figure 40:
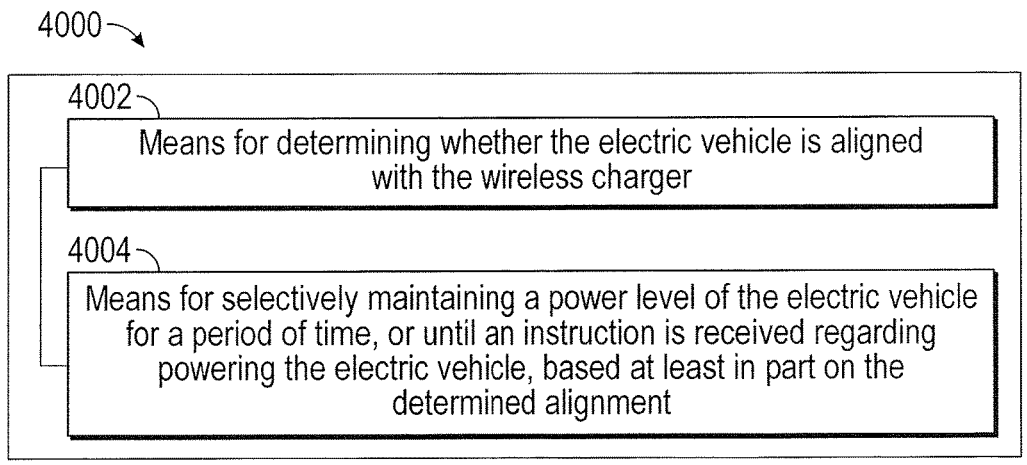
FIG. 40 is a functional block diagram of an apparatus for wirelessly charging a vehicle, in accordance with some exemplary implementations.

FIG. 40 is a functional block diagram of an apparatus 4000, in accordance with some exemplary implementations. Those skilled in the art will appreciate that an apparatus may have more components than the simplified apparatus 4000 for wirelessly charging an electric vehicle utilizing a wireless charger shown in FIG. 40. The apparatus 4000 shown includes only those components useful for describing some prominent features of implementations within the scope of the claims.

The apparatus 4000 includes means 4002 for determining whether the electric vehicle is aligned with the wireless charger. In some implementations, the means 4002 for determining whether the electric vehicle is aligned with the wireless charger can be configured to perform one or more of the functions described above with respect to block 3902 (FIG. 39). In various implementations, the means 4002 for determining whether the electric vehicle is aligned with the wireless charger can be implemented by the VCU 322 of FIG. 3A.

The apparatus 4000 further includes means 4004 for selectively maintaining a power level of the electric vehicle for a period of time, or until an instruction is received regarding powering the electric vehicle, based at least in part on the determined alignment. In some implementations, the means 4004 can be configured to perform one or more of the functions described above with respect to block 3904 (FIG. 39). In various implementations, the means 4004 can be implemented by the VCU 322 of FIG. 3A.

Figure 41:
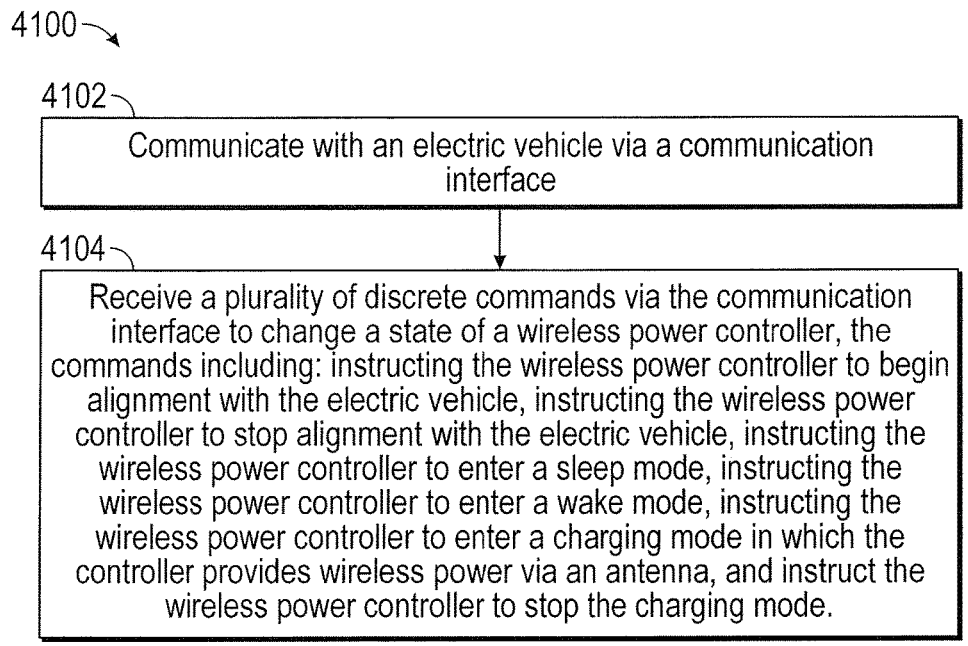
FIG. 41 is a flowchart of a method for wirelessly charging a vehicle, in accordance with some exemplary implementations.

FIG. 41 illustrates a flowchart of a method 4100 for wirelessly charging an electric vehicle utilizing a wireless charger, in accordance with certain implementations described herein. The steps or actions described in FIG. 41 may be implemented in, or carried out by, either of the circuits and/or devices shown in either of FIGS. 1-3B. Block 4102 may include communicating with an electric vehicle. Block 4104 may include receiving a plurality of discrete commands via the communication interface to change a state of the wireless power controller, the commands including: instructing the wireless power controller to begin alignment with the electric vehicle, instructing the wireless power controller to stop alignment with the electric vehicle, instructing the wireless power controller to enter a sleep mode, instructing the wireless power controller to enter a wake mode, instructing the wireless power controller to enter a charging mode in which the controller provides wireless power via the antenna, and instruct the wireless power controller to stop the charging mode.

Figure 42:
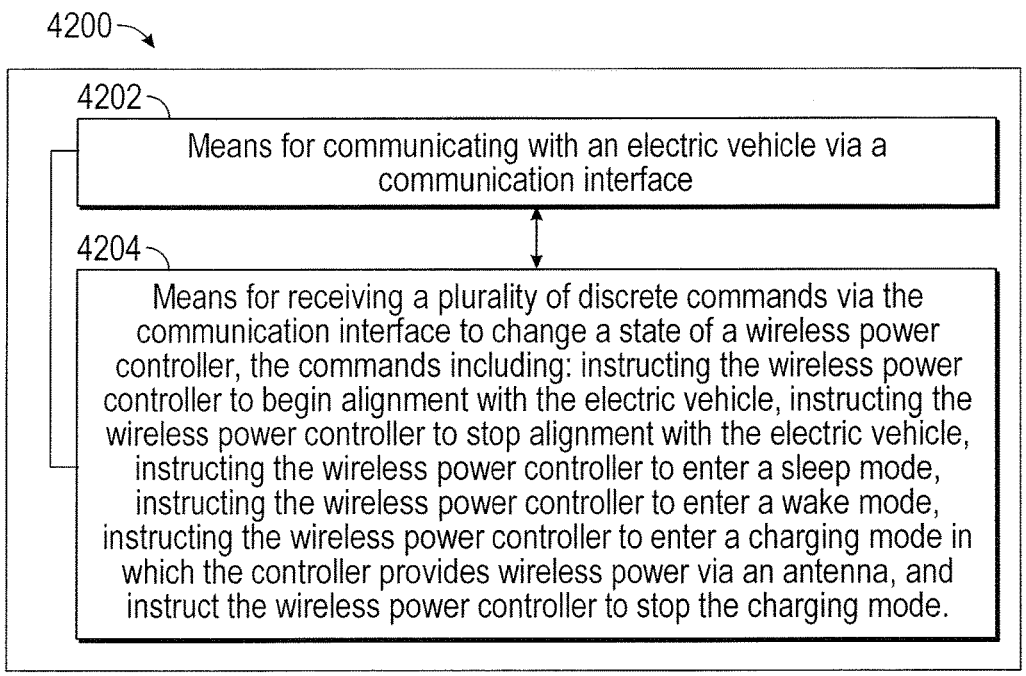
FIG. 42 is a functional block diagram of an apparatus for wirelessly charging a vehicle, in accordance with some exemplary implementations.

FIG. 42 is a functional block diagram of an apparatus 4200, in accordance with some exemplary implementations. Those skilled in the art will appreciate that an apparatus may have more components than the simplified apparatus 4200 for wirelessly charging an electric vehicle utilizing a wireless charger shown in FIG. 42. The apparatus 4200 shown includes only those components useful for describing some prominent features of implementations within the scope of the claims.

The apparatus 4200 includes means 4202 for communicating with an electric vehicle. In some implementations, the means 4202 for communicating with an electric vehicle can be configured to perform one or more of the functions described above with respect to block 4102 (FIG. 41). In various implementations, the means 4202 for communicating with an electric vehicle can be implemented by the BCU 426 of FIG. 3A.

The apparatus 4200 further includes means 4204 for receiving a plurality of discrete commands via the communication interface to change a state of the wireless power controller, the commands including: instructing the wireless power controller to begin alignment with the electric vehicle, instructing the wireless power controller to stop alignment with the electric vehicle, instructing the wireless power controller to enter a sleep mode, instructing the wireless power controller to enter a wake mode, instructing the wireless power controller to enter a charging mode in which the controller provides wireless power via the antenna, and instruct the wireless power controller to stop the charging mode. In some implementations, the means 4204 can be configured to perform one or more of the functions described above with respect to block 4104 (FIG. 41). In various implementations, the means 4204 can be implemented by the BCU 426 of FIG. 3A.

Figure 43:
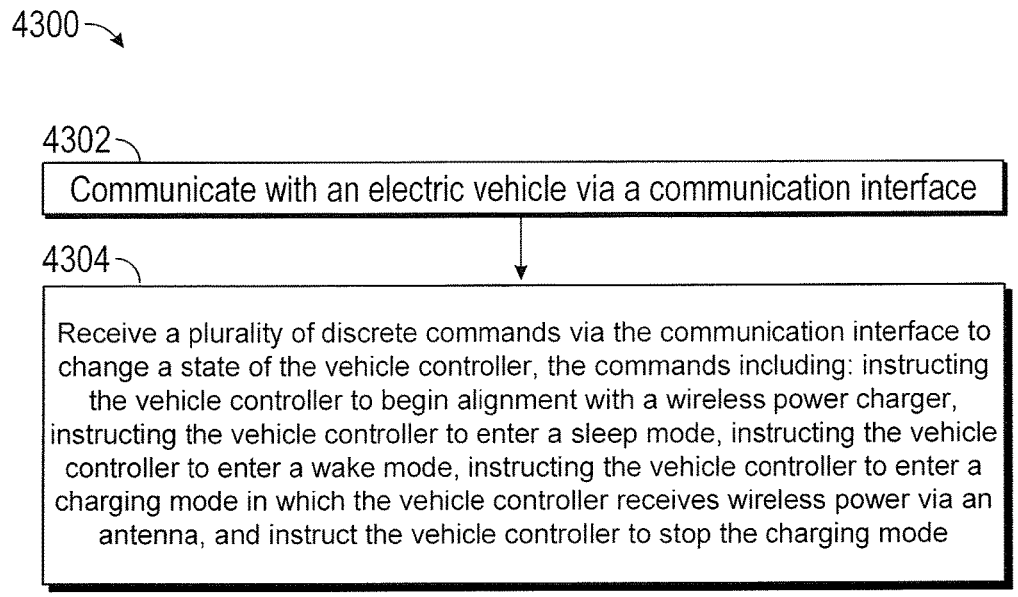
FIG. 43 is a flowchart of a method for wirelessly charging a vehicle, in accordance with some exemplary implementations.

FIG. 43 illustrates a flowchart of a method 4300 for wirelessly charging an electric vehicle utilizing a wireless charger, in accordance with certain implementations described herein. The steps or actions described in FIG. 43 may be implemented in, or carried out by, either of the circuits and/or devices shown in either of FIGS. 1-3B. Block 4302 may include communicating with an electric vehicle. Block 4304 may include receiving a plurality of discrete commands via the communication interface to change a state of the vehicle controller, the commands including: instructing the vehicle controller to begin alignment with a wireless power charger, instructing the vehicle controller to stop alignment with the wireless power charger, instructing the vehicle controller to enter a sleep mode, instructing the vehicle controller to enter a wake mode, instructing the vehicle controller to enter a charging mode in which the vehicle controller receives wireless power via an antenna, and instruct the vehicle controller to stop the charging mode.

Figure 44:
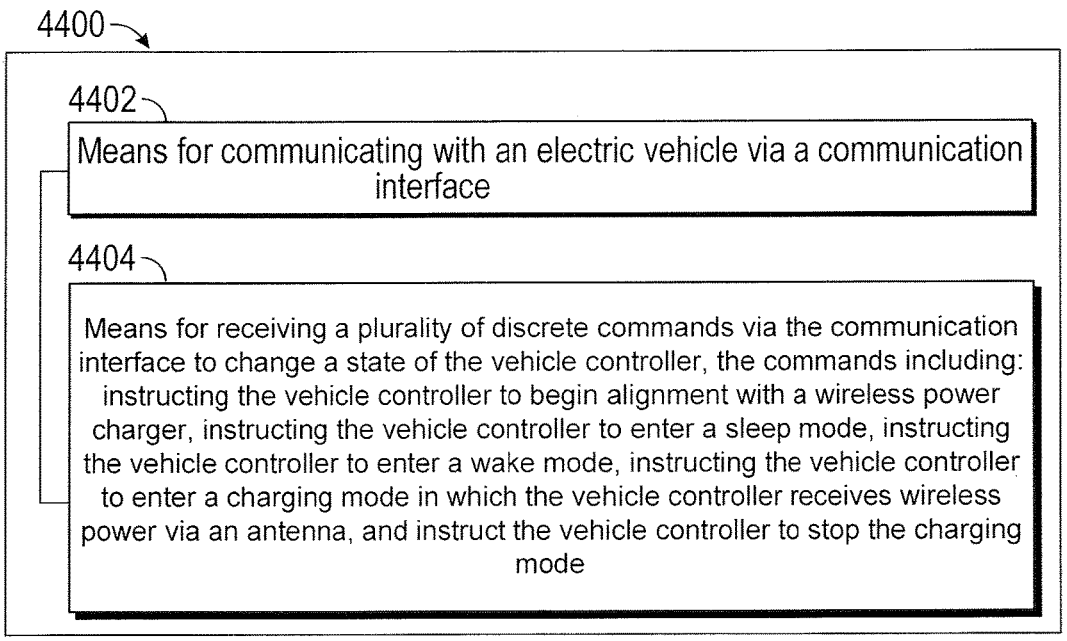
FIG. 44 is a functional block diagram of an apparatus for wirelessly charging a vehicle, in accordance with some exemplary implementations.

FIG. 44 is a functional block diagram of an apparatus 4400, in accordance with some exemplary implementations. Those skilled in the art will appreciate that an apparatus may have more components than the simplified apparatus 4400 for wirelessly charging an electric vehicle utilizing a wireless charger shown in FIG. 44. The apparatus 4400 shown includes only those components useful for describing some prominent features of implementations within the scope of the claims.

The apparatus 4400 includes means 4402 for communicating with an electric vehicle. In some implementations, the means 4402 for communicating with an electric vehicle can be configured to perform one or more of the functions described above with respect to block 4302 (FIG. 43). In various implementations, the means 4402 for communicating with an electric vehicle can be implemented by the VCU 442 of FIG. 3A.

The apparatus 4400 further includes means 4404 for receiving a plurality of discrete commands via the communication interface to change a state of the vehicle controller, the commands including: instructing the vehicle controller to begin alignment with a wireless power charger, instructing the vehicle controller to stop alignment with the wireless power charger, instructing the vehicle controller to enter a sleep mode, instructing the vehicle controller to enter a wake mode, instructing the vehicle controller to enter a charging mode in which the vehicle controller receives wireless power via an antenna, and instruct the vehicle controller to stop the charging mode. In some implementations, the means 4404 can be configured to perform one or more of the functions described above with respect to block 4304 (FIG. 43). In various implementations, the means 4404 can be implemented by the VCU 442 of FIG. 3A.

Figure 45:
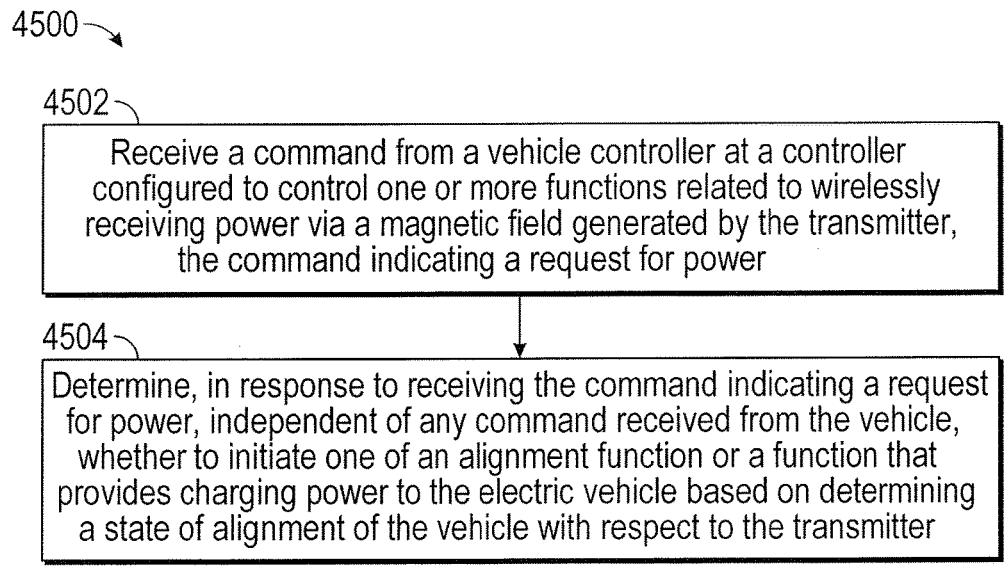
FIG. 45 is a flowchart of a method for wirelessly charging a vehicle, in accordance with some exemplary implementations.

FIG. 45 illustrates a flowchart of a method 4500 for operating a wireless charging device in an electric vehicle, in accordance with certain implementations described herein. The steps or actions described in FIG. 45 may be implemented in, or carried out by, either of the circuits and/or devices shown in either of FIGS. 1-3B. Block 4502 may include receiving a command from a vehicle controller at a controller configured to control one or more functions related to wirelessly receiving power via a magnetic field generated by the transmitter, the command indicating a request for power. Block 4504 may include determining, in response to receiving the command indicating a request for power, by the controller, independent of any command received from the vehicle, to initiate one of an alignment function or a function that provides charging power to the electric vehicle based on determining a state of alignment of the vehicle with respect to the transmitter.

Figure 46:
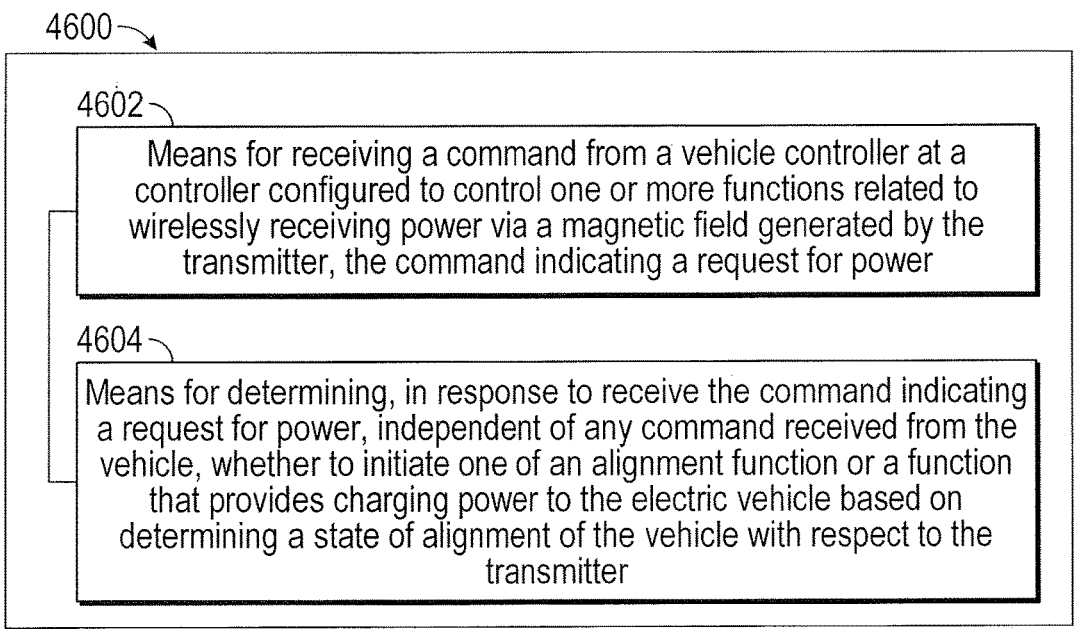
FIG. 46 is a functional block diagram of an apparatus for wirelessly charging a vehicle, in accordance with some exemplary implementations.

FIG. 46 is a functional block diagram of an apparatus 4600, in accordance with some exemplary implementations. Those skilled in the art will appreciate that an apparatus may have more components than the simplified apparatus 4600 for wirelessly charging an electric vehicle utilizing a wireless charger shown in FIG. 46. The apparatus 4600 shown includes only those components useful for describing some prominent features of implementations within the scope of the claims.

The apparatus 4600 includes means 4602 for receiving a command from a vehicle controller at a controller configured to control one or more functions related to wirelessly receiving power via a magnetic field generated by the transmitter, the command indicating a request for power. In some implementations, the means 4602 for receiving a command from a vehicle controller at a controller configured to control one or more functions related to wirelessly receiving power via a magnetic field generated by the transmitter, the command indicating a request for power can be configured to perform one or more of the functions described above with respect to block 4502 (FIG. 45). In various implementations, the means 4602 for receiving a command from a vehicle controller at a controller configured to control one or more functions related to wirelessly receiving power via a magnetic field generated by the transmitter, the command indicating a request for power can be implemented by the BCU 306 of FIG. 3A.

The apparatus 4600 further includes means 4604 for determining, in response to receiving the command indicating a request for power, by the controller, independent of any command received from the vehicle, to initiate one of an alignment function or a function that provides charging power to the electric vehicle based on determining a state of alignment of the vehicle with respect to the transmitter. In some implementations, the means 4604 can be configured to perform one or more of the functions described above with respect to block 4504 (FIG. 45). In various implementations, the means 4604 can be implemented by the BCU 306 of FIG. 3A.

Figure 47:
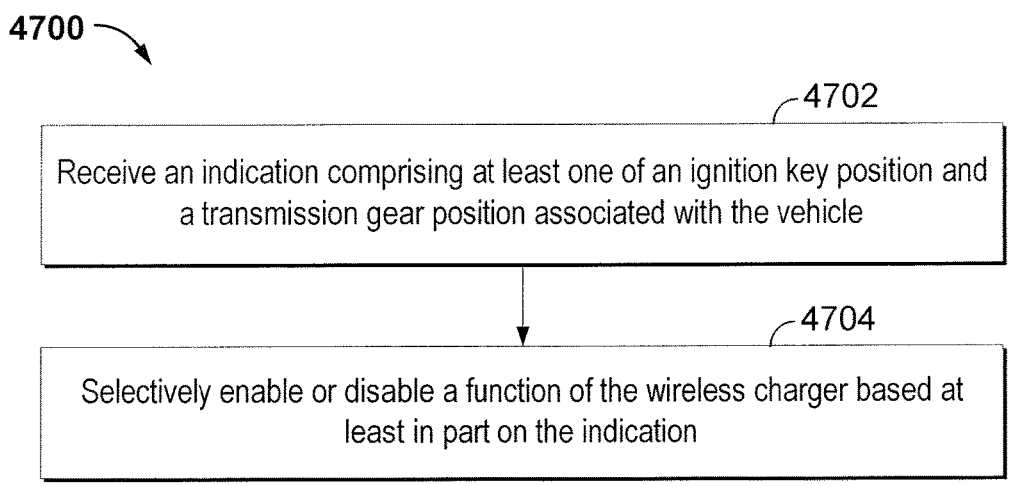
FIG. 47 is a flowchart of a method for wirelessly charging a vehicle, in accordance with some exemplary implementations.

FIG. 47 is a flowchart of a method 4700 for wirelessly charging a vehicle utilizing a wireless charger, in accordance with some implementations. The steps or actions described in FIG. 47 may be implemented in, or carried out by, either of the circuits and/or devices shown in either of FIGS. 3A and 3B and may further be described in more detail in connection with one or more of FIGS. 7A-7C, 9-11 and 14-17B. Block 4702 may include receiving an indication comprising at least one of an ignition key position and a transmission gear position associated with the vehicle. In one implementation, the indication may further comprise an indication of a parking break position. In yet another implementation, the indication may further comprise an indication of a speed of the vehicle. In one implementation, the function of the wireless charger may comprise one or more of a communicatively connected unaligned state, an aligned state and a charging state.

Block 4704 may include selectively enabling or disabling a function of the wireless charger based at least in part on the indication. In one implementation, selectively enabling or disabling the function of the wireless charger may comprise one or both of: enabling the charging state when the ignition key position is indicated as in an off position, and disabling the charging state when the ignition key position is indicated as in a position other than the off position. In another implementation, selectively enabling or disabling the function of the wireless charger may comprise one or both of: enabling the charging state when the transmission gear position is indicated as in a park position, and disabling the charging state when the transmission gear position is indicated as in a position other than the park position. In yet another implementation, selectively enabling or disabling the function of the wireless charger may comprise one or both of enabling the charging state when the parking break position is indicated as engaged, and disabling the charging state when the parking break position is indicated as disengaged. In yet another implementation, selectively enabling or disabling the function of the wireless charger may comprise one or both of transitioning the wireless charger into a sleep mode when the speed of the vehicle is greater than a first threshold for at least a first length of time, and transitioning the wireless charger out of a sleep mode when the speed of the vehicle is less than a second threshold for at least a second length of time.

Figure 48:
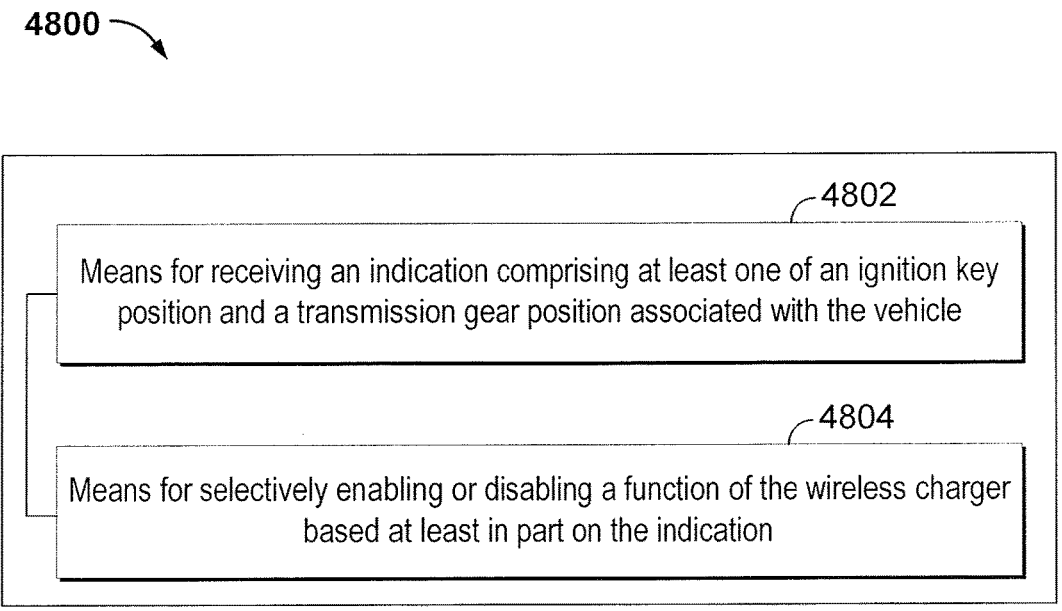
FIG. 48 is a functional block diagram of an apparatus for wirelessly charging a vehicle, in accordance with some exemplary implementations.

FIG. 48 is a functional block diagram of an apparatus 4800 for wirelessly charging a vehicle, in accordance with some exemplary implementations. Those skilled in the art will appreciate that an apparatus for wirelessly charging a vehicle may have more components than the simplified apparatus 4800 shown in FIG. 48. The apparatus 4800 shown includes only those components useful for describing some prominent features of implementations within the scope of the claims.

The apparatus 4800 includes means 4802 for receiving an indication comprising at least one of an ignition key position and a transmission gear position associated with the vehicle. In some implementations, the means 4802 for receiving an indication can be configured to perform one or more of the functions described above with respect to block 4702 (FIG. 47). In various implementations, the means 4802 for receiving an indication can be implemented by the VCU 322 of FIG. 3A.

The apparatus 4800 further includes means 4804 for selectively enabling or disabling a wireless charging function based at least in part on the indication. In some implementations, the means 4804 can be configured to perform one or more of the functions described above with respect to block 4704 (FIG. 47). In various implementations, the means 4804 can be implemented by the VCU 322 of FIG. 3A.

The present application further contemplates one or more methods, apparatuses, non-transitory, and computer-readable media as set forth below. Some implementations include a method for wirelessly charging a vehicle utilizing a wireless charger. The method comprises receiving an indication comprising at least one of an ignition key position and a transmission gear position associated with the vehicle, and selectively enabling or disabling a function of the wireless charger based at least in part on the indication. The function of the wireless charger comprises one or more of a communicatively connected unaligned state, an aligned state and a charging state. Selectively enabling or disabling the function of the wireless charger comprises one or both of enabling the charging state when the ignition key position is indicated as in an off position, and disabling the charging state when the ignition key position is indicated as in a position other than the off position. Selectively enabling or disabling a function of the wireless charger comprises one or both of enabling the charging state when the transmission gear position is indicated as in a park position, and disabling the charging state when the transmission gear position is indicated as in a position other than the park position. The indication further comprises an indication of a parking break position. Selectively enabling or disabling a function of the wireless charger comprises one or both of enabling the charging state when the parking break position is indicated as engaged, and disabling the charging state when the parking break position is indicated as disengaged. The indication further comprises an indication of a speed of the vehicle. Selectively enabling or disabling the function of the wireless charger comprises one or both of transitioning the wireless charger into a sleep mode when the speed of the vehicle is greater than a first threshold for at least a first length of time, and transitioning the wireless charger out of a sleep mode when the speed of the vehicle is less than a second threshold for at least a second length of time.

Some other implementations comprise an apparatus for wirelessly charging a vehicle. The apparatus comprises a processor configured to receive an indication comprising at least one of an ignition key position and a transmission gear position associated with the vehicle, and selectively enable or disable a wireless charging function based at least in part on the indication. The wireless charging function comprises one or more of a communicatively connected unaligned state, an aligned state and a charging state. The processor is configured to one or both of enable the charging state when the ignition key position is indicated as in an off position, and disable the charging state when the ignition key position is indicated as in a position other than the off position. The processor is configured to one or both of enable the charging state when the transmission gear position is indicated as in a park position, and disable the charging state when the transmission gear position is indicated as in a position other than the park position. The indication further comprises an indication of a parking break position. The processor is configured to one or both of enable the charging state when the parking break position is indicated as engaged, and disable the charging state when the parking break position is indicated as disengaged. The indication further comprises an indication of a speed of the vehicle. The processor is configured to one or both of enable a sleep mode when the speed of the vehicle is greater than a first threshold for at least a first length of time, and disable the sleep mode when the speed of the vehicle is less than a second threshold for at least a second length of time.

Some other implementations comprise a non-transitory computer-readable medium comprising code that, when executed, causes a processor to receive an indication comprising at least one of an ignition key position and a transmission gear position associated with a vehicle, and selectively enable or disable a wireless charging function based at least in part on the indication. The wireless charging function comprises one or more of a communicatively connected unaligned state, an aligned state and a charging state. code, when executed, further causes the processor to one or both of enable the charging state when the ignition key position is indicated as in an off position, and disable the charging state when the ignition key position is indicated as in a position other than the off position. The code, when executed, further causes the processor to one or both of enable the charging state when the transmission gear position is indicated as in a park position, and disable the charging state when the transmission gear position is indicated as in a position other than the park position. The indication further comprises an indication of a parking break position. The code, when executed, further causes the processor to one or both of enable the charging state when the parking break position is indicated as engaged, and disable the charging state when the parking break position is indicated as disengaged. The indication further comprises an indication of a speed of the vehicle. The code, when executed, further causes the processor to one or both of enable a sleep mode when the speed of the vehicle is greater than a first threshold for at least a first length of time, and disable the sleep mode when the speed of the vehicle is less than a second threshold for at least a second length of time.

Some other implementations comprise an apparatus for wirelessly charging a vehicle. The apparatus comprises means for receiving an indication comprising at least one of an ignition key position and a transmission gear position associated with the vehicle, and means for selectively enabling or disabling a wireless charging function based at least in part on the indication. The wireless charging function comprises one or more of a communicatively connected unaligned state, an aligned state and a charging state. The means for selectively enabling or disabling a wireless charging function is configured to one or both of enable the charging state when the ignition key position is indicated as in an off position, and disable the charging state when the ignition key position is indicated as in a position other than the off position. The means for selectively enabling or disabling a wireless charging function is configured to one or both of enable the charging state when the transmission gear position is indicated as in a park position, and disable the charging state when the transmission gear position is indicated as in a position other than the park position. The indication further comprises an indication of a parking break position. The means for selectively enabling or disabling a wireless charging function is configured to one or both of enable the charging state when the parking break position is indicated as engaged, and disable the charging state when the parking break position is indicated as disengaged. The indication further comprises an indication of a speed of the vehicle. The means for selectively enabling or disabling a wireless charging function is configured to one or both of enable a sleep mode when the speed of the vehicle is greater than a first threshold for at least a first length of time, and disable the sleep mode when the speed of the vehicle is less than a second threshold for at least a second length of time.

Some other implementations comprise a method for wirelessly charging an electric vehicle utilizing a wireless charger. The method comprises measuring a speed of the electric vehicle for a period of time, and selectively powering the wireless charger based at least in part on the measured speed over the period. The method further comprises measuring a distance traveled of the electric vehicle, and selectively powering the wireless charger based at least in part on the measured distance traveled. Selectively powering the wireless charger comprises selectively powering the wireless charger upon the speed satisfying a first threshold. The method further comprises selectively disabling the wireless charger based at least in part on the measured speed over the period. The method further comprises selectively disabling the wireless charger upon the speed satisfying a second threshold. The speed of the first threshold is lower than the second threshold. The method further comprises selectively disabling the wireless charger based at least in part on the measured speed over the period. Selectively disabling the wireless charger comprises selectively disabling based at least in part on the measured distance traveled.

Some other implementations comprise a method for aligning an electric vehicle with a wireless charger. The method comprises measuring a degree of magnetic coupling between the wireless charger and the electric vehicle, and displaying a sensorial representation of the measured degree of magnetic coupling. Displaying the sensorial representation comprises displaying a normalized value of the degree of magnetic coupling based on a maximum degree of magnetic coupling.

Some other implementations comprise an apparatus for wirelessly charging a vehicle. The apparatus comprises a processor configured to measure a speed of the electric vehicle for a period of time, and selectively power the wireless charger based at least in part on the measured speed over the period.

Some other implementations comprise a non-transitory computer-readable medium comprising code that, when executed, causes a processor to measure a speed of the electric vehicle for a period of time, and selectively power the wireless charger based at least in part on the measured speed over the period.

Some other implementations comprise an apparatus for wirelessly charging a vehicle. The apparatus comprises means for measuring a speed of the electric vehicle for a period of time, and means for selectively powering the wireless charger based at least in part on the measured speed over the period.

Some other implementations comprise a method for wirelessly charging an electric vehicle utilizing a wireless charger. The method comprises determining whether the electric vehicle is aligned with the wireless charger, and selectively maintaining a power level of the electric vehicle for a period of time, or until an instruction is received regarding powering the electric vehicle, based at least in part on the determined alignment.

Some other implementations comprise a wireless power charger comprising an antenna configured to provide wireless power, a communication interface configured to communicate with an electric vehicle, and a wireless power controller configured to receive a plurality of discrete commands via the communication interface to change a state of the wireless power controller, the commands including: instructing the wireless power controller to begin alignment with the electric vehicle, instructing the wireless power controller to stop alignment with the electric vehicle, instructing the wireless power controller to enter a sleep mode, instructing the wireless power controller to enter a wake mode, instructing the wireless power controller to enter a charging mode in which the controller provides wireless power via the antenna, and instruct the wireless power controller to stop the charging mode.

Some other implementations comprise a wireless power device comprising a communication interface configured to communicate with an electric vehicle, and a vehicle controller configured to receive a plurality of discrete commands via the communication interface to change a state of the vehicle controller, the commands including: instructing the vehicle controller to begin alignment with a wireless power charger, instructing the vehicle controller to stop alignment with the wireless power charger, instructing the vehicle controller to enter a sleep mode, instructing the vehicle controller to enter a wake mode, instructing the vehicle controller to enter a charging mode in which the vehicle controller receives wireless power via an antenna, and instruct the vehicle controller to stop the charging mode.

Some other implementations comprise a method of operating a wireless charging device in an electric vehicle. The method comprises receiving a command from a vehicle controller at a controller configured to control one or more functions related to wirelessly receiving power via a magnetic field generated by the transmitter, the command indicating a request for power, and determining, in response to receiving the command indicating a request for power, by the controller, independent of any command received from the vehicle, to initiate one of an alignment function or a function that provides charging power to the electric vehicle based on determining a state of alignment of the vehicle with respect to the transmitter.

Some other implementations comprise a method of operating a wireless power controller, comprising automatically entering a sleep mode based on a state of the wireless power controller and a state of an electric vehicle or a received command.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

Information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative logical blocks, modules, circuits, and algorithm steps described in connection with the implementations disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the implementations.

The various illustrative blocks, modules, and circuits described in connection with the implementations disclosed herein can be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein can be embodied directly in hardware, in a software module executed by a processor, or in a combination of the two. If implemented in software, the functions can be stored on or transmitted over as one or more instructions or code on a tangible, non-transitory computer-readable medium. A software module can reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium can be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium can reside in an ASIC.

For purposes of summarizing the disclosure, certain aspects, advantages and novel features have been described herein. It is to be understood that not necessarily all such advantages can be achieved in accordance with any particular implementation. Thus, the implementations can be embodied or carried out in a manner that achieves or optimizes one advantage or group of advantages as taught herein without necessarily achieving other advantages as can be taught or suggested herein.

Various modifications of the above described implementations will be readily apparent, and the generic principles defined herein can be applied to other implementations without departing from the spirit or scope. Thus, the present application is not intended to be limited to the implementations shown herein but is to be accorded the widest scope consistent with the principles and novel features disclosed herein.

What is claimed is:

1. A method of operating a wireless charging device in an electric vehicle, the wireless charging device configured to wirelessly receive power via a wireless field generated by a transmitter, the method comprising:
    detecting a system fault indicative of one or more faults in the wireless charging device in the electric vehicle or in the transmitter;
    mapping the detected system fault to a fault severity level from a plurality of fault severity levels, based on a type of the system fault detected, wherein a total number of types of detectable system faults is greater than a total number of the plurality of fault severity levels;
    determining whether to notify a user of the detected system fault based on the fault severity level; and
    recovering from the detected system fault without providing user notification for at least one fault severity level of the plurality of fault severity levels.

2. The method of claim 1, further comprising:
    when a first fault severity level is determined, providing a notification via a user interface and clearing the fault;
    when a second fault severity level is determined, clearing the fault without providing the notification;
    when a third fault severity level is determined, providing the notification, receiving an input via the user interface, and clearing the fault in response to the input; and
    when a fourth fault severity level is determined, providing the notification and refraining from clearing the fault.

3. The method of claim 1, further comprising ignoring the system fault for at least one fault severity level of the plurality of fault severity levels.

4. The method of claim 1, wherein charging or alignment is interrupted in response to a first set of severity levels, and wherein charging continues in response to a second set of severity levels, different than the first set of severity levels.

5. The method of claim 1, wherein the system fault comprises at least one of: a living object detection, a foreign object detection, or a hardware fault.

6. The method of claim 1, further comprising:
instructing a wireless power controller to stop a charging mode in response to the system fault for a predetermined period of time including at least a first hold time; and
ignoring one or more subsequent system faults during at least the first hold time.

7. The method of claim 6, further comprising instructing the wireless power controller to restart the charging mode when no system fault is detected for a first scan time after termination of the first hold time.

8. A wireless power charging device in an electric vehicle, comprising:
a receiver configured to wirelessly receive power via a wireless field generated by a transmitter;
a processor configured to:
detect a system fault indicative of one or more faults in the wireless charging device in the electric vehicle or in the transmitter;
map the detected system fault to a fault severity level from a plurality of fault severity levels based on a type of the system fault detected, wherein a total number of types of detectable system faults is greater than a total number of the plurality of fault severity levels;
determine whether to notify a user of the detected system fault based on the fault severity level; and
recover from the detected system fault without providing user notification for at least one fault severity level of the plurality of fault severity levels.

9. The device of claim 8, further comprising a user interface configured to selectively provide notifications, wherein the processor is further configured to:
when a first fault severity level is determined, provide a notification via the user interface and clear the fault;
when a second fault severity level is determined, clear the fault severity level without providing the notification;
when a third fault severity level is determined, provide the notification, receive an input via the user interface, and clear the fault severity level in response to the input; and
when a fourth fault severity level is determined, provide the notification and refrain from clearing the fault severity level.

10. The device of claim 8, wherein the processor is further configured to ignore the system fault for at least one fault severity level of the plurality of fault severity levels.

11. The device of claim 8, wherein the device is interrupted for charging or alignment in response to a first set of severity levels, and wherein the device continues charging in response to a second set of severity levels, different than the first set of severity levels.

12. The device of claim 8, wherein the system fault comprises at least one of: a living object detection, a foreign object detection, or a hardware fault.

13. The device of claim 8, wherein the processor is further configured to:
instruct a wireless power controller to stop a charging mode in response to the system fault for a predetermined period of time including at least a first hold time; and
ignore one or more subsequent system faults during at least the first hold time.

14. The device of claim 13, wherein the processor is further configured to instruct the wireless power controller to restart the charging mode when no system fault is detected for a first scan time after termination of the first hold time.

15. An apparatus for operating a wireless charging device in an electric vehicle, comprising:
means for wirelessly receiving power via a wireless field generated by a transmitter;
means for detecting a system fault indicative of one or more faults in the wireless charging device in the electric vehicle or in the transmitter;
means for mapping the detected system fault to a fault severity level from a plurality of fault severity levels based on a type of the system fault detected, wherein a total number of types of detectable system faults is greater than a total number of the plurality of fault severity levels;
means for determining whether to notify a user of the detected system fault based on the determined fault severity level; and
means for recovering from the detected system fault without providing user notification for at least one fault severity level of the plurality of fault severity levels.

16. The apparatus of claim 15, further comprising:
means for providing a notification via a user interface and clearing the fault when a first fault severity level is determined;
means for clearing the fault without providing the notification when a second fault severity level is determined;
means for providing the notification, receiving an input via the user interface, and clearing the fault in response to the input when a third fault severity level is determined; and
providing the notification and refraining from clearing the fault when a fourth fault severity level is determined.

17. The apparatus of claim 15, further comprising means for ignoring the system fault for at least one fault severity of fault severity levels.

18. The apparatus of claim 15, wherein charging or alignment is interrupted in response to a first set of severity levels, and wherein charging is continued in response to a second set of severity levels, different than the first set of severity levels.

19. The apparatus of claim 15, wherein the system fault comprises at least one of: a living object detection, a foreign object detection, or a hardware fault.

20. The apparatus of claim 15, further comprising:
means for instructing a wireless power controller to stop a charging mode in response to the system fault for a predetermined period of time including at least a first hold time; and
means for ignoring one or more subsequent system faults during at least the first hold time.

21. The apparatus of claim 20, further comprising means for instructing the wireless power controller to restart the charging mode when no system fault is detected for a first scan time after termination of the first hold time.

22. A non-transitory computer-readable medium comprising code that, when executed, causes an apparatus for operating a wireless charging device in an electric vehicle to:
wirelessly receive power in the electric vehicle via a wireless field generated by a transmitter;
detect a system fault indicative of one or more faults in the wireless charging device in the electric vehicle or in the transmitter;

map the detected system fault to a fault severity level from a plurality of fault severity levels based on a type of the system fault detected, wherein a total number of types of detectable system faults is greater than a total number of the plurality of fault severity levels; and determine whether to notify a user of the detected system fault based on the determined fault severity level; and recover from the detected system fault without providing user notification for at least one fault severity level of the plurality of fault severity levels.

23. The medium of claim 22 further comprising code that, when executed, causes the apparatus to:

when a first fault severity level is determined, provide a notification via a user interface and clear the fault;

when a second fault severity level is determined, clear the fault without providing the notification;

when a third fault severity level is determined, provide the notification, receive an input via the user interface, and clear the fault in response to the input; and when a fourth fault severity level is determined, provide the notification and refrain from clearing the fault.

24. The medium of claim 22, further comprising code that, when executed, causes the apparatus to ignore the system fault.

25. The medium of claim 22, wherein the apparatus is interrupted for charging or alignment in response to a first set of severity levels, and wherein the apparatus continues charging in response to a second set of severity levels, different than the first set of severity levels.

26. The medium of claim 22, wherein the system fault comprises at least one of: a living object detection, a foreign object detection, or a hardware fault.

27. The medium of claim 22, further comprising code that, when executed, causes the apparatus to:

instruct a wireless power controller to stop a charging mode in response to the system fault for a predetermined period of time including at least a first hold time; and ignore one or more subsequent system faults during at least the first hold time.

28. The medium of claim 27, further comprising code that, when executed, causes the apparatus to instruct the wireless power controller to restart the charging mode when no system fault is detected for a first scan time after termination of the first hold time.

* * * * *